US010730752B2

(12) United States Patent
El-Kaderi et al.

(10) Patent No.: US 10,730,752 B2
(45) Date of Patent: Aug. 4, 2020

(54) HETEROATOM-DOPED POROUS CARBONS FOR CLEAN ENERGY APPLICATIONS AND METHODS FOR THEIR SYNTHESIS

(71) Applicant: Virginia Commonwealth University, Richmond, VA (US)

(72) Inventors: Hani M. El-Kaderi, Midlothian, VA (US); Babak Ashourirad, Richmond, VA (US)

(73) Assignee: Virginia Commonwealth University, Richmond, VA (US)

( * ) Notice: Subject to any disclaimer, the term of this patent is extended or adjusted under 35 U.S.C. 154(b) by 0 days.

(21) Appl. No.: 16/098,716

(22) PCT Filed: May 3, 2017

(86) PCT No.: PCT/US2017/030850
§ 371 (c)(1),
(2) Date: Nov. 2, 2018

(87) PCT Pub. No.: WO2017/192728
PCT Pub. Date: Nov. 9, 2017

(65) Prior Publication Data
US 2019/0119120 A1 Apr. 25, 2019

Related U.S. Application Data

(60) Provisional application No. 62/331,243, filed on May 3, 2016.

(51) Int. Cl.
*C01B 32/348* (2017.01)
*B01D 53/04* (2006.01)
(Continued)

(52) U.S. Cl.
CPC ............ *C01B 32/348* (2017.08); *B01D 53/04* (2013.01); *B01J 20/20* (2013.01);
(Continued)

(58) Field of Classification Search
CPC ..... C01B 32/184; C01B 32/30; C01B 32/312; C01B 32/342; H01G 11/34; B82Y 30/00; B82Y 40/00
(Continued)

(56) References Cited

U.S. PATENT DOCUMENTS

| 4,584,405 A | 4/1986 | Vanderpool |
| 4,933,083 A | 6/1990 | Jones |

(Continued)

FOREIGN PATENT DOCUMENTS

| CN | 101885485 A | 11/2010 |
| CN | 103288070 A | 9/2013 |

(Continued)

OTHER PUBLICATIONS

Ashourirad "Exceptional Gas Adsorption Properties by Nitrogen-Doped Porous Carbons Derived from Benzimidazole-Linked Polymers." Chem. Mater. 2015, 27, 1349-1358 (Year: 2015).*

(Continued)

*Primary Examiner* — Tri V Nguyen
(74) *Attorney, Agent, or Firm* — New River Valley IP Law, P.C.; Michele L. Mayberry

(57) ABSTRACT

Methods for a facile, template free and one-step synthesis of nanoporous carbons by using a heterocyclic aromatic organic compound as a single source precursor of both carbon and nitrogen are described. The heterocyclic aromatic organic compound contains nitrogen in pyrrolic and/or pyridinic positions and is chemically activated with NaOH, KOH or $ZnCl_2$ at high temperatures in a solid state mixture as a synthesis protocol to promote fine micropores during carbonization. Nanoporous carbons synthesized by these methods that have superior gas sorption/storage and energy (Continued)

storage properties are also described. The nanoporous carbons are useful as carbon sequestration agents and supercapacitors.

8 Claims, 54 Drawing Sheets

(51) Int. Cl.

| | |
|---|---|
| *B82Y 40/00* | (2011.01) |
| *B01J 20/20* | (2006.01) |
| *B01J 20/30* | (2006.01) |
| *B01J 20/28* | (2006.01) |
| *C01B 32/342* | (2017.01) |
| *H01G 11/34* | (2013.01) |
| *H01G 11/44* | (2013.01) |

(52) U.S. Cl.
CPC ... *B01J 20/28057* (2013.01); *B01J 20/28061* (2013.01); *B01J 20/28064* (2013.01); *B01J 20/28069* (2013.01); *B01J 20/28071* (2013.01); *B01J 20/28078* (2013.01); *B01J 20/3078* (2013.01); *B01J 20/3085* (2013.01); *C01B 32/342* (2017.08); *H01G 11/34* (2013.01); *H01G 11/44* (2013.01); *B01D 2253/102* (2013.01); *B01D 2253/306* (2013.01); *B01D 2253/311* (2013.01); *B01D 2256/245* (2013.01); *B01D 2257/504* (2013.01); *C01P 2002/54* (2013.01); *C01P 2002/72* (2013.01); *C01P 2002/82* (2013.01); *C01P 2004/03* (2013.01); *C01P 2004/04* (2013.01); *C01P 2006/12* (2013.01); *C01P 2006/14* (2013.01); *C01P 2006/40* (2013.01); *C01P 2006/90* (2013.01); *Y02C 10/08* (2013.01); *Y02E 50/346* (2013.01)

(58) Field of Classification Search
USPC ......... 252/500, 502, 510, 511; 977/895, 900
See application file for complete search history.

(56) References Cited

U.S. PATENT DOCUMENTS

| | | | |
|---|---|---|---|
| 5,186,914 A | 2/1993 | Yoshihiro et al. | |
| 5,372,619 A | 12/1994 | Greinke et al. | |
| 5,672,323 A | 9/1997 | Bhat et al. | |
| 5,726,118 A | 3/1998 | Ivey et al. | |
| 5,997,613 A | 12/1999 | Kaneko et al. | |
| 6,251,822 B1 | 6/2001 | Peng et al. | |
| 6,420,409 B1 | 7/2002 | Yamasaki et al. | |
| 6,423,193 B1 | 7/2002 | Miller et al. | |
| 6,562,110 B2 | 5/2003 | Koros et al. | |
| 7,017,757 B2 | 3/2006 | Wolff et al. | |
| 8,252,716 B2 | 8/2012 | Gadkaree et al. | |
| 8,475,687 B2 | 7/2013 | Fujii et al. | |
| 8,585,997 B2 | 11/2013 | Krishnan | |
| 8,737,038 B1 | 5/2014 | Irvin et al. | |
| 8,759,253 B2 | 6/2014 | Leede et al. | |
| 9,095,840 B2 | 8/2015 | Cannon et al. | |
| 2002/0039597 A1 | 4/2002 | Ukai et al. | |
| 2006/0033226 A1 | 2/2006 | Wang | |
| 2009/0136808 A1 | 5/2009 | Kang et al. | |
| 2010/0132549 A1 | 6/2010 | Yaghi et al. | |
| 2010/0230830 A1 | 9/2010 | Farsad et al. | |
| 2010/0292356 A1 | 11/2010 | Jung et al. | |
| 2012/0252662 A1 | 10/2012 | Assmann et al. | |
| 2014/0054550 A1 | 2/2014 | Hong et al. | |
| 2014/0073753 A1 | 3/2014 | Seferos et al. | |
| 2014/0294701 A1* | 10/2014 | Dai .................. | C08F 20/44 423/7 |
| 2015/0348666 A1 | 12/2015 | Na et al. | |
| 2016/0001260 A1 | 1/2016 | Tour et al. | |

FOREIGN PATENT DOCUMENTS

| | | |
|---|---|---|
| CN | 103395768 B | 9/2015 |
| CN | 104108708 B | 11/2015 |
| CN | 105110317 A | 12/2015 |
| CN | 104108710 B | 1/2016 |
| CN | 105217600 A | 1/2016 |
| JP | 2008509876 A | 4/2008 |
| WO | 2012098405 A1 | 7/2012 |
| WO | 2013033847 A1 | 3/2013 |
| WO | 2015029076 A1 | 3/2015 |
| WO | 2015059718 A1 | 4/2015 |
| WO | 2016032915 A1 | 3/2016 |
| WO | 2017123162 A1 | 7/2017 |
| WO | 2018187004 A1 | 10/2018 |

OTHER PUBLICATIONS

Altarawneh, S. et al. New insights into carbon dioxide interactions with benzimidazole-linked polymers. Chem. Commun. 2014, 50, 3571.

Ashourirad, B. et al. Exceptional gas adsorption properties by nitrogen-doped porous carbons derived from benzimidazole-linked polymers. Chem. Mater. 2015, 27 (4), 1349-1358.

Ashourirad, Babak. From azo-linked polymers to microporous heteroatom-doped carbons: tailored chemical and textural properties for gas separation. ACS Applied Materials & Interfaces 2016, vol. 8, 8491-8501.

Das, D. et al. Preparation of activated carbon from green coconut shell and its characterization. J. Chem. Eng. Process Technol. 2015, 6, 248.

Linares-Solan, A. et al NaOH and KOH for preparing activated carbons used in energy and environmental applications. International Journal of Energy, Environment, and Economics 20(4): 355-387, 2012.

Modak, Arindam and Bhaumik, Asim. Porous carbon derived via KOH activation of a hypercrosslinked porous organic polymer for efficient CO2, CH41 H2 adsportions and high CO2/N 2 selectivity. Journal of Solid State Chemistry. vol. 232, Dec. 2015, p. 157-162.

Ozdemira, Isilay et al. Preparation and characterization of activated carbon from grape stalk by zinc chloride activation. Fuel Processing Technology, vol. 125, Sep. 2014, p. 200-206.

Rabbani, M. G. and El-Kaderi, H. M. Synthesis and characterization of porous benzimidazole-linked polymers and their performance in small gas storage and selective uptake. Chem. Mater. 2012, 24, 1511-1517.

Wahby, A. et al. High-surface-area carbon molecular sieves for selective CO2 adsorption. ChemSusChem, 3: 974-981.

Wang, Jiacheng and Kaskel, Stefan. KOH activation of carbon-based materials for energy storage. J. Mater. Chem 2012, 22, 23710-23725.

Wang, Jiacheng et al. Fungi-based porous carbons for CO2 adsorption and separation. J. Mate. Chem. 2012, 22, 13911-13913.

Zhang, Muwei et al. Stable benzimidazole-incorporated porous polymer network for carbon capture with high efficiency and low cost. Polymer 55 (2014) 335-339.

Zhao, Yan-Chao et al. Preparation and characterization of triptycene-based microporous poly(benzimidazole) networks. J. Mater. Chem. 2012, 22, 11509.

Aijaz, Arshad; Fujiwara, Naoko; Xu, Qiang; From Metal-Organic Framework to Nitrogen-Decorated Nanoporous Carbons: High CO2 Uptake and Efficient Catalytic Oxygen Reduction. J. Am. Chem. Soc. 2014, 136, 6790-6793.

Ben, Teng et. al. Selective adsportion of carbon dioxide by carbonized porous aromatic framework (PAF). Energy Environ. Sci., 2012, 5, 8370.

Cai, Jinjun; Qi, Jingbo; Yang, Chunpeng; Zhao, Xuebo; Poly(vinylidene chloride)-Based Carbon with Ultrahigh Microporosity and Outstanding Performance for CH4 and H2 Storage and CO2 Caupture. ACS Appl. Mater. Interfaces 2014, 6, 3703-3711.

Chaikittisilp, Watcharop et. al. Nanoporous carbons through direct carbonization of a zeolitic imidazolate framework for supercapacitor electrodes. Chem. Commun. 2012, 48, 7259-7261.

(56) References Cited

OTHER PUBLICATIONS

Chandra, Vimlesh et. al. Highly selective CO2 capture on N-doped carbon produced by chemical activation of polypyrrole functionalized graphene sheets. Chem. Commun. 2012, 48, 735-737.

Chen, Guojian et. al. Direct Carbonization of Cyanopyridinium Crystalline Dicationic Salts into Nitrogen-Enriched Ultra-Microporous Carbons toward Excellent CO2 Adsorption. ACS Appl. Mater. Interfaces, 2015, 7, 18508-18518.

Chen, Li-Feng et. al. Synthesis of Nitrogen-Doped Porous Carbon Nanofibers as an Efficient Electrode Material for Supercapacitors. ACS NANO 2012, vol. 6, No. 8, 7092-7102.

Chmiola, J.; Yushin, G.' Gogotsi, Y.' Portet, C.; Simon, P.; Taberna, P. L. Anomalous Increase in Carbon Capacitance at Pore Sizes Less than 1 Nanometer. Science 2006, 313, 1760-1763.

Deng, Xiang; Zhao, Bote; Zhu, Lang; Shao, Zongping; Molten salt synthesis of nitrogen-doped carbon with hierarchical pore structures for use as high-performance electrodes in supercapacitors. Carbon, 2015, 93, 48-58.

Fuertes, A. B.; Ferrero, G. A.; Sevilla, M.; One-pot synthesis of microporous carbons highly enriched in nitrogen and their electrochemical performance. J. Mater. Chem. A, 2014, 2, 14439-14448.

Gu, Ja-Min; Kim, Wan-Seok; Hwang, Yong-Kyung; Huh, Seong; Template-free synthesis of N-doped porous carbons and their gas sorption properties. Carbon, 2013, 56, 208-217.

Hao, Guang-Ping; Li, Wen-Cui; Qian, Dan; Lu, An-Hui; Rapid Synthesis of Nitrogen-Doped Porous Carbon Monolith for CO2 Capture. Adv. Mater. 2010, 22, 853-857.

Hou, Jianhua; Cao, Chuanbao; Idrees, Faryal; Ma, Xilan; Hierarchical Porous Nitrogen-Doped Carbon Nanosheets Derived from Silk for Ultrahigh-Capacity Battery Anodes and Supercapacitors. ACS NANO 2015, vol. 9, No. 3, 2556-2564.

Hulicova-Jurcakova, Denisa; Seredych, Mykola; Lu, Gao Quing; Bandosz, Teresa J. Combined Effect of Nitrogen- and Oxygen-Containing Functional Groups of Microporous Activated Carbon on its Electrochemical Performance in Supercapacitors. Adv. Fund. Mater. 2008, 19, 438-447.

Jalilov, Almaz S. et al. Asphalt-Derived High Surface Area Activated Porous Carbons for Carbon Dioxide Capture. ACS Appl. Mater. Interfaces. 2015, 7, 1376-1382.

Lee, Doyun; Zhang, Chengyi; Wei, Chuan; Ashfeld, Brandon L.; Gao, Haifeng; Hierarchically porous materials via assembly of nitrogen-rich polymer nanoparticles for efficient and selective CO2 capture. J. Mater. Chem. A, 2013,1, 14862-14867.

Lee, Ji Hoon; Lee, Hyeon Jeong; Lim, Soo Yeon; Kim, Byung Gon; Choi, Jang Wook. Combined CO2-philicity and Ordered Mesoporosity for Highly Selective CO2 Capture at High Temperatures. J. Am. Chem. Soc. 2015, 137, 7210-7216.

Li, Lei et. al. Nitrogen-doped carbonized cotton for highly flexible supercapacitors. Carbon, 2016, 105, 260-267.

Li, Xia; Sun, Qian; Liu, Jian; Xiao, Biwei; Li, Ruying; Sun, Xueliang; Tunable porous structure of metal organic framework derived carbon and the application in lithium-sulfur batteries. Journal of Power Sources, 2016, 302, 174-179.

Liu, Bo; Shioyama, Hiroshi; Jiang, Hailong; Zhang, Xinbo; Xu, Qiang; Metal-organic framework (MOF) as a template for syntheses of nanoporous carbons as electrode materials for supercapacitor Carbon, 2010, 48, 456-463.

Nandi, Mahasweta et. al. Unprecedented CO2 uptake over highly porous N-doped activated carbon monoliths prepared by physical activation. Chem. Commun. 2012, 48, 10283-10285.

PCT/US17/30850 Search Report and Written Opinion, dated Jul. 27, 2017, 10 pages.

Presser, Volker; McDonough, John; Yeon, Sun-Hwa; Gogotsi, Yury; Effect of pore size on carbon dioxide sorption by carbide derived carbon. Energy Environ. Sci., 2011, 4, 3059.

Sevilla, Marta; Fuertes, Antonio B. Direct Synthesis of Highly Porous Interconnected Carbon Nanosheets and Their Application as High-Performance Supercapacitors. ACS NANO 2014, 8, 5, 5069-5078.

Sevilla, Marta; Fuertes, Antonio, B. A general and facile synthesis strategy towards highly porous carbons: carbonization of organic salts. J. Mater. Chem. A. 2013, 1, 13738.

Sevilla, Marta; Fuertes, Antonio; Sustainable porous carbons with a superior performance for CO2 capture. Energy Environ. Sci., 2011, 4, 1765.

Sevilla, Marta; Valle-Vigon, Patricia; Fuertes, Antonio B.; N-Doped Polypyrrole-Based Porous Carbons for CO2 Capture. Adv. Funct. Mater. 2011, 21, 2781-2787.

Shen, Wenzhong; Zhang, Shouchun; He, Yue; Li, Junfen; Fan, Weibin; Hierarchical porous polyacrylonitrile-based activated carbon fibers for CO2 capture. J. Mater. Chem. 2011, 21, 14036-14040.

Wang, Chengwei; O'Connell, Michael J.; Chan, Candace K. Facile One-Pot Synthesis of Highly Porous Carbon Foams for High-Performance Supercapacitors Using Template-Free Direct Pyrolysis. ACS Appl. Mater. Interfaces 2015, 7, 8952-8960.

Wang, Jiacheng et. al. Highly porous nitrogen-doped polyimine-based carbons with adjustable microstructures for CO2 capture. J. Mater. Chem. A, 2013, 1, 10951-10961.

Wei, Lu; Sevilla, Marta; Fuertes, Antonio B.; Mokaya, Robert; Yushin, Gleb; Hydrothermal Carbonization of Abundant Renewable Natural Organic Chemicals for High-Performance Supercapacitor Electrodes. Adv. Energy Mater. 2011, 1, 356-361.

Wei, Lu; Sevilla, Marta; Fuertes, Antonio B.; Mokaya, Robert; Yushin, Gleb; Polypyrrole-Derived Activated Carbons for High-Performance Electrical Double-Layer Capacitors with Ionic Liquid Electrolyte. Adv. Funct. Mater. 2012, 22, 827-834.

Wei, Xianjun; Jiang, Xiaoqiang; Wei, Jishi; Gao, Shuyan. Functional Groups and Pore Size Distribution Do Matter to Hierarchically Porous Carbons as High-Rate-Performance Supercapacitors. Chem. Mater. 2016, 28, 445-458.

Xia, Yongde; Mokaya, Robert; Walker, Gavin S.; Zhu, Yanqui; Superior CO2 Adsorption Capacity on N-doped High-Surface-Area, Microporous Carbons Templated from Zeolite. Adv. Energy Mater. 2011, 1, 678-683.

Xing, Wei et. al. Superior CO2 uptake of N-doped activated carbon through hydrogen-bonding interaction. Energy Environ. Sci. 2012, 5, 7323-7327.

Xu, Bin; Duan, Hui; Chu, Mo; Cao, Gaoping; Yang, Yusheng; Facile synthesis of nitrogen-doped porous carbon for supercapacitors. J. Mater. Chem. A, 2013, 1, 4565-4570.

Yang, Xiao et.al. Remarkable gas adsorption by carbonized nitrogen-rich hypercrosslinked porous organic polymers. J. Mater. Chem. A, 2014, 2, 15139-15145.

Yu, Z et al., "Molten salt synthesis of nitrogen-doped porous carbons for hydrogen sulfide adsorptive removal," Sep. 3, 2015; Carbon: vol. 95; Issue 21, pp. 852-860.

Yun, Young Soo; Im, Changbin; Park, Hyun Ho; Hwang, Imgon; Tak, Yongsug; Jin, Hyoung-Joon; Hierarchically porous carbon nanofibers containing numerous heteroatoms for supercapacitors. Journal of Power Sources 2013, 234, 285-291.

Zhang, Shiguo; Dokko, Kaoru; Watanabe, Masayoshi; Direct Synthesis of Nitrogen-Doped Carbon Materials from Protic Ionic Liquids and Protic Salts: Structural and Physicochemical Correlations between Precursor and Carbon. Chem. Mater. 2014, 26, 2915-2926.

Zhang, Wenli. et al. 3D Hierarchical Porous Carbon for Supercapacitors Prepared from Lignin through a Facile Template-Free Method. Chem. Sus. Chem. 2015, 8, 2114-2122.

Zhao, Li et. al. Nitrogen-Containing Hydrothermal Carbons with Superior Performance in Supercapacitors. Adv. Mater. 2010, 22, 5202-5206.

Zhu, Bingjun et. al. Nitrogen-enriched and hierarchically porous carbon macro-spheres—ideal for large-scale CO2 capture. J. Mater. Chem. A, 2014, 2, 5481-5489.

Zhu, Yanwu et. al. Carbon-Based Supercapacitors Produced by Activation of Graphene. Science. 2011, 332, 1537-1541.

* cited by examiner

Table 1 | Textural properties and CHNO elemental analysis of BIDCs.

| Sample | $S_{BET}$* m²g⁻¹ | $V_{Tot}$§ cm³g⁻¹ | $V_{Mic,DFT}$# cm³g⁻¹ | $V_{Tot,DFT}$# cm³g⁻¹ | $V_0$† cm³g⁻¹ | C wt% | H wt% | N wt% | O wt% | Ash wt% |
|---|---|---|---|---|---|---|---|---|---|---|
| BIDC-0.5-700 | 830 | 0.33 | 0.31 (97) | 0.32 | 0.30 | 69.8 | 1.7 | 17.6 | 10.5 | 0 |
| BIDC-1-700 | 1545 | 0.61 | 0.59 (98) | 0.60 | 0.37 | 72.0 | 1.7 | 13.7 | 12.4 | 0 |
| BIDC-2-700 | 2850 | 1.34 | 1.16 (89) | 1.31 | 0.26 | 78.3 | 0.8 | 5.7 | 15.2 | 0 |
| BIDC-3-700 | 3320 | 1.89 | 1.12 (60) | 1.86 | 0.19 | 84.0 | 0.9 | 3.1 | 10.5 | 1.7 |

*Brunauer–Emmett–Teller (BET) surface area calculated over the pressure range ($P/P_o$) which gives the best linear fitting. §Total pore volume at $P/P_o = 0.95$. #Determined by PSD assuming slit-shaped pores and QSDFT model from Ar adsorption data at 87 K; the values in parentheses are the percentage of micropores volume relative to total pore volume. †Pore volume of ultramicropores (<0.7 nm) obtained from $CO_2$ adsorption data at 273 K.

FIG. 12

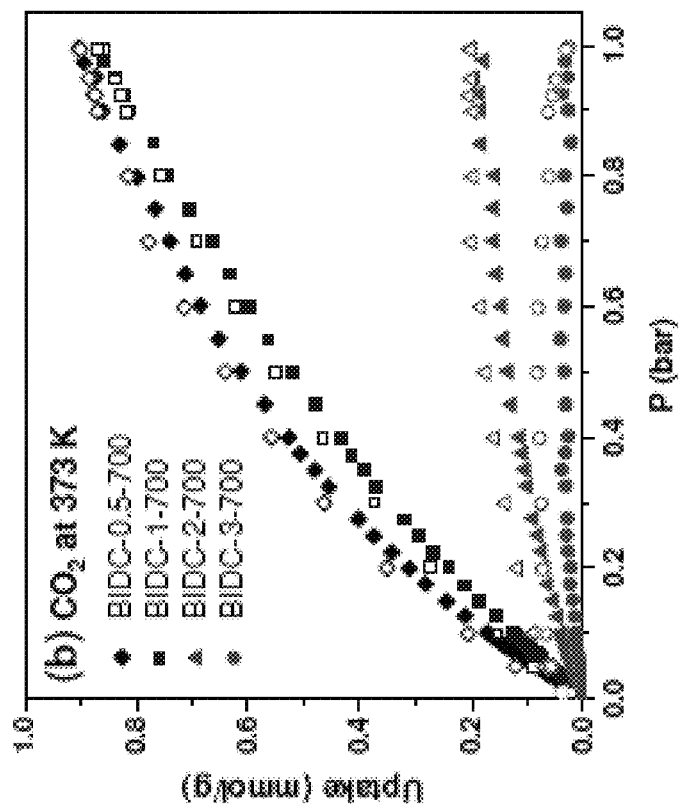
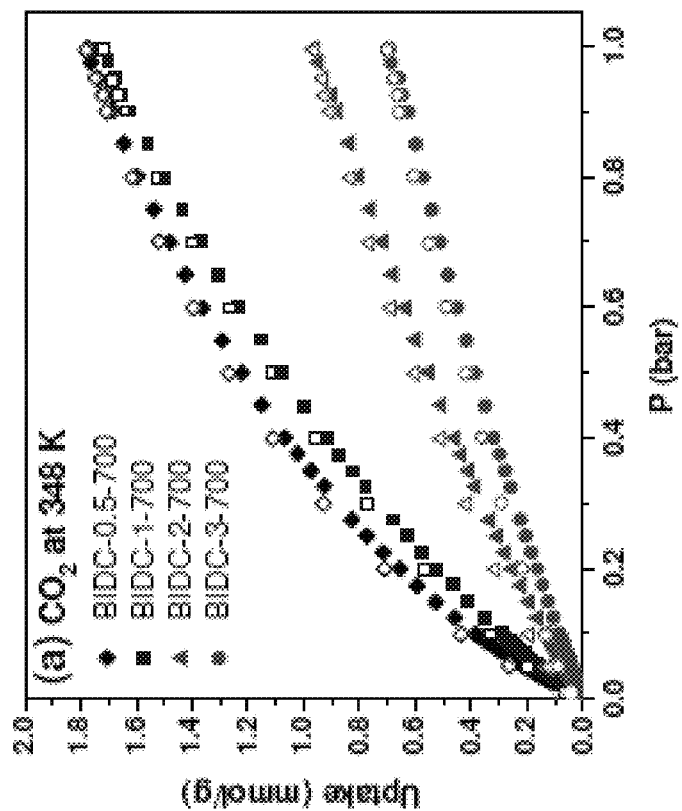
FIG. 14A
FIG. 14B

Table 2 | Uptake and Qst and Selectivity values.

| | CO$_2$ capture capacity (mmol g$^{-1}$) | | | | | | Q$_{st}$† | Selectivity (298 K) | | | |
|---|---|---|---|---|---|---|---|---|---|---|---|
| | 0.10 (0.15) bar | | | 1 bar | | | | CO$_2$/N$_2$ | | CO$_2$/CH$_4$ | |
| | 273 K | 298 K | 323 K | 273 K | 298 K | 323 K | | IS* | IAST§ | IS* | IAST# |
| BIDC-0.5-700 | 2.90 (3.48) | 1.60 (2.03) | 0.80 (1.06) | 6.41 | 4.78 | 3.08 | 35.8 | 70.4 | 58.1 | 13.2 | 12.4 |
| BIDC-1-700 | 2.60 (3.29) | 1.32 (1.75) | 0.62 (0.86) | 8.42 | 5.46 | 3.17 | 35.1 | 40.9 | 36.6 | 8.9 | 7.4 |
| BIDC-2-700 | 1.33 (1.78) | 0.67 (0.91) | 0.31 (0.44) | 6.67 | 3.90 | 2.08 | 33.1 | 19.1 | 15.8 | 5.2 | 4.2 |
| BIDC-3-700 | 0.91 (1.26) | 0.45 (0.64) | 0.22 (0.32) | 5.52 | 3.14 | 1.70 | 27.8 | 12.7 | 11.1 | 3.6 | 3.0 |

†Obtained from the CO$_2$ isotherm data at 273, 298, and 323 K using the Clasius-Clapeyron equation. *Obtained from the initial slope of adsorption isotherms at 298 K in the linear low-pressure region. §Obtained by IAST method at 298 K for the mixture of 0.1/0.9 for CO$_2$/N$_2$ at 1 bar. #Obtained by IAST method at 298 K for the mixture of 0.5/0.5 for CO$_2$/CH$_4$ at 1 bar.

FIG. 15

| | $CO_2$ capture capacity ( mmol g$^{-1}$) | | | | | |
|---|---|---|---|---|---|---|
| | 0.10 (0.15) bar | | | | 1 bar | |
| | 348 K | 373 K | | 348 K | 373 K |
| BIDC-0.5-700 | 0.38 (0.53) | 0.17 (0.25) | | 1.77 | 0.90 |
| BIDC-1-700 | 0.29 (0.41) | 0.13 (0.19) | | 1.73 | 0.86 |
| BIDC-2-700 | 0.13 (0.19) | (0.04) 0.05 | | 0.97 | 0.20 |
| BIDC-3-700 | 0.08 (0.12) | (0.01) 0.02 | | 0.69 | 0.03 |

FIG. 16

| Material | CO$_2$ uptake at 298 K | | | Q$_{st}$ | N | Selectivity at 298 K | | |
|---|---|---|---|---|---|---|---|---|
| | 1 bar | 0.15 bar | 0.10 bar | | wt% | CO$_2$/N$_2$ | CO$_2$/CH$_4$ | |
| NMC-600 | 3.90 | 1.67 | - | 38 | 6.3 | 50$^a$ | - | ref$^1$ |
| SU-MAC-500 | 4.50 | - | 1.42 | 46 | 5.8 | 39$^a$-12.4$^b$ | - | ref$^2$ |
| a-NDC-6 | 4.30 | - | 1.30* | - | 4.8 (at%) | 34.23$^a$ | - | ref$^3$ |
| IBN9-NC1-A | 4.50 | 1.75 (0.2 bar) | - | 36.1 | 12.9 | 27$^b$ | - | ref$^4$ |
| om-ph-MR | 1.77 | - | - | 32.2 | 18.2 (at%) | 76$^a$-100$^b$ | - | ref$^5$ |
| NC700 | 3.10 | 1.20* | 0.90* | 69 | 20.9 | 59$^a$ (273 K) | 11$^a$ (273 K) | ref$^6$ |
| CKHP800-2 | 4.50 | 1.60 | - | 29.0 | 0 | 43$^a$-50$^b$ | - | ref$^7$ |
| MR-1.5-500 | 3.77 | 1.29 | - | 38.5 | 8.24 | 43.7$^a$-52.9$^b$ | - | ref$^8$ |
| 500-2 | 3.50 | - | - | 32 | 11.46 | 41.6$^b$ | - | ref$^{10}$ |
| C-600 | 3.60 | 1.0 | - | 43 | 6.9 | 33$^a$ | - | ref$^{11}$ |
| ALPDCK500 | 3.80 | 1.50 | 1.20 | 37.2 | 12.1 | 62$^a$ | 11$^a$ | ref$^{11}$ |
| CPC-500 | 5.80 | 2.10 | - | 35.3 | 7.88 | 65$^a$ | 13$^a$ | ref$^{12}$ |
| a-MCN | 2.69 | - | - | 38.8 | 14.45 | 13.4$^b$ | - | ref$^{13}$ |
| BIDC-0.5-700 | 4.78 | 2.03 | 1.60 | 35.8 | 17.6 | 70.4$^a$-58.1$^b$ | 13.2$^a$-12.4$^b$ | This work |
| BIDC-1-700 | 5.46 | 1.75 | 1.32 | 35.1 | 13.7 | 40.9$^a$-36.6$^b$ | 8.9$^a$-7.4$^b$ | This work |

*Estimated by extrapolation
$a$ by initial slope method
$b$ by AIST method

FIG. 17

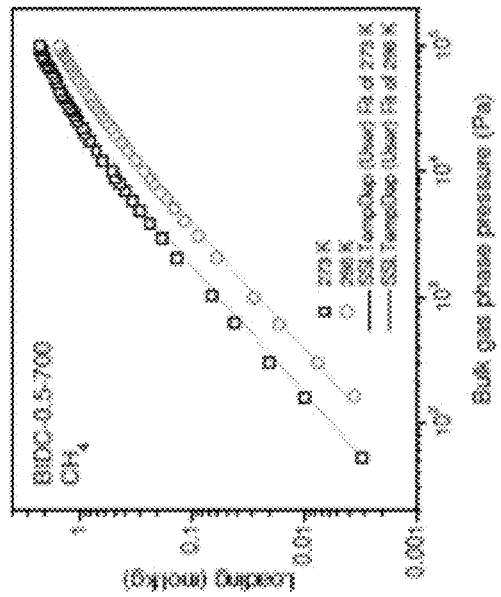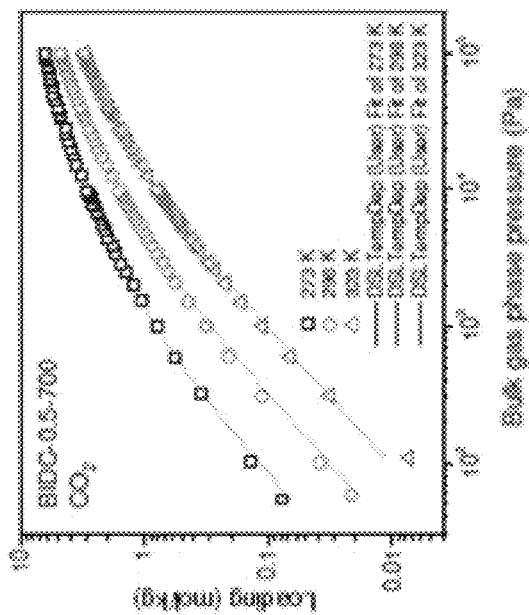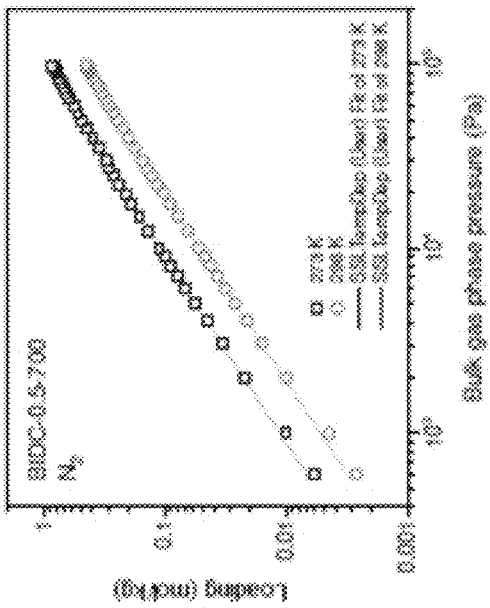
FIG. 22B
FIG. 22C
FIG. 22A

| Table 3a. Adsorbents for VSA in landfill gas (CO₂/CH₄: 50/50) separation at 298 K, $P_{ads}$ = 1 bar and $P_{des}$ = 0.1 bar. | | | | | | |
|---|---|---|---|---|---|---|
| Adsorbent | $N_1^{ads}$ | $\Delta N_1$ | % R | $\alpha_{12}^{ads}$ | S | Ref. |
| BIDC-0.5-700 | 3.80 | 2.77 | 73.1 | 12.4 | 168 | This work |
| BIDC-1-700 | 3.77 | 3.01 | 79.9 | 7.4 | 50 | This work |
| NPOF-1-NH₂ | 2.53 | 2.10 | 82.9 | 9.9 | 91 | |
| ALP-1 | 2.04 | 1.73 | 85.1 | 5.8 | 35 | |
| ALP-5 | 2.07 | 1.67 | 80.9 | 8.3 | 75 | |
| Ni-MOF-74 | 6.23 | 3.16 | 50.7 | 8.5 | 21 | 39 |
| Zeolite-13X | 3.97 | 1.97 | 49.6 | 13.2 | 19 | 39 |
| TBILP-2 | 2.20 | 1.84 | 83.7 | 7.6 | 63 | |
| BILP-12 | 2.01 | 1.71 | 85.3 | 6.0 | 34 | |
| SNU-Cl-va | 1.51 | 1.21 | 80.6 | 9.7 | 84 | |

FIG. 28A

| Table 3b. Adsorbents for VSA in flue gas (CO₂/N₂: 10/90) separation at 298 K, $P_{ads}$ = 1 bar and $P_{des}$ = 0.1 bar. | | | | | | |
|---|---|---|---|---|---|---|
| Adsorbent | $N_1^{ads}$ | $\Delta N_1$ | % R | $\alpha_{12}^{ads}$ | S | Ref. |
| BIDC-0.5-700 | 1.82 | 1.53 | 84.1 | 58 | 355 | This work |
| BIDC-1-700 | 1.38 | 1.19 | 86.4 | 37 | 134 | This work |
| Zeolite-5A | 3.5 | 2.36 | 67.0 | 62 | 163 | |
| CNA | 0.43 | 0.42 | 98.0 | 113 | 427 | |
| NPOF-1-NH₂ | 0.76 | 0.66 | 87.1 | 25 | 57 | |
| BILP-101 | 0.95 | 0.80 | 84.8 | 70 | 556 | |
| HKUST-1 | 0.62 | 0.55 | 89.0 | 20 | 46 | 39 |
| TBILP-2 | 0.67 | 0.59 | 88.3 | 42 | 192 | |
| BILP-12 | 0.55 | 0.49 | 88.7 | 27 | 73 | |
| ZIF-78 | 0.60 | 0.58 | 96.3 | 35 | 396 | 39 |
| SNU-Cl-va | 0.47 | 0.41 | 87.3 | 38 | 262 | |

FIG. 28B

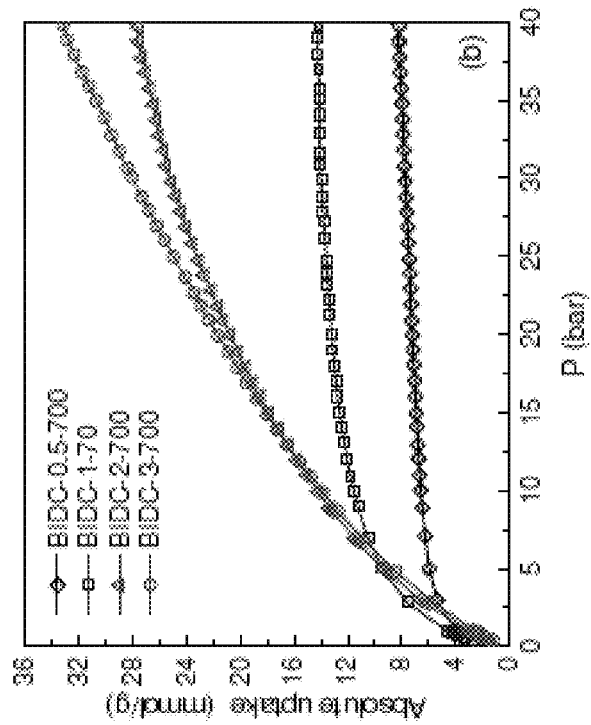
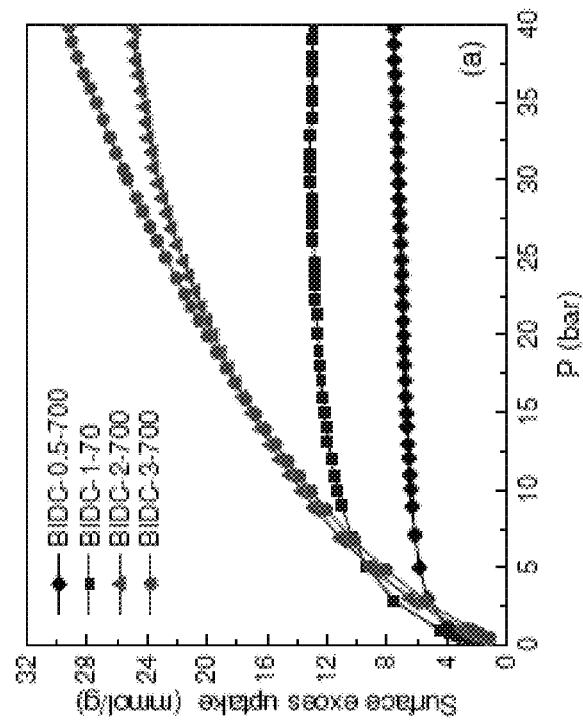
FIG. 29B
FIG. 29A

|  | $CO_2$ uptake at 30 bar and 298 K | | Pore Volume | | | |
|---|---|---|---|---|---|---|
|  | Excess mmol g$^{-1}$ | Absolute mmol g$^{-1}$ | <1.5 nm cm$^3$ g$^{-1}$ | <2.0 nm cm$^3$ g$^{-1}$ | <2.2 nm cm$^3$ g$^{-1}$ | <2.4 nm cm$^3$ g$^{-1}$ |
| BIDC-0.5-700 | 7.3 | 7.7 | 0.305 | 0.308 | 0.309 | 0.310 |
| BIDC-1-700 | 13.1 | 14.0 | 0.579 | 0.586 | 0.587 | 0.588 |
| BIDC-2-700 | 23.4 | 25.3 | 0.810 | 1.157 | 1.211 | 1.235 |
| BIDC-3-700 | 25.3 | 28.1 | 0.654 | 1.121 | 1.296 | 1.464 |

FIG. 31

Pore volumes are determined by Ar adsorption isotherms (at 87 K) and their derived PSD and cumulative pore volume curves assuming QSDFT and slit shape model

| | SA [a] ($m^2 g^{-1}$) | PV Total [b] ($cm^3 g^{-1}$) | Yield [c] (%) | C [d] (Wt.%) | H [d] (Wt.%) | N [d] (Wt.%) | O [d] (Wt.%) | $C_s$ [e] ($F g^{-1}$) |
|---|---|---|---|---|---|---|---|---|
| ZBIDC-2-700 | 525 | 0.21 | 75 | 49.7 | 1.4 | 12.7 | 7.1 | 101 |
| ZBIDC-2-800 | 750 | 0.30 | 62 | 60.0 | 1.8 | 11.2 | 8.3 | 235 |
| ZBIDC-2-900 | 855 | 0.33 | 51 | 72.9 | 0.7 | 10.0 | 8.3 | 332 |
| ZBIDC-2-1000 | 570 | 0.26 | 46 | 75.7 | 0.8 | 7.7 | 4.2 | 115 | a) Brunauer–Emmett–Teller (BET) surface area obtained from Ar isotherms at 87 K.; b) Total pore volume at $P/P_0 = 0.95$; c) Ratio of the vacuum dried carbon product to the benzimidazole precursor; d) Obtained by CHNO elemental analysis; e) Gravimetric specific capacitance calculated at 1 A $g^{-1}$ and in 1 M $H_2SO_4$.

FIG. 35

|  | Ar at 87 K | | $N_2$ at 77 K | |
| --- | --- | --- | --- | --- |
|  | SA ($m^2 g^{-1}$) | $PV_{Total}$ ($cm^3 g^{-1}$) | SA ($m^2 g^{-1}$) | $PV_{Total}$ ($cm^3 g^{-1}$) |
| ZBIDC-2-700 | 525 | 0.21 | 545 | 0.23 |
| ZBIDC-2-800 | 750 | 0.30 | 775 | 0.32 |
| ZBIDC-2-900 | 855 | 0.33 | 870 | 0.35 |
| ZBIDC-2-1000 | 570 | 0.26 | 590 | 0.27 |
| ZBIDC-1-900 | 95 | 0.02 | 100 | 0.03 |
| ZBIDC-3-900 | 825 | 0.32 | 855 | 0.35 |
| ZBIDC-4-900 | 855 | 0.34 | 880 | 0.36 |

FIG. 37

|  | XPS (At.%) | | | | | | EA (Wt.%) | | |
|---|---|---|---|---|---|---|---|---|---|
|  | C | N | O | In | Zn | Cl | C | N | H | O |
| ZBIDC-2-700 | 75.7 | 10.9 | 8.0 | 0.7 | 1.6 | 3.1 | 49.7 | 12.7 | 1.4 | 7.1 |
| ZBIDC-2-800 | 78.2 | 8.9 | 8.5 | 1.8 | 0.8 | 1.9 | 60.0 | 11.2 | 1.8 | 8.3 |
| ZBIDC-2-900 | 80.3 | 7.3 | 7.8 | 1.0 | 1.3 | 2.3 | 72.9 | 10.0 | 0.7 | 8.3 |
| ZBIDC-2-1000 | 70.7 | 5.5 | 13.3 | 6.1 | 0.7 | 3.8 | 75.7 | 7.7 | 0.8 | 4.2 |
| ZBIDC-1-900 | 78.7 | 9.0 | 7.4 | 1.4 | 0.9 | 2.7 | 60.1 | 11.0 | 1.1 | NM |
| ZBIDC-3-900 | 78.8 | 6.7 | 10.5 | 1.9 | 0.6 | 1.6 | 68.3 | 10.4 | 0.9 | NM |
| ZBIDC-4-900 | 78.1 | 7.6 | 9.3 | 2.1 | 0.8 | 2.1 | 67.2 | 10.8 | 0.9 | NM |

NM= Not measured

FIG. 38

| | N-6 (At.%) | N-5 (At.%) | N-Q (At.%) | N-X (At.%) |
|---|---|---|---|---|
| ZBIDC-2-700 | 54.6 | 36.5 | 6.2 | 2.7 |
| ZBIDC-2-800 | 44.7 | 40.0 | 7.7 | 7.6 |
| ZBIDC-2-900 | 44.3 | 38.1 | 9.7 | 7.8 |
| ZBIDC-2-1000 | 50.6 | 41.1 | 7.0 | 1.3 |

FIG. 42

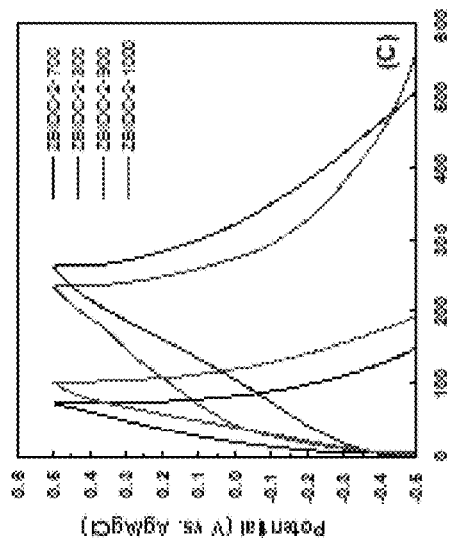
FIG. 43A
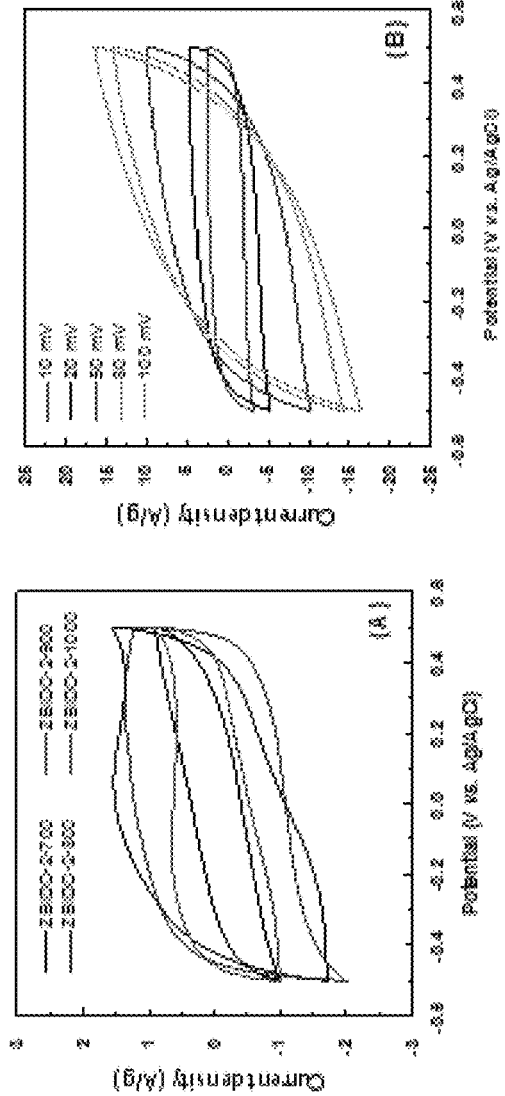
FIG. 43B
FIG. 43C
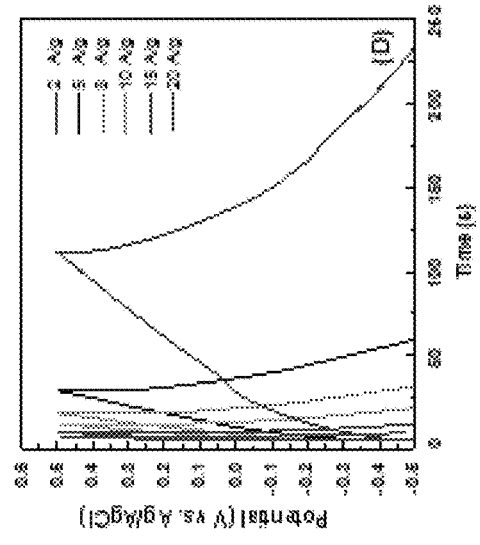
FIG. 43D
FIG. 43E
FIG. 43F

|  | $P_V<0.4$ nm cm$^3$ g$^{-1}$ | $P_V<0.5$ nm cm$^3$ g$^{-1}$ | $P_V<0.6$ nm cm$^3$ g$^{-1}$ | $P_V<0.7$ nm cm$^3$ g$^{-1}$ | $P_V<0.8$ nm cm$^3$ g$^{-1}$ | $P_V<0.9$ nm cm$^3$ g$^{-1}$ | $P_V<1.0$ nm cm$^3$ g$^{-1}$ |
|---|---|---|---|---|---|---|---|
| BIDC-0.5-700 | 0.097 | 0.178 | 0.274 | 0.298 | 0.308 | 0.323 | 0.337 |
| BIDC-1-700 | 0.071 | 0.163 | 0.314 | 0.372 | 0.415 | 0.460 | 0.489 |
| BIDC-2-700 | 0.030 | 0.077 | 0.195 | 0.256 | 0.278 | 0.342 | 0.377 |
| BIDC-3-700 | 0.012 | 0.051 | 0.142 | 0.190 | 0.233 | 0.330 | 0.408 |

FIG. 51

All data are determined by $CO_2$ adsorption isotherms (at 273 K) and their derived PSD and cumulative pore volume curves assuming NLDFT and slit shape model

| Materials | Capacitance (F g$^{-1}$) | N level (%) | Reference |
|---|---|---|---|
| CS3-6A | 388 | 3.6 | Ref [1] |
| N-RGO | 233 | 3.0 | Ref [2] |
| CIRMOF-3-950 | 213 | 3.3 | Ref [3] |
| BP-800 | 260 | 0.7 | Ref [4] |
| a-NC700 | 296 | 4.5 | Ref [5] |
| NCC-1h | 207 | 9.6 | Ref [6] |
| BAX-M | 236 | 5.9 | Ref [7] |
| Y-AN | 340 | 6.0 | Ref [8] |
| CA-GA-2 | 250 | 4.4 | Ref [9] |
| HPC3-600 | 377 | 2.7 | Ref [10] |
| ZBIDC-2-900 | 332 | 10.0 | This work |

FIG. 54

HETEROATOM-DOPED POROUS CARBONS FOR CLEAN ENERGY APPLICATIONS AND METHODS FOR THEIR SYNTHESIS

CROSS-REFERENCE TO RELATED APPLICATIONS

The present application is a National Stage application under 35 USC § 371 of International Application No. PCT/US17/30850, filed May 3, 2017, which application relies on the disclosure of and claims priority to and the benefit of the filing date of U.S. Provisional Application No. 62/331,243, filed May 3, 2016 the disclosures of each of which are hereby incorporated by reference herein in their entireties.

STATEMENT OF GOVERNMENT INTEREST

This invention was made with government support under Grant Number DE-SC0002576 awarded by the U.S. Department of Energy (DOE). The government has certain rights in the invention.

BACKGROUND OF THE INVENTION

Field of the Invention

The present invention relates to heteroatom doped porous carbon materials with superior gas storage and electrochemical performance, as well as to methods for their synthesis.

Description of Related Art

Fossil fuels continue to be the world's primary source of energy especially for electricity production and transportation. This trend is expected to continue for upcoming decades promoted by inexpensive prices, accessibility, and well-established technologies of production and use of fossil fuels. Despite these multifaceted advantages, carbon dioxide ($CO_2$) release to the atmosphere from fossil fuel combustion has devastating effects on the environment because of its greenhouse nature. The $CO_2$ levels in the atmosphere has been increasing steadily and if continued would threaten ecosystems. While alternative carbon-free energy sources (e.g., solar, wind, hydrogen, etc.) are being explored, $CO_2$ capture becomes essential to stabilize its level in the atmosphere. The state-of-the-art technology for $CO_2$ capture from flue gas, exhaust gas from coal burning, involves aqueous amine solutions such as MOA (30% in water) that enable $CO_2$ capture by chemisorption. Upon saturation, amine solutions are regenerated by applying heat to liberate $CO_2$ and as such the process suffers from large energy consummation as well as volatility and toxicity of the amine solutions (see Rochelle G T. Amine scrubbing for $CO_2$ capture. *Science* 325, 1652-1654 (2009)). To circumvent these issues, $CO_2$ capture by physisorption using porous materials like metal-organic frameworks (MOFs), (see Xiang S, et al. Microporous metal-organic framework with potential for carbon dioxide capture at ambient conditions. *Nat Commun* 3, 954 (2012)) porous organic polymers (POPs) (see Mohanty P, Kull L D, Landskron K. Porous covalent electron-rich organonitridic frameworks as highly selective sorbents for methane and carbon dioxide. *Nat Commun* 2, 401 (2011)) and porous carbons received immense interest. Unlike chemisorption, physisorption of $CO_2$ by porous adsorbents enables regeneration of adsorbents with applying minimum heat. However, the moderate $CO_2$/adsorbent interactions can compromise $CO_2$ selective bonding and storage capacity.

Further, the explosive growth of global energy demand and consumption over the last decade has posed an imminent threat to future generations. Currently, the power network stability is managed through balancing the load of fossil fuel plants. To reduce reliance on fossil fuel and $CO_2$ emissions, effective utilization of clean renewable energy should be regarded as an absolute necessity (see X. Luo, J. Wang, M. Dooner, J. Clarke, *Appl. Energy* 2015, 137, 511). However, the intermittent nature of the most renewable energy sources such as wind and solar is a major challenge for maintaining a stable power flow. In this context, the development of various types of storage devices with the ability to store/release energy is imperative. The use of electrochemical supercapacitors as promising energy storage devices have drawn immense attention due to their high power density, fast charge/discharge rate, long cycle lifetime, and wide operating temperatures (see J. R. Miller, P. Simon, *Science* 2008, 321, 65).

According to the energy storage mechanism, supercapacitors can be classified as electrical double layer capacitors (EDLCs) and pseudocapacitors. EDLCs store energy based on charge accumulation along the double layer formed at the electrode-electrolyte interface while pseudocapacitors store energy through reversible Faradaic redox reactions at the surface of electrode materials (see A. Burke, *J. Power Sources* 2000, 91, 37; and P. Simon, Y. Gogotsi, *Nat Mater* 2008, 7, 845).

Activated carbons (ACs) are predominantly used as the electrode materials for commercial EDLCs due to their large surface area and adequate pore size, which are basic requirements for creating accessible paths for ionic transport and double layer formation (see E. Frackowiak, F. Béguin, *Carbon* 2001, 39, 937; and M. Sevilla, R. Mokaya, *Energy Environ. Sci.* 2014, 7, 1250). Additionally, ACs feature exceptional properties such as high electronic conductivity, excellent physiochemical stability, wide availability of raw materials, easy manufacturing processes and controllable surface chemistry (see F. Béguin, V. Presser, A. Balducci, E. Frackowiak, *Adv. Mater.* 2014, 26, 2219; and Y. Zhai, Y. Dou, D. Zhao, P. F. Fulvio, R. T. Mayes, S. Dai, *Adv. Mater.* 2011, 23, 4828).

The latter feature is of particular importance because the electronic distribution of plain carbons can be positively modified by the incorporation of heteroatom species (see J. P. Paraknowitsch, A. Thomas, *Energy Environ. Sci.* 2013, 6, 2839). For instance, the oxygen functionalities usually found on the surface of activated carbons generally feature acidic aspects and as such promote electron-acceptor behavior. On the contrary, the basic nature of nitrogen surface groups endows the carbon framework with electron-donor characteristics (see H. Liu, H. Song, X. Chen, S. Zhang, J. Zhou, Z. Ma, *J. Power Sources* 2015, 285, 303). Among all heteroatoms, nitrogen is the most frequently studied dopant due to its versatility, availability and ease of incorporation methods into the carbon backbone (see W. Shen, W. Fan, *J. Mater. Chem. A* 2013, 1, 999). It has been shown that nitrogen incorporation gives rise to the overall capacitance through inducing pseudocapacitance with Faradaic reactions as well as enhancing the wettability (towards aqueous electrolytes) and electron conductivity of carbon-based electrodes (see D. Hulicova-Jurcakova, M. Kodama, S. Shiraishi, H. Hatori, Z. H. Zhu, G. Q. Lu, *Adv. Funct. Mater.* 2009, 19, 1800). Thus, nitrogen-doped porous carbons (NDPCs) are promising candidates for energy storage applications.

Activated carbons have gained great attention in recent years as gas storage/separations sorbents as well as energy storage applications such as oxygen reduction reaction (ORR) catalysts and supercapacitor electrodes (see Liang H-W, Zhuang X, Brüller S, Feng X, Müllen K. Hierarchically porous carbons with optimized nitrogen doping as highly active electrocatalysts for oxygen reduction. *Nat Commun* 5, (2014); Hao G-P, et al. Structurally Designed Synthesis of Mechanically Stable Poly(benzoxazine-co-resol)-Based Porous Carbon Monoliths and Their Application as High-Performance $CO_2$ Capture Sorbents. *J Am Chem Soc* 133, 11378-11388 (2011); Raymundo-Piñer E, Cazorla-Amorós D, Salinas-Martinez de Lecea C, Linares-Solano A. Factors controlling the SO2 removal by porous carbons: relevance of the SO2 oxidation step. *Carbon* 38, 335-344 (2000); Wang H, Gao Q, Hu J. High Hydrogen Storage Capacity of Porous Carbons Prepared by Using Activated Carbon. *J Am Chem Soc* 131, 7016-7022 (2009); Zhai Y, Dou Y, Zhao D, Fulvio P F, Mayes R T, Dai S. Carbon Materials for Chemical Capacitive Energy Storage. *Adv Mater* 23, 4828-4850 (2011); Zheng Y, Jiao Y, Jaroniec M, Jin Y, Qiao S Z. Nanostructured Metal-Free Electrochemical Catalysts for Highly Efficient Oxygen Reduction. *Small* 8, 3550-3566 (2012); and Thou J, et al. Ultrahigh volumetric capacitance and cyclic stability of fluorine and nitrogen co-doped carbon microspheres. *Nat Commun* 6, (2015)). Compared to POPs, MOFs and zeolites/silica materials, activated carbons feature lightweight, thermal, physiochemical stability as well as adjustable textural properties. More interestingly, sole heteroatom such as nitrogen, boron, oxygen and sulfur or a combination of them can be doped into their structure to tune desirable properties (see Paraknowitsch J P, Thomas A. Doping carbons beyond nitrogen: an overview of advanced heteroatom doped carbons with boron, sulfur and phosphorus for energy applications. *Energy Environ Sci* 6, 2839-2855 (2013)). For $CO_2$ capture, N-doped carbons are the most investigated materials because nitrogen induces basicity and charge delocalization into carbon frameworks and hence enhances selective $CO_2$ uptake (see Rabbani M G, Sekizkardes A K, Kahveci Z, Reich T E, Ding R, El-Kaderi H M. A 2D mesoporous imine-linked covalent organic framework for high pressure gas storage applications. *Chemistry* 19, 3324-3328 (2013)). The most common approach for nitrogen incorporation involves carbonization of N-containing polymers or post-synthesis modification of carbons with a nitrogen source. The later however necessitates high temperature, corrosive materials, and complicated synthetic steps (see Pevida C, Drage T C, Snape C E. Silica-templated melamine-formaldehyde resin derived adsorbents for $CO_2$ capture. *Carbon* 46, 1464-1474 (2008)). Therefore, the use of single source precursors for simultaneous porous carbon synthesis and doping with desired heteroatoms like N, O, S, etc. is more desirable. For example, the use of porous materials such as POPs, MOFs, or biomasses as single source precursor for heteroatom-doped carbon was documented in recent literature. However, POPs and MOFs synthesis typically involves vigorous reaction conditions (e.g., toxic organic solvents and chemicals) and multistep synthetic routes (see Paraknowitsch J P, Thomas A, Schmidt J. Microporous sulfur-doped carbon from thienyl-based polymer network precursors. *Chem Commun* 47, 8283-8285 (2011); Ashourirad B, Sekizkardes A K, Altarawneh S, El-Kaderi H M. Exceptional Gas Adsorption Properties by Nitrogen-Doped Porous Carbons Derived from Benzimidazole-Linked Polymers. *Chem Mater* 27, 1349-1358 (2015); and Wang J, et al. Highly porous nitrogen-doped polyimine-based carbons with adjustable microstructures for $CO_2$ capture. *J Mater Chem A* 1, 10951-10961 (2013)). On the other hand, biomasses also demand multistep preparation such as cleaning, drying, grounding and pre-carbonization and/or stabilization prior to use (see Sevilla M, Fuertes A B. $CO_2$ adsorption by activated templated carbons. *J Colloid Interface Sci* 366, 147-154 (2012); and Wang J, Heerwig A, Lohe M R, Oschatz M, Borchardt L, Kaskel S. Fungi-based porous carbons for $CO_2$ adsorption and separation. *J Mater Chem* 22, 13911-13913 (2012)). The recently established methods based on the decomposition of ionic liquid (see Paraknowitsch J P, Zhang J, Su D, Thomas A, Antonietti M. Ionic liquids as precursors for nitrogen-doped graphitic carbon. *Adv Mater* 22, 87-92 (2010)) and organic salts (see Sevilla M, Parra J B, Fuertes A B. Assessment of the Role of Micropore Size and N-Doping in $CO_2$ Capture by Porous Carbons. *ACS Appl Mater Interfaces* 5, 6360-6368 (2013)) have overcome these drawbacks but controlling the porous structure and scalability of the final products remain major challenges. Therefore, viable synthetic strategies for heteroatom-doped carbons that enable control over textural property and chemical composition would be advantageous for clean energy applications.

By way of background, general efforts in this area include those described in U.S. Pat. Nos. 9,095,840; 8,759,253; 8,585,997; 8,475,687; 8,252,716; 7,017,757; 6,423,193; 6,251,822; 5,997,613; 5,726,118; 5,672,323; 5,372,619; 5,186,914; 4,584,405; U.S. Patent Application Publication Nos. US20150348666A1 and US20060033226A; Chinese Patent Application Nos. CN105110317A, CN101885485A, and CN105217600A; Chinese Patent Nos. CN104108710B, CN104108708B, and CN103395768B; as well as non-patent literature (see Babak Ashourirad, et al. *ACS Appl. Mater. Interfaces*, 8, 8491-8501 (2016)). However, as with any art there remains a need for improvements.

SUMMARY OF THE INVENTION

Embodiments of the invention provide methods for a facile, template free and one-step synthesis of nanoporous carbons by using a heterocyclic aromatic organic compound as a single source precursor of both carbon and nitrogen. According to embodiments, the heterocyclic aromatic organic compound contains nitrogen in pyrrolic and/or pyridinic positions. In embodiments, the heterocyclic organic compound is chemically activated with KOH, NaOH, or $ZnCl_2$ at high temperatures in a solid state mixture as a synthesis protocol to promote fine micropores during carbonization. Further embodiments include nanoporous carbons synthesized by methods of the invention. The nanoporous carbons resulting from the methods of the invention have superior gas sorption/storage and energy storage properties.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

showing neutralization of the organic building block by basic KOH and conversion to porous carbon by excess amount of KOH.

Figure 2A:
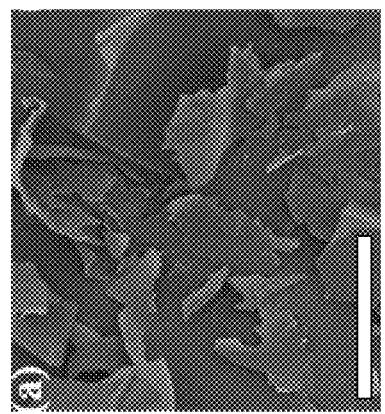

FIG. 2A is a scanning electron microscopy (SEM) image of BIDC-1-700. Scale bar 100 μm.

Figure 2B:
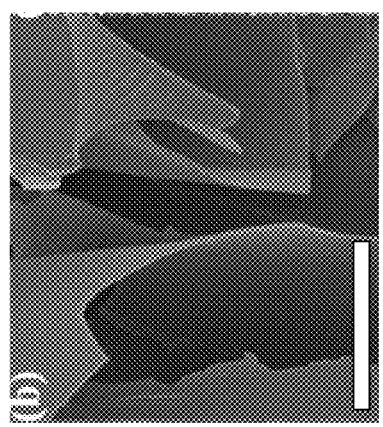

FIG. 2B is an SEM image of BIDC-2-700. Scale bar 20 μm.

Figure 2C:
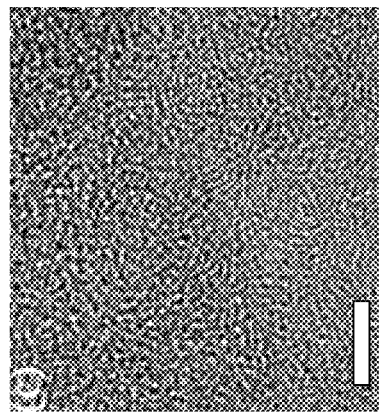

FIG. 2C is a high resolution transmission electron microscopy (HRTEM) image of BIDC-2-700. Scale bar 5 nm.

Figure 2D:
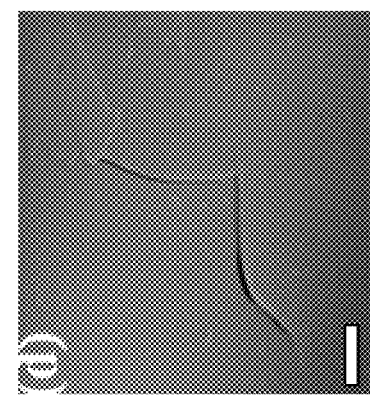

FIG. 2D is an SEM image of BIDC-0.5-700.

Figure 2E:
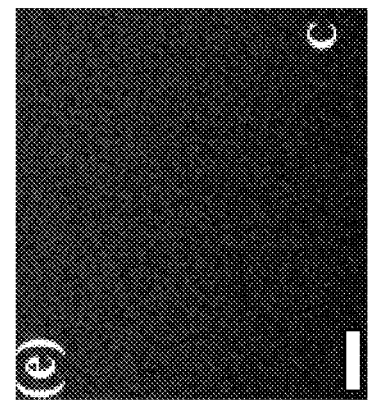
Figure 2F:
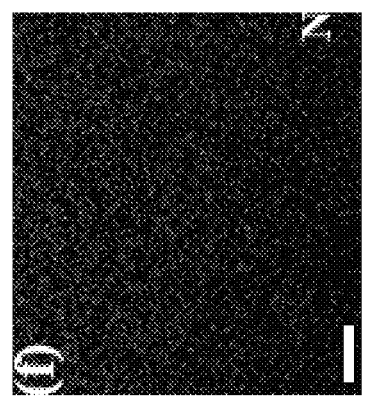
Figure 2G:
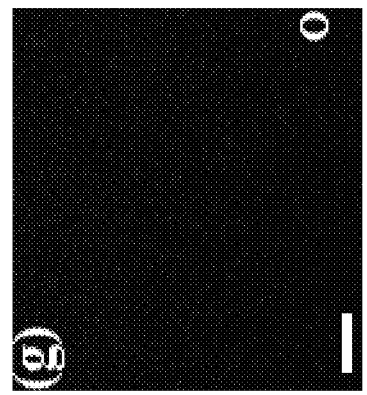

FIGS. 2E-G are the SEM image of FIG. 2D showing the corresponding EDS elemental mappings of carbon (red) (FIG. 2E); nitrogen (green) (FIG. 2F); and oxygen (blue) (FIG. 2G).

Figure 3:
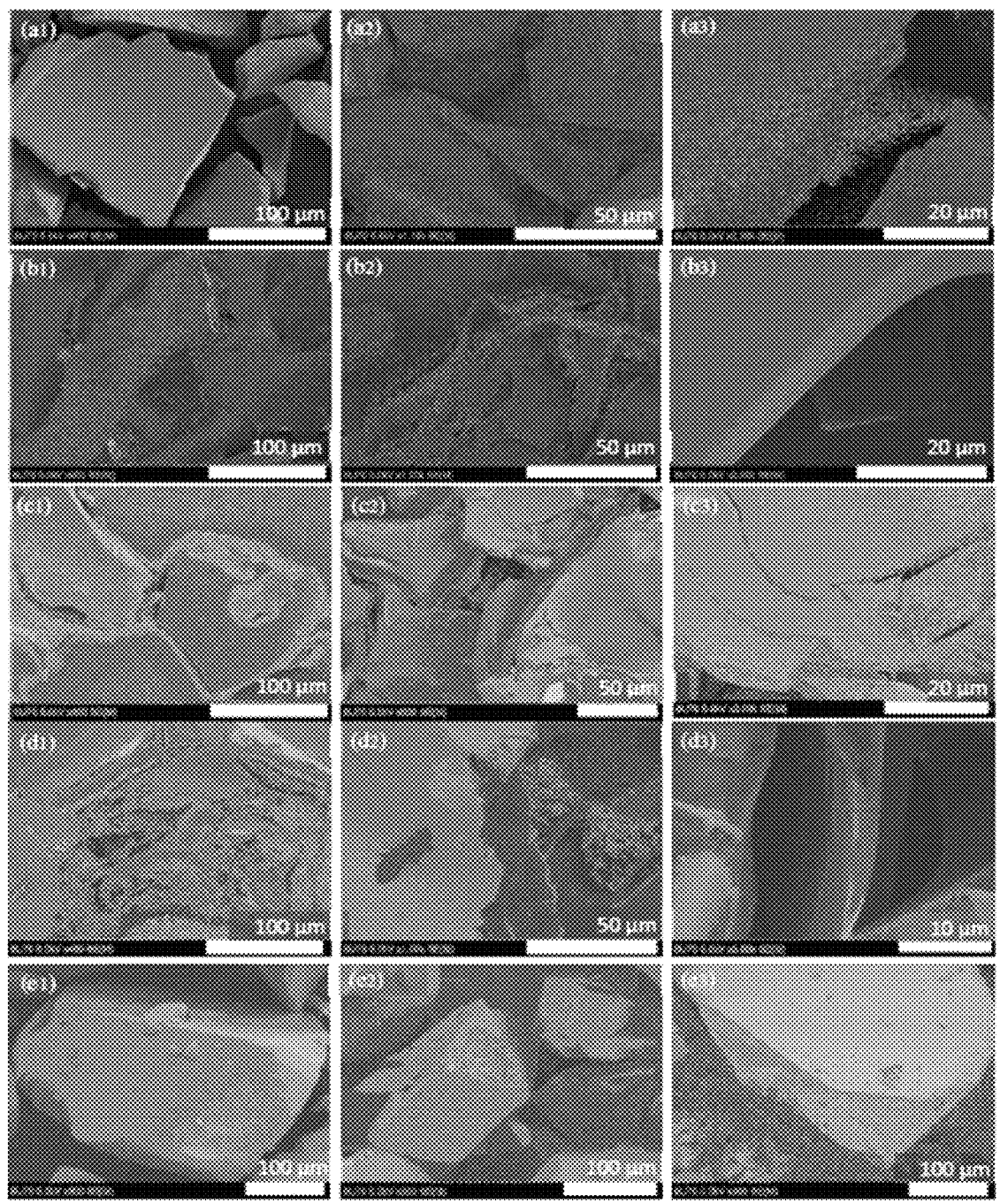

FIG. 3 is a series of SEM images of BIDCs at various magnifications: BIDC-0.5-700 (a1-a3); BIDC-1-700 (b1-b3); BIDC-2-700 (c1-c3); BIDC-3-700 (d1-d3) and BI (f1-f3).

Figure 4A:
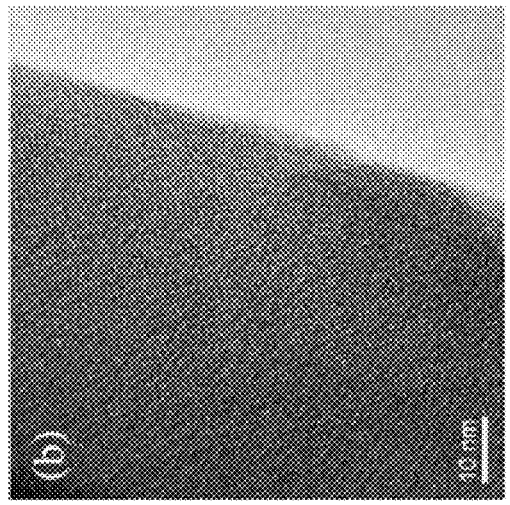
Figure 4B:
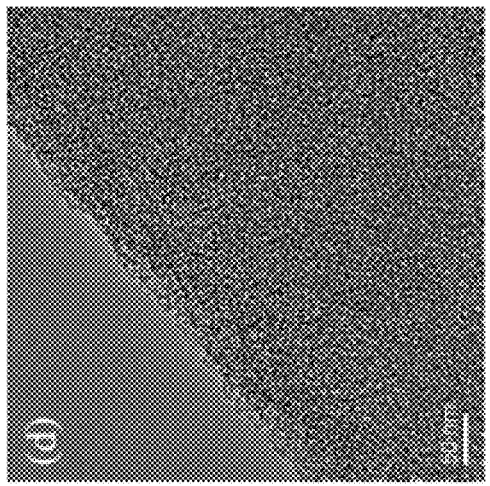
Figure 4C:
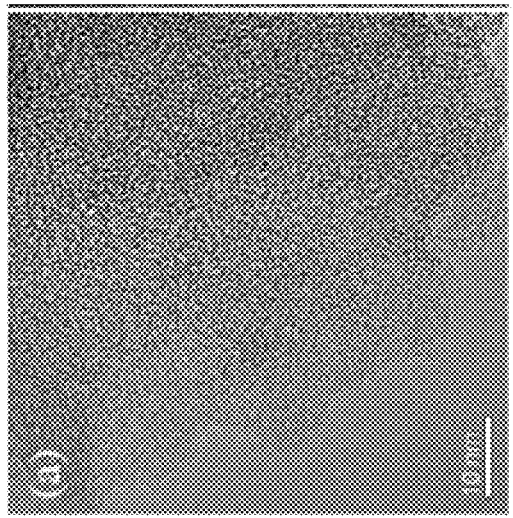
Figure 4D:
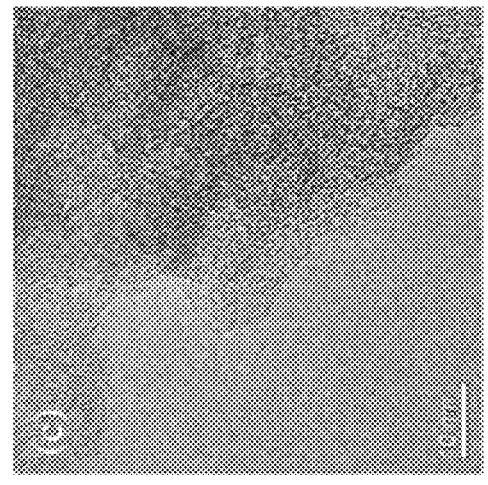

FIGS. 4A-4D are TEM images of BIDCs at various magnifications: BIDC-0.5-700 (FIG. 4A), BIDC-1-700 (FIG. 4B), BIDC-2-700 (FIG. 4C) and BIDC-3-700 (FIG. 4D).

Figure 5:
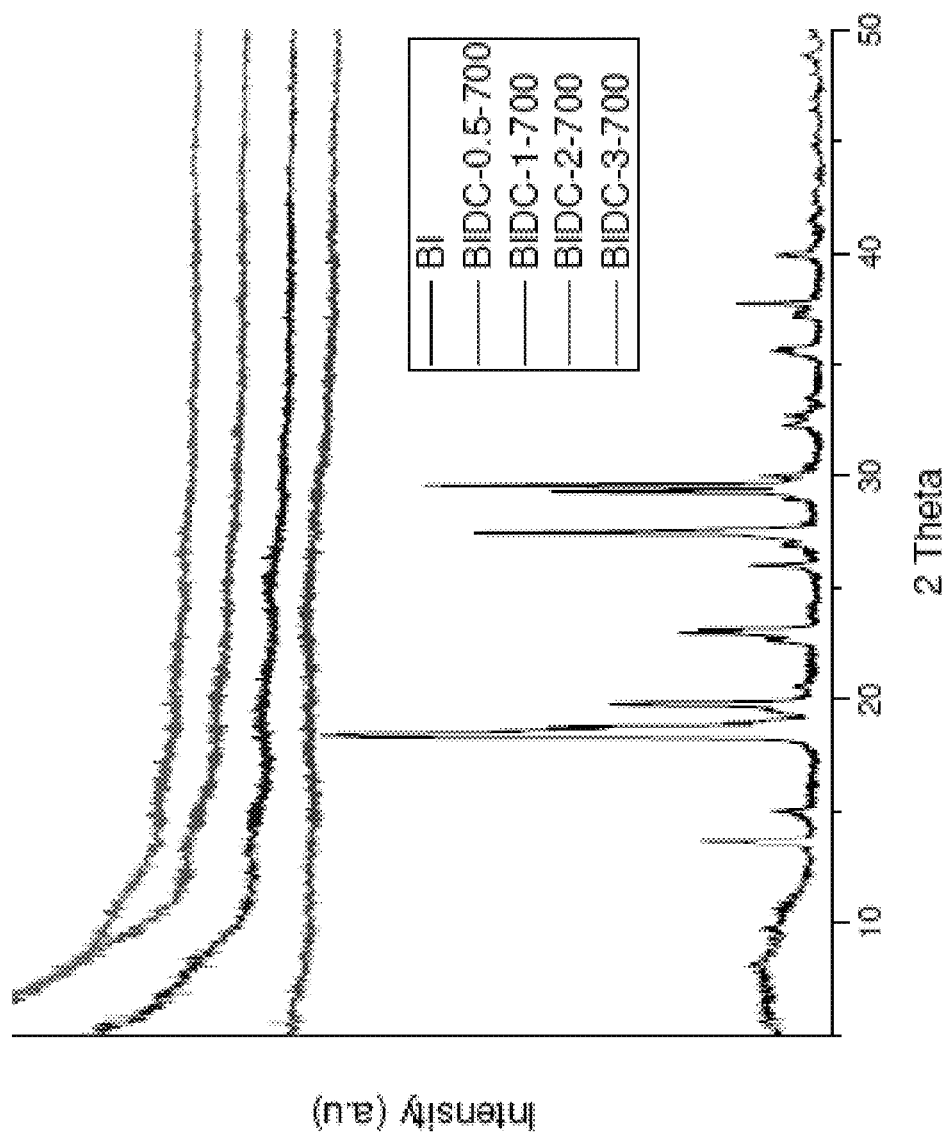

FIG. 5 is a graph showing XRD patterns of BIDCs and BI precursor.

Figure 6:
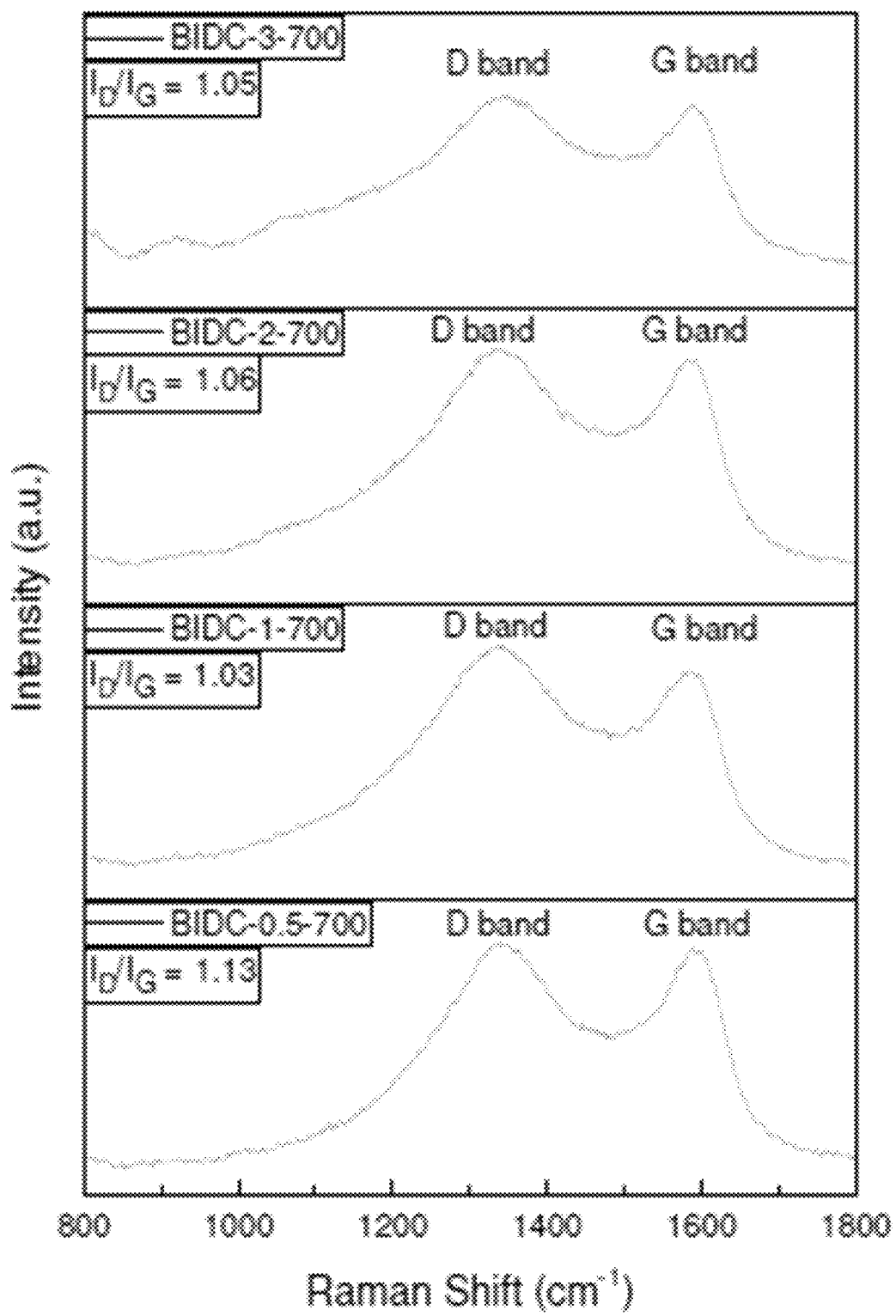

FIG. 6 is a series of graphs showing Raman spectra for BIDCs.

Figure 7:
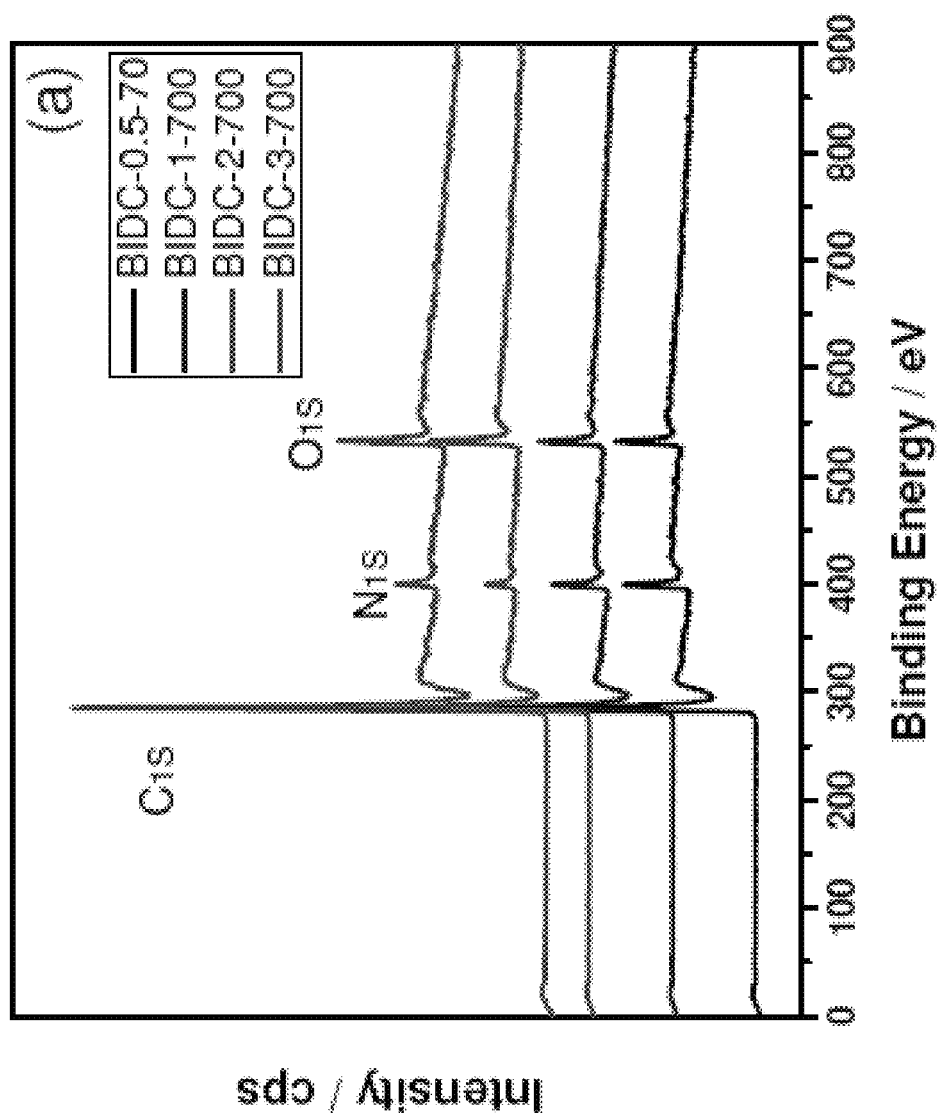

FIG. 7 is a graph showing X-ray photoelectron spectroscopy (XPS) survey spectra of BIDCs.

Figure 8:
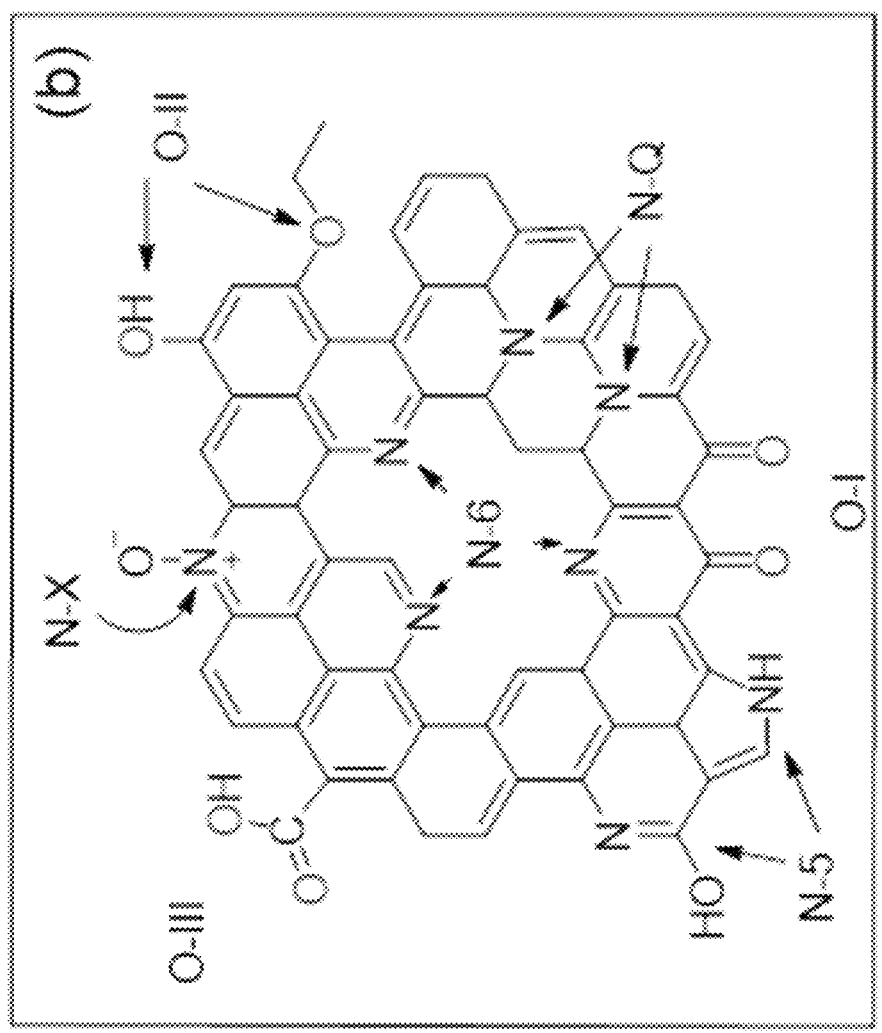

FIG. 8 is a schematic illustration of various nitrogen and oxygen functionalities on a typical porous carbon.

Figure 9A:
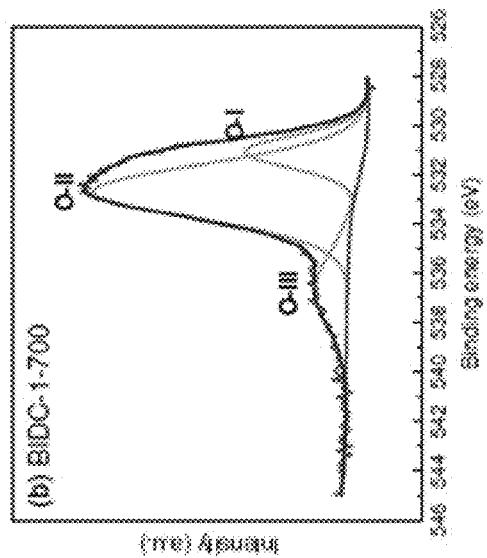
Figure 9B:
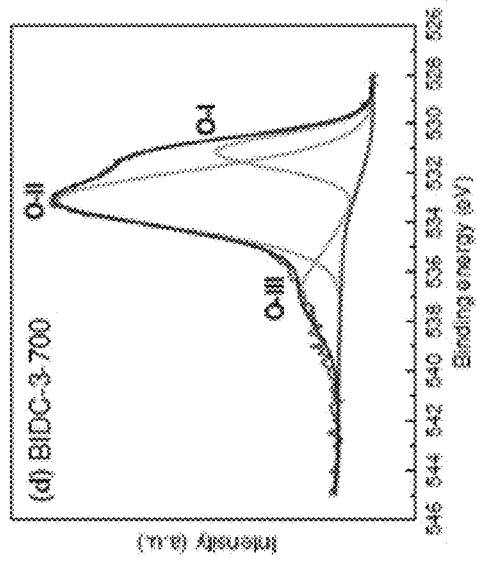
Figure 9C:
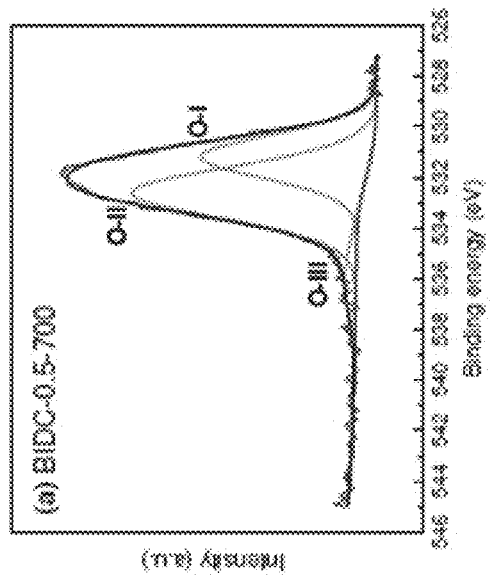
Figure 9D:
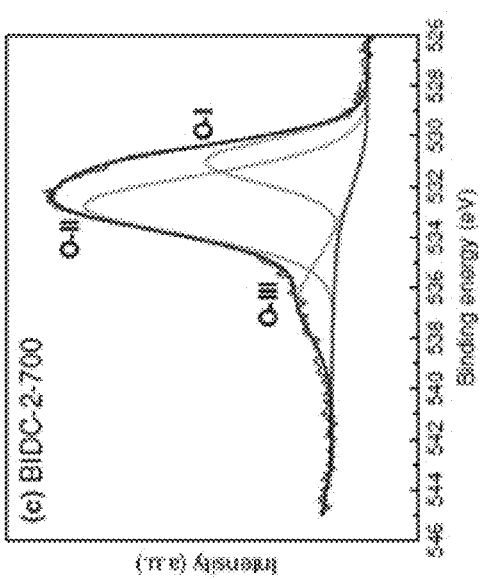

FIGS. 9A-D are graphs showing high resolution deconvoluted O 1 s spectra for BIDC-0.5-700 (FIG. 9A), BIDC-1-700 (FIG. 9B), BIDC-2-700 (FIG. 9C), and BIDC-3-700 (FIG. 9D).

Figure 10A:
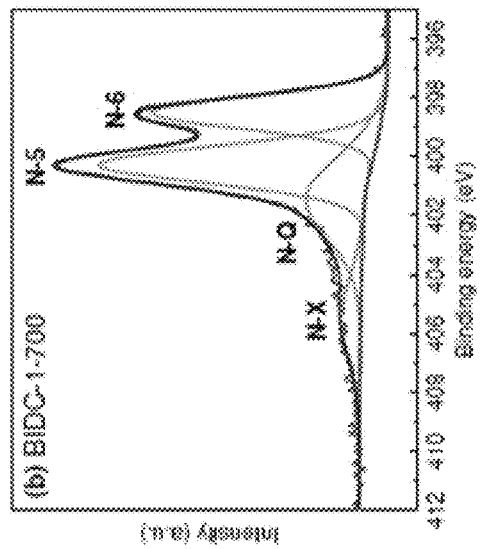
Figure 10B:
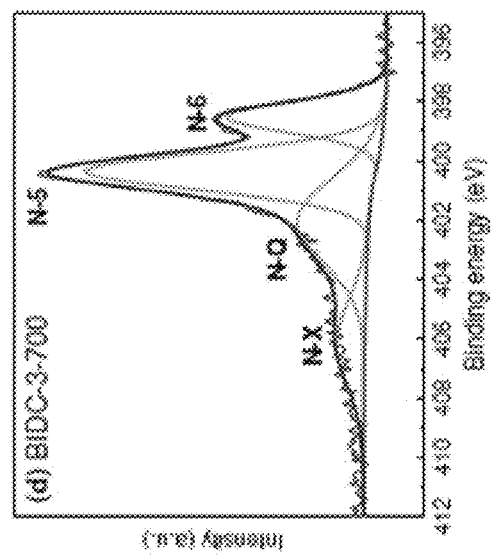
Figure 10C:
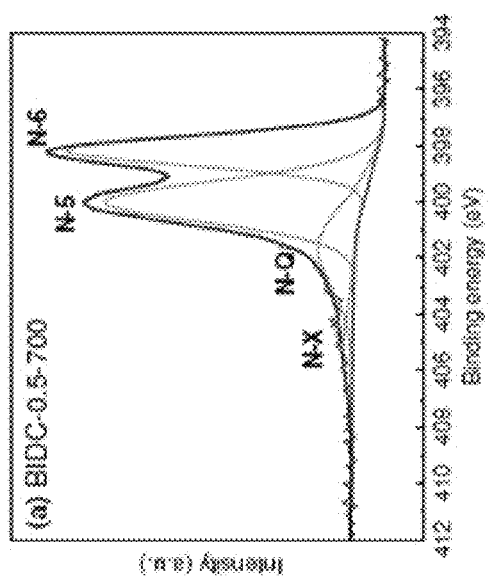
Figure 10D:
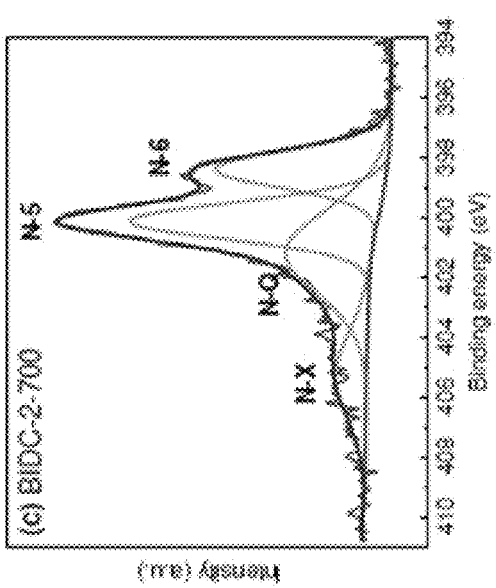

FIG. 10A-D are graphs showing high resolution deconvoluted N 1 s spectra for BIDC-0.5-700 (FIG. 10A), BIDC-1-700 (FIG. 10B), BIDC-2-700 (FIG. 10C) and BIDC-3-700 (FIG. 10D).

Figure 11B:
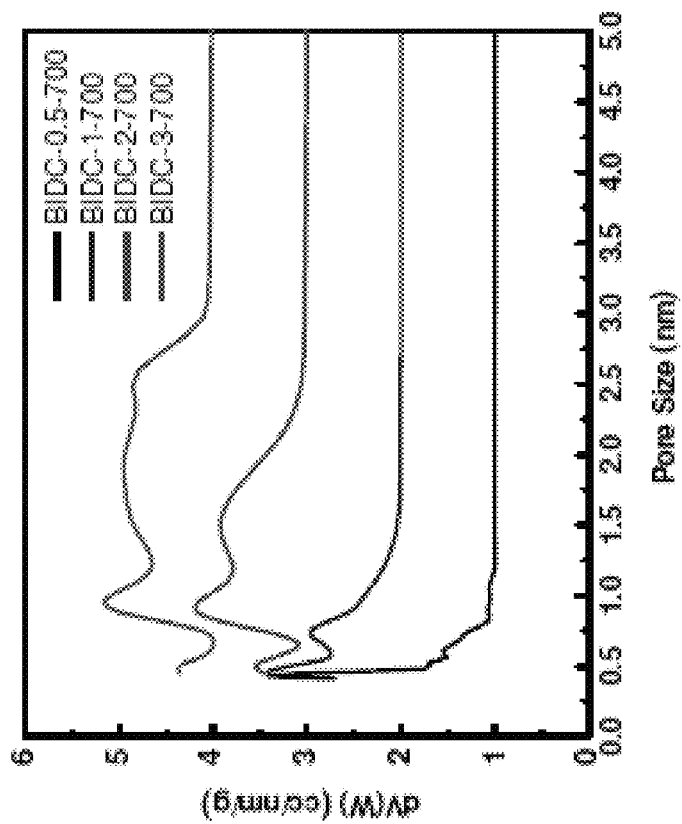
Figure 11A:
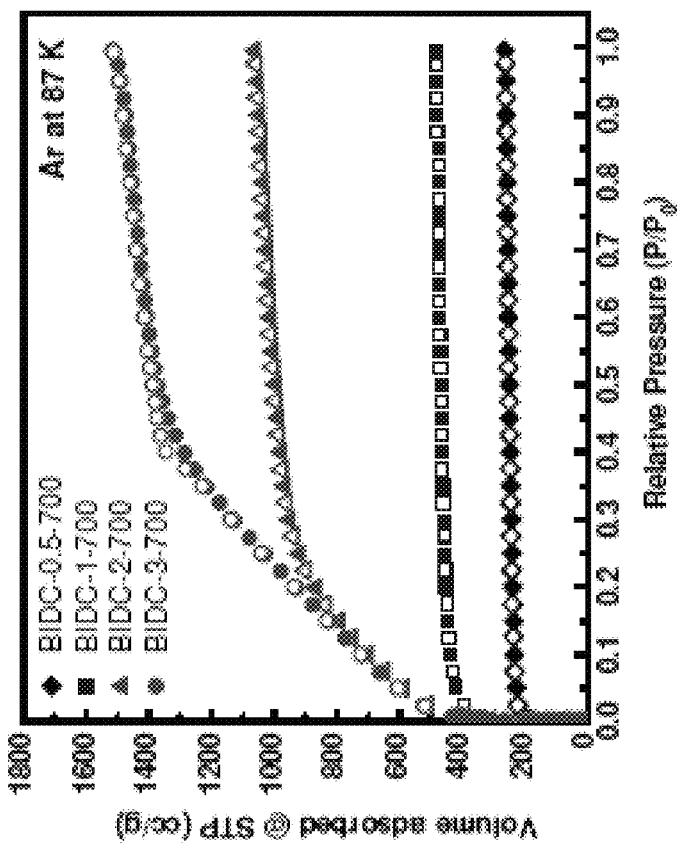

FIGS. 11A and 11B are graphs showing porosity measurements for BIDCs with FIG. 11A showing argon sorption isotherm of BIDCs at 87 K (Solid symbols for adsorption and empty symbols for desorption) and FIG. 11B showing pore size distribution from QSDFT using Ar at 87 K isotherms (For clarity, PSD curves are offset in steps of 1).

FIG. 12 is a table showing textural properties and CHNO elemental analysis of BIDCs.

Figure 13A:
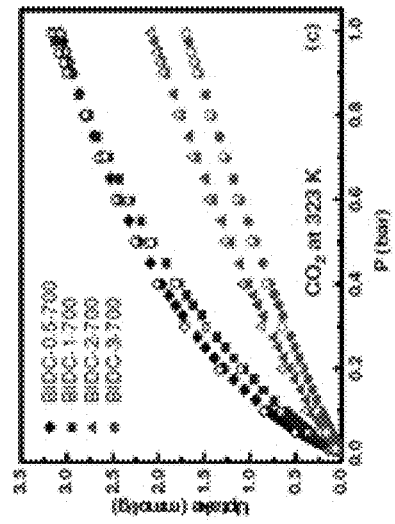
Figure 13B:
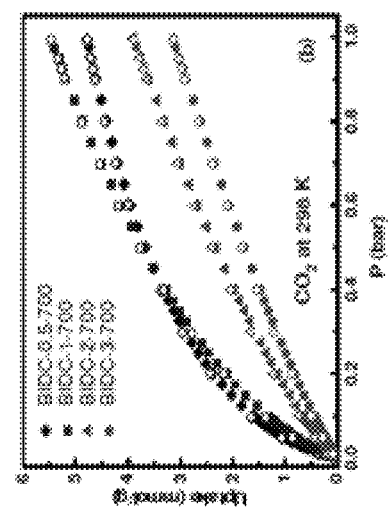
Figure 13C:
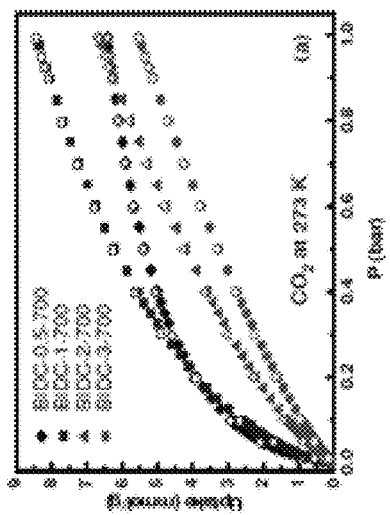
Figure 13D:
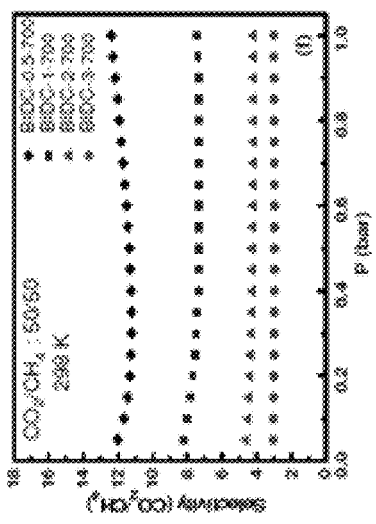
Figure 13E:
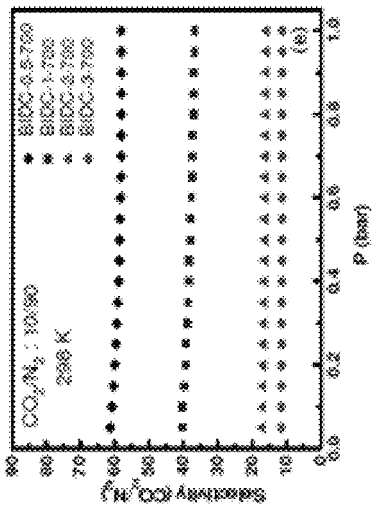
Figure 13F:
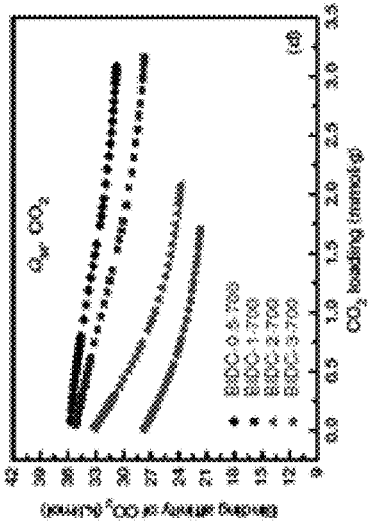
Figure 18A:
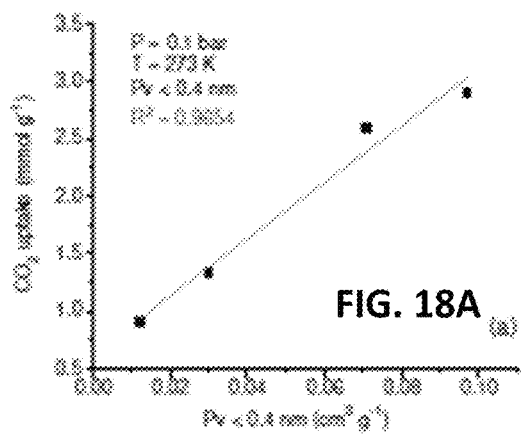
Figure 18B:
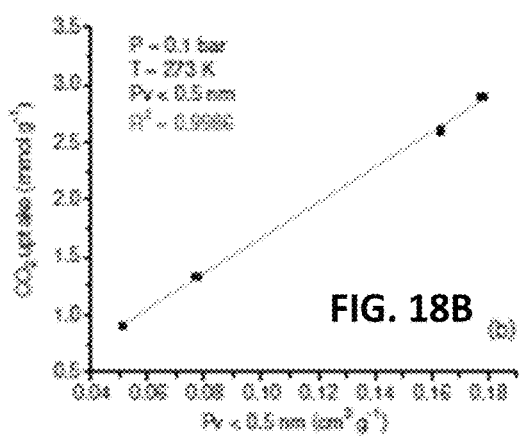
Figure 18C:
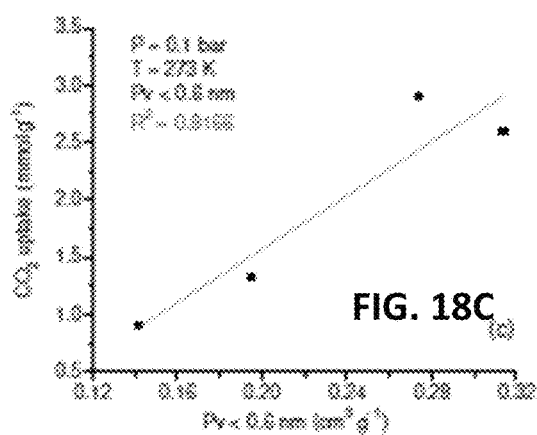
Figure 18D:
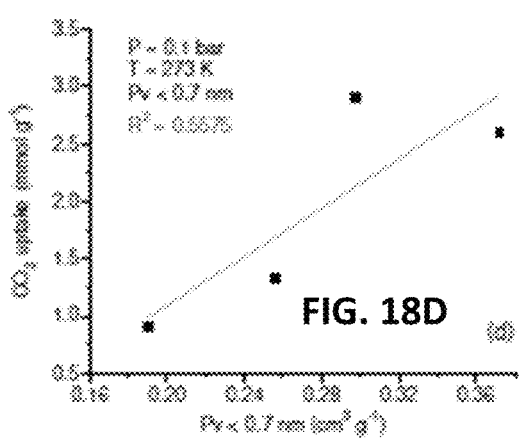
Figure 18E:
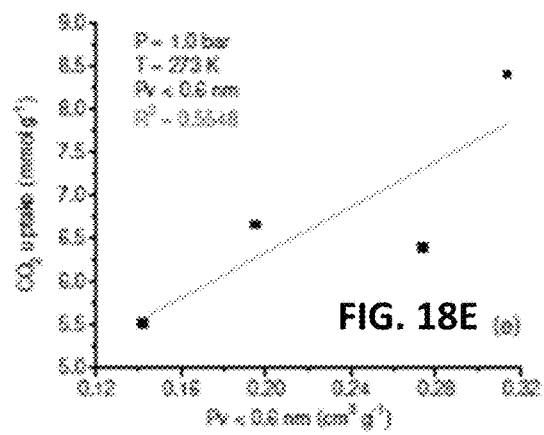
Figure 18F:
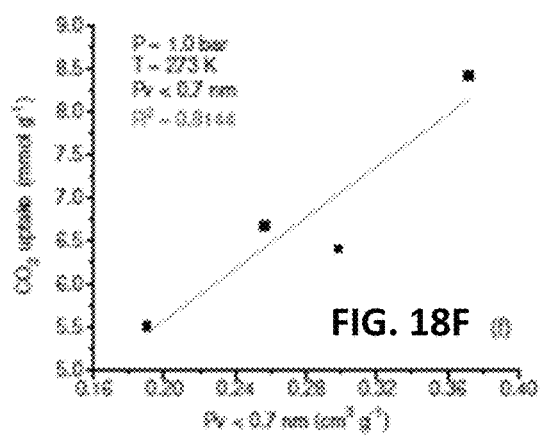
Figure 18G:
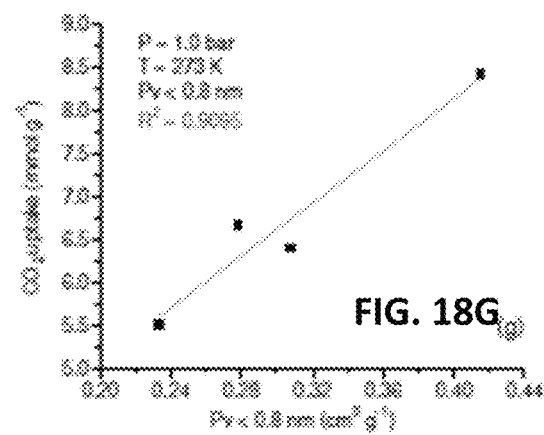
Figure 18H:
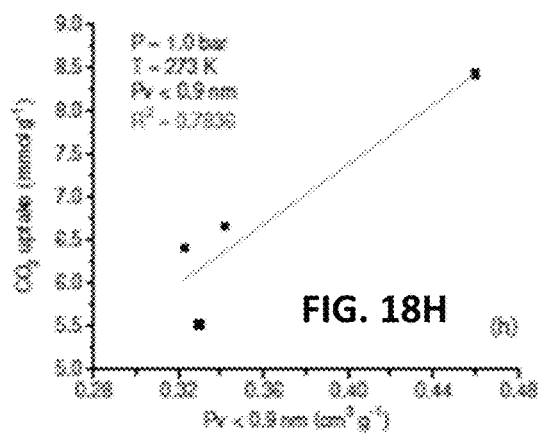
Figure 19A:
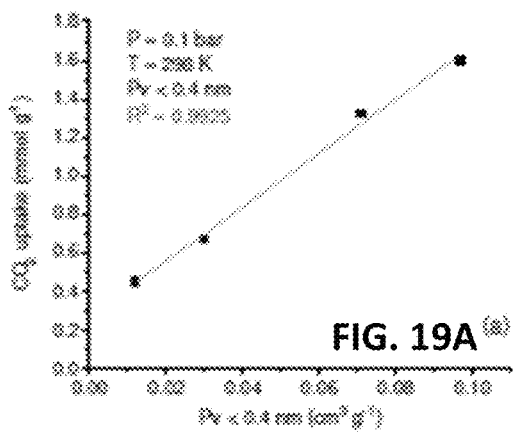
Figure 19B:
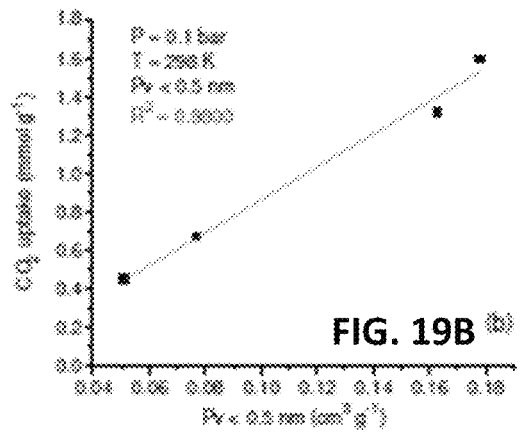
Figure 19C:
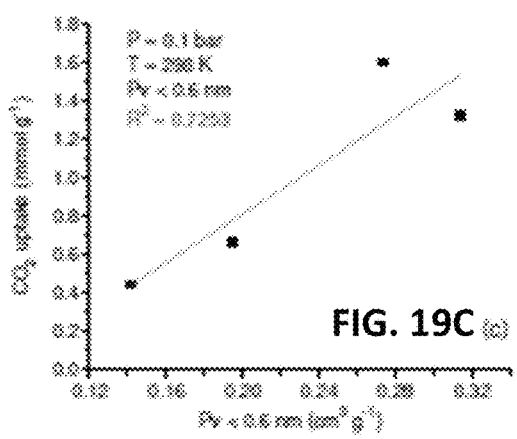
Figure 19D:
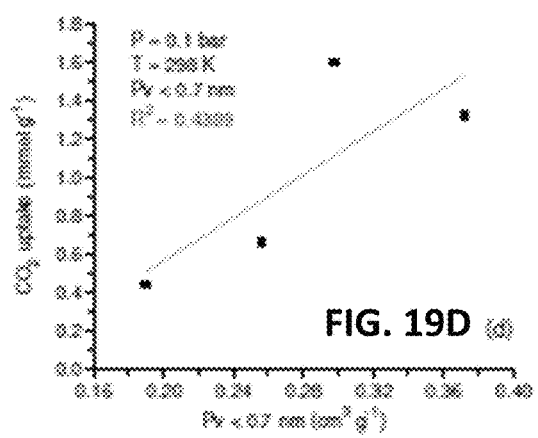
Figure 19E:
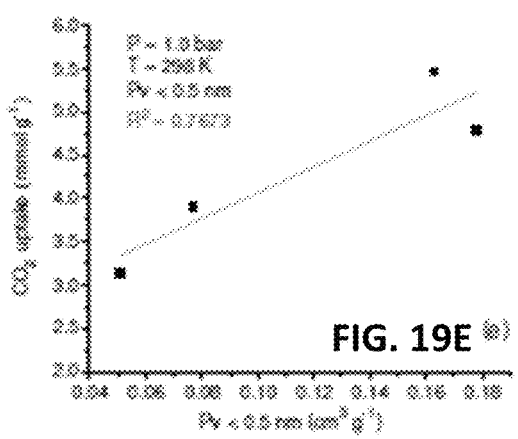
Figure 19F:
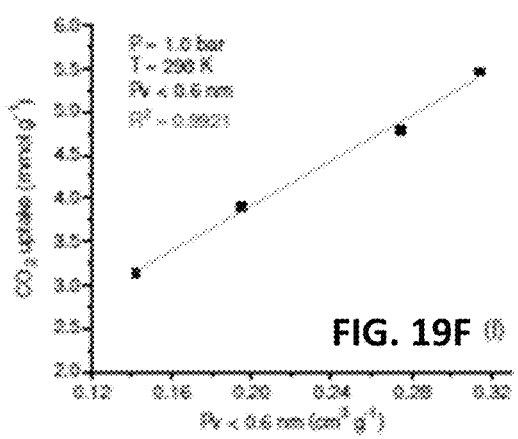
Figure 19G:
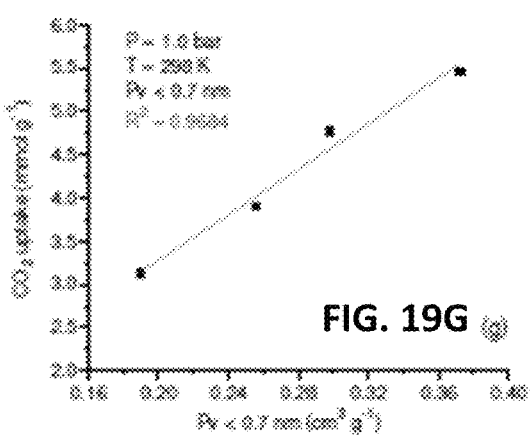
Figure 19A:
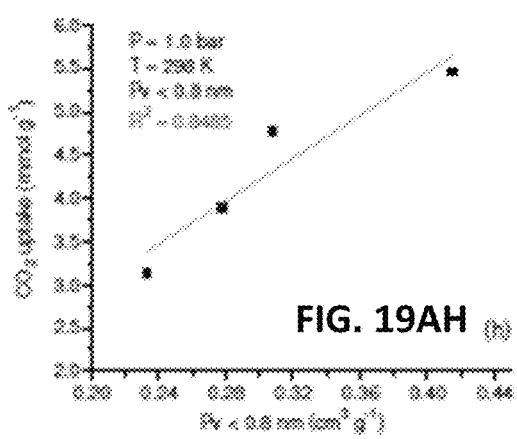
Figure 20A:
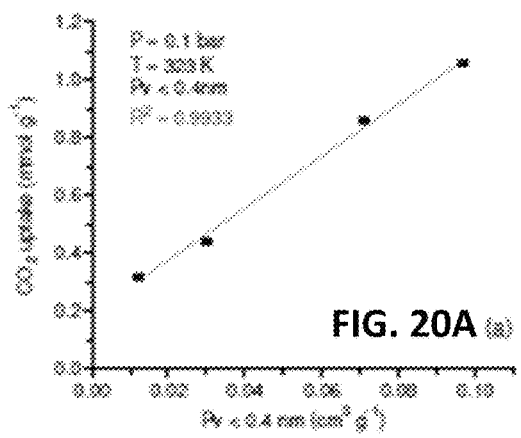
Figure 20B:
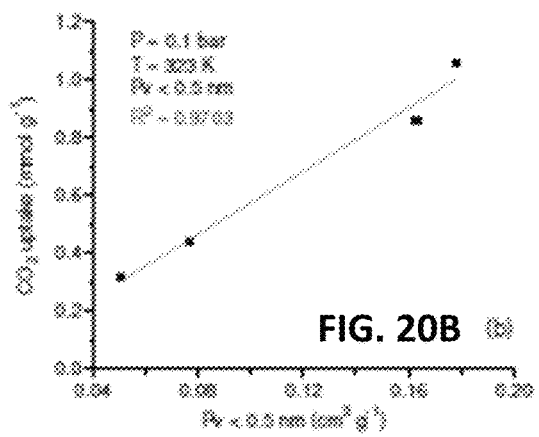
Figure 20C:
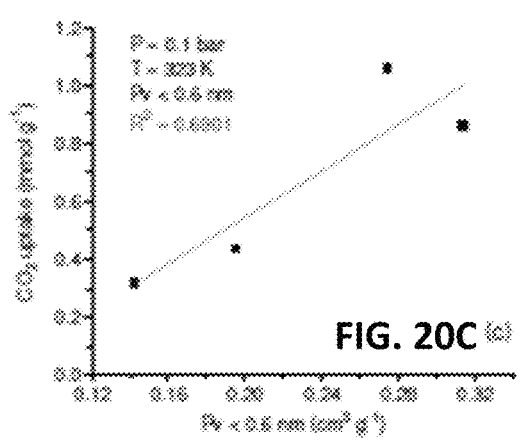
Figure 20D:
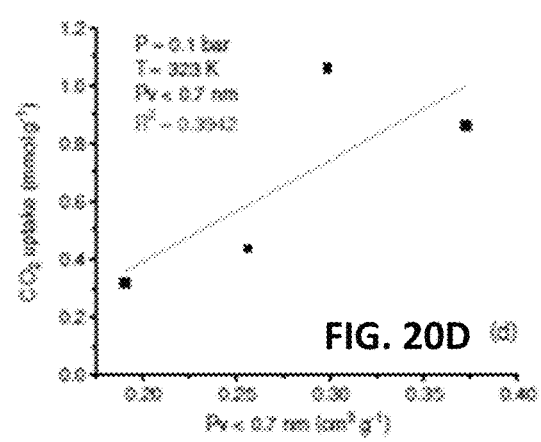
Figure 20E:
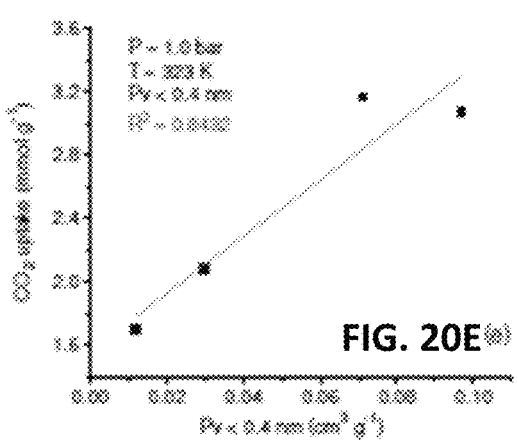
Figure 20F:
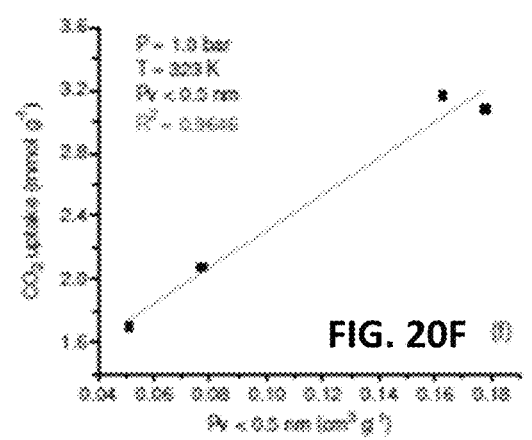
Figure 20G:
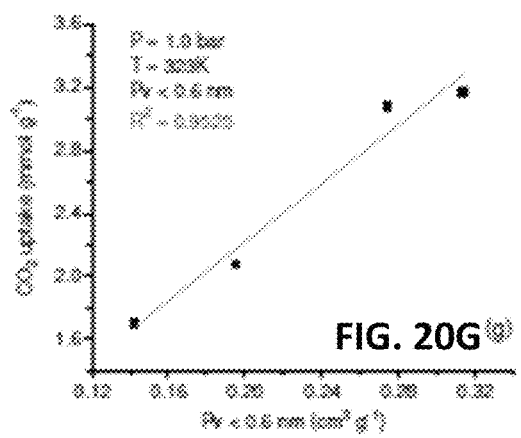
Figure 20H:
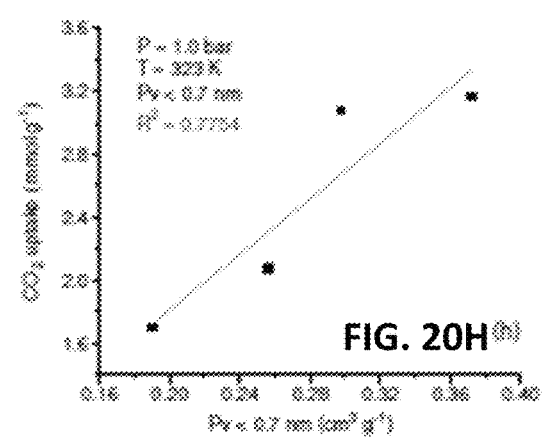
Figure 21A:
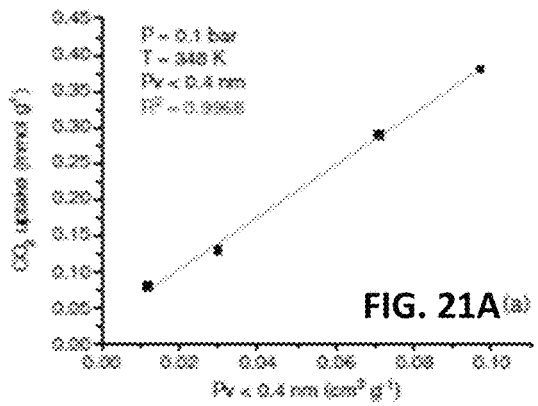
Figure 21B:
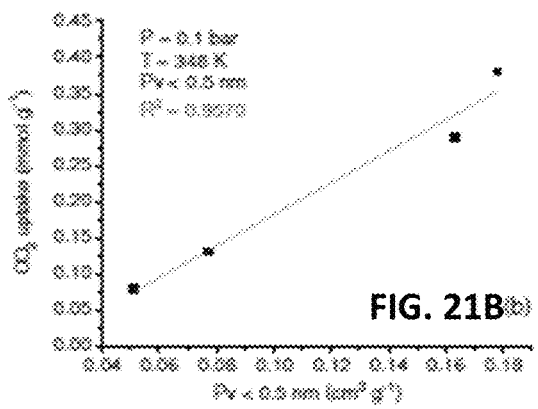
Figure 21C:
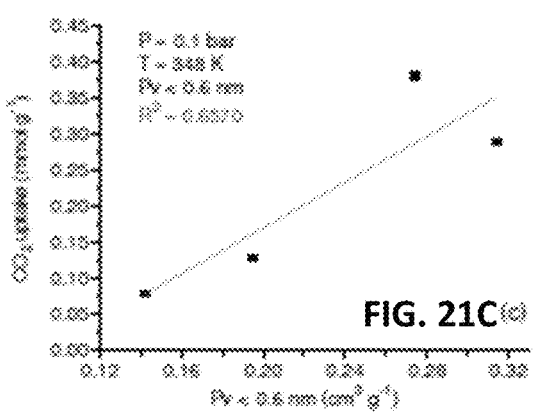
Figure 21D:
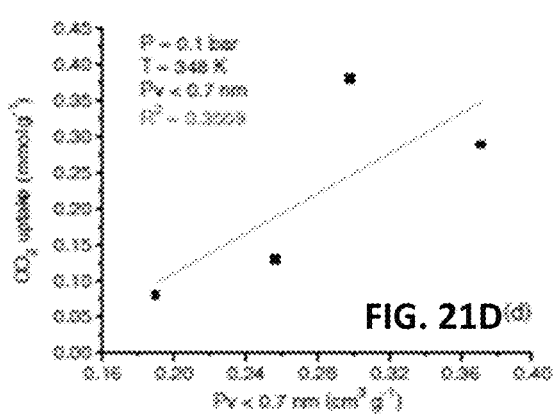
Figure 21E:
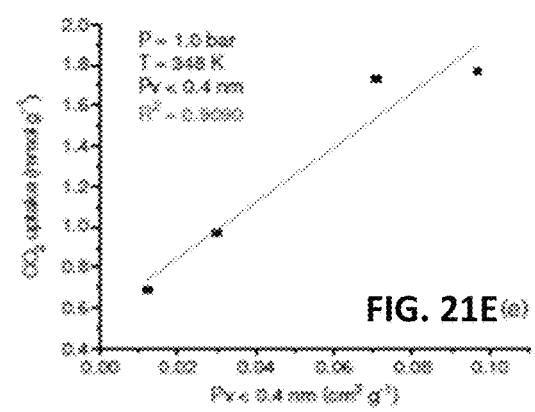
Figure 21F:
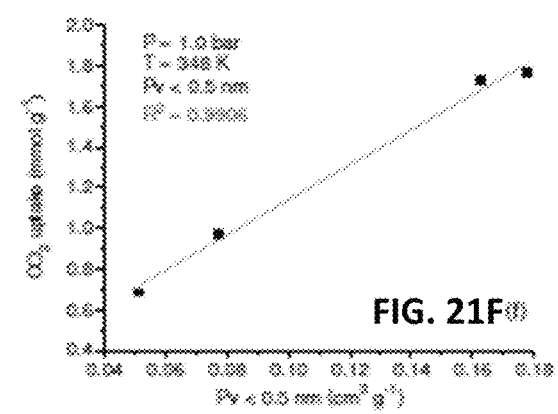
Figure 21G:
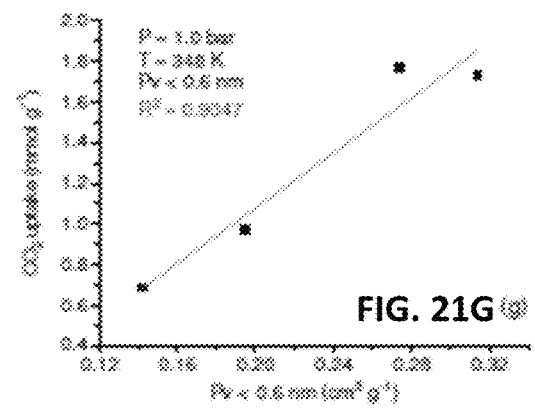
Figure 21H:
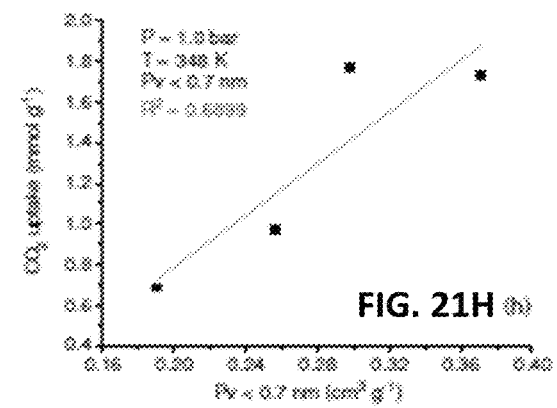

FIGS. 13A-F are graphs showing $CO_2$ capture and selectivity of BIDCs. $CO_2$ adsorption isotherms at 273 K (FIG. 13A), 298 K (FIG. 13B), and 323 K (FIG. 13C) are shown as well as isosteric heat of adsorption by Clasius-Clapeyron equation (FIG. 13D). Selectivity calculated by IAST at 298 K CO2/N2 (FIG. 13E) and CO2/CH4 (FIG. 13F) are also shown.

FIGS. 14A and B are graphs showing $CO_2$ isotherms at 348 K (FIG. 14A) and at 373 K (FIG. 14B) for BIDCs.

FIG. 15 is a table showing uptake and $Q_{st}$ and Selectivity values.

FIG. 16 is a table showing $CO_2$ uptake values at 348 K and 373 K for BIDCs.

FIG. 17 is a table showing $CO_2$ capture capacity and selectivity values of recently reported porous carbons.

FIGS. 18A-H are graphs showing $CO_2$ uptake at 273 K versus volume of ultrafine pores at 0.1 bar (FIGS. 18A-D) and at 1 bar (FIGS. 18E-H).

FIGS. 19A-H are graphs showing $CO_2$ uptake at 298 K versus volume of ultrafine pores at 0.1 bar (FIGS. 19A-D) and at 1 bar (FIGS. 19E-H).

FIGS. 20A-H are graphs showing $CO_2$ uptake at 323 K versus volume of ultrafine pores at 0.1 bar (FIGS. 20A-D) and at 1 bar (FIGS. 20E-H).

FIGS. 21A-H are graphs showing $CO_2$ uptake at 348 K versus volume of ultrafine pores at 0.1 bar (FIGS. 21A-D) and at 1 bar (FIGS. 21E-H).

FIGS. 22A-C are graphs showing experimental data and corresponding fittings of gas isotherms for BIDC-0.5-700 (Dual site Langmuir for $CO_2$ (FIG. 22A), and single site Langmuir for $CH_4$ (FIG. 22B) and $N_2$ (FIG. 22C) with temperature dependent parameter).

Figure 23B:
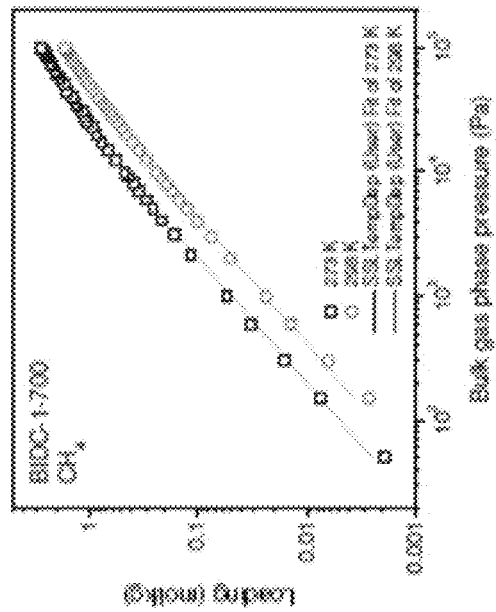
Figure 23C:
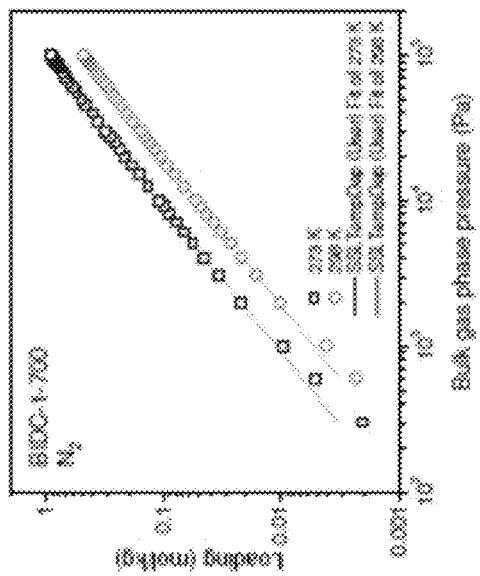
Figure 23A:
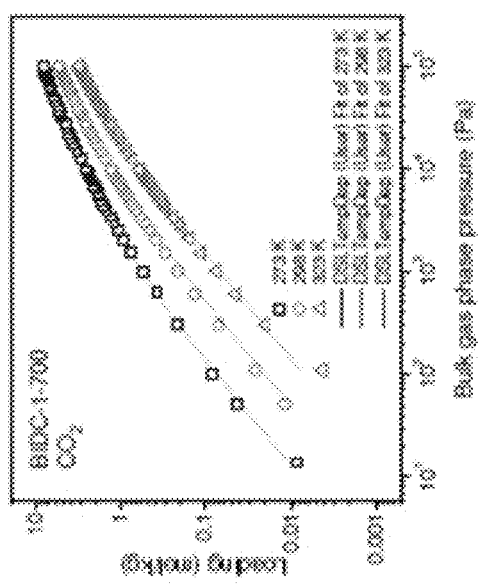

FIGS. 23A-C are graphs showing experimental data and corresponding fittings of gas isotherms for BIDC-1-700 (Dual site Langmuir for $CO_2$ (FIG. 23A), and single site Langmuir for $CH_4$ (FIG. 23B) and $N_2$ (FIG. 23C) with temperature dependent parameter).

Figure 24B:
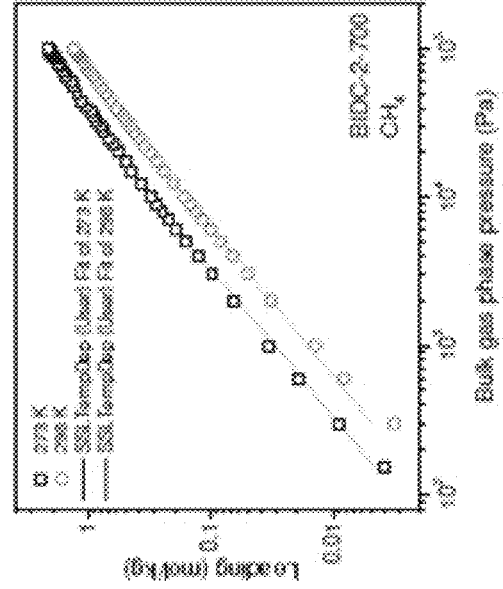
Figure 24A:
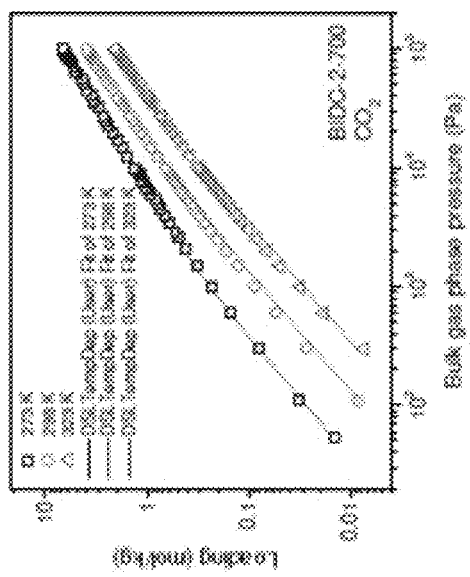
Figure 24C:
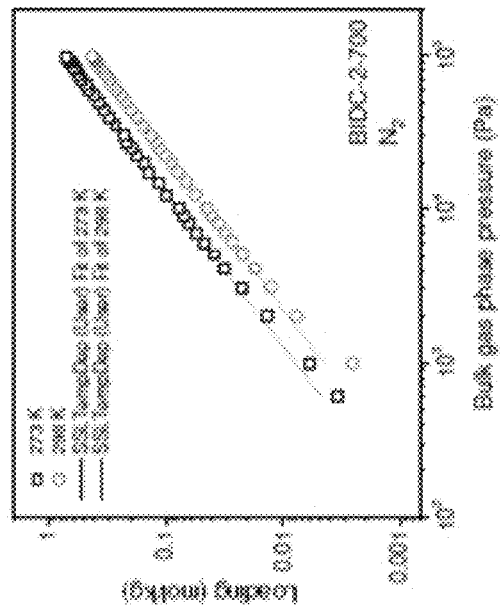

FIGS. 24A-C are graphs showing experimental data and corresponding fittings of gas isotherms for BIDC-2-700 (Dual site Langmuir for $CO_2$ (FIG. 24A), and single site Langmuir for $CH_4$ (FIG. 24B) and $N_2$ (FIG. 24C) with temperature dependent parameter).

Figure 25B:
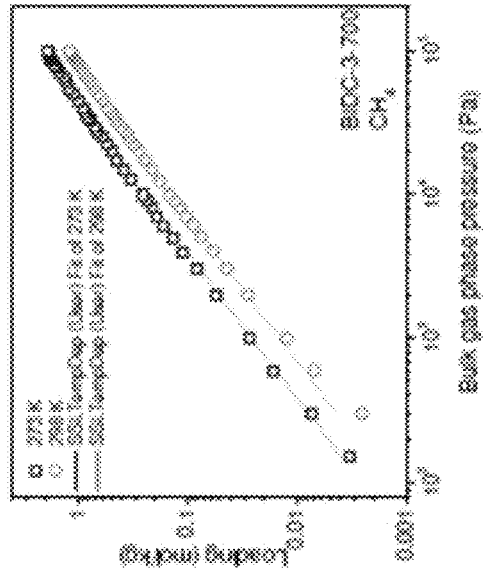
Figure 25A:
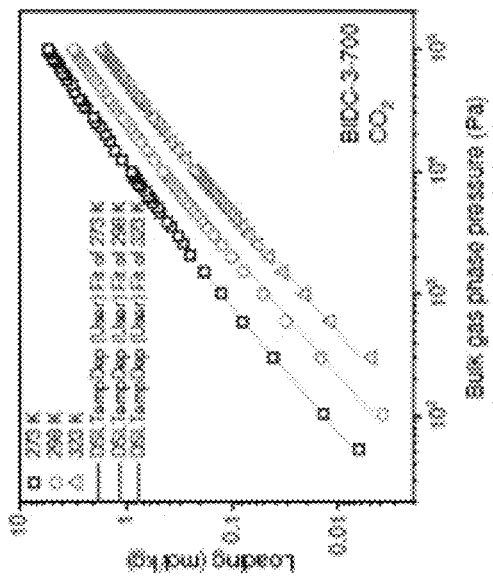
Figure 25C:
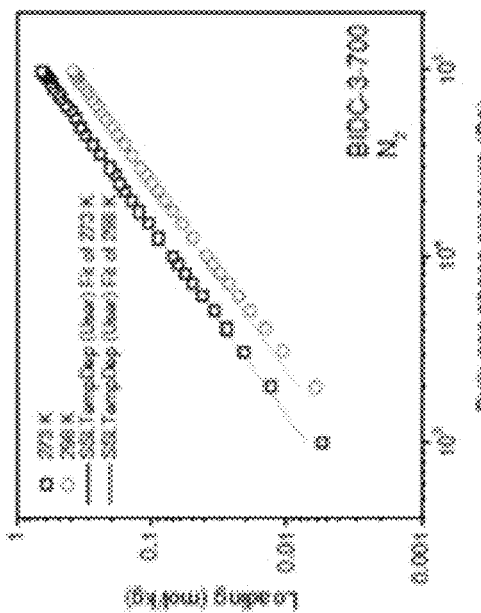

FIGS. 25A-C are graphs showing experimental data and corresponding fittings of gas isotherms for BIDC-3-700 (Dual site Langmuir for CO2 (FIG. 25A), and single site Langmuir for CH4 (FIG. 25B) and N2 (FIG. 25C) with temperature dependent parameter).

Figure 26A:
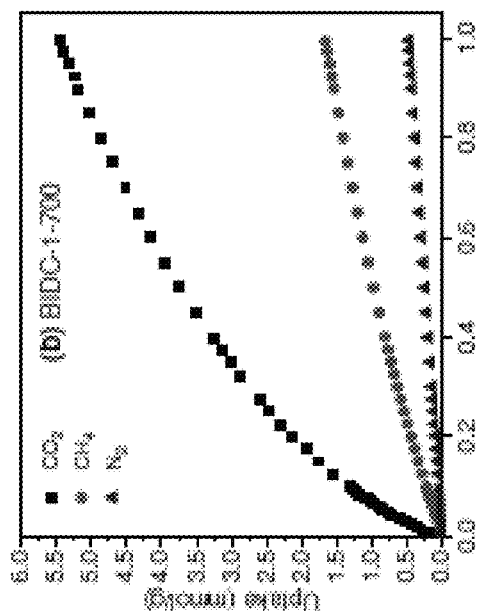
Figure 26B:
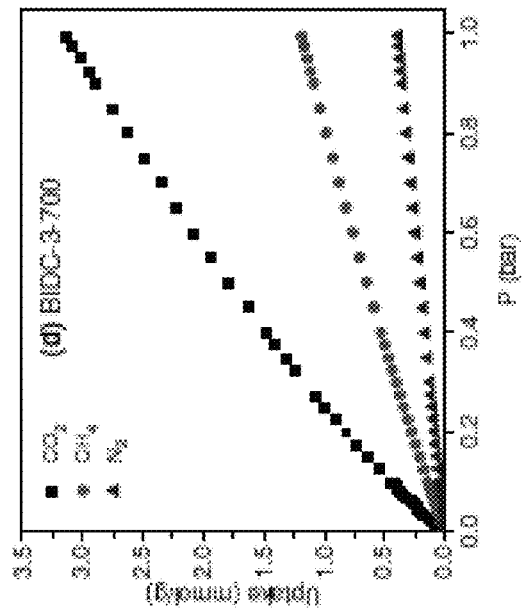
Figure 26C:
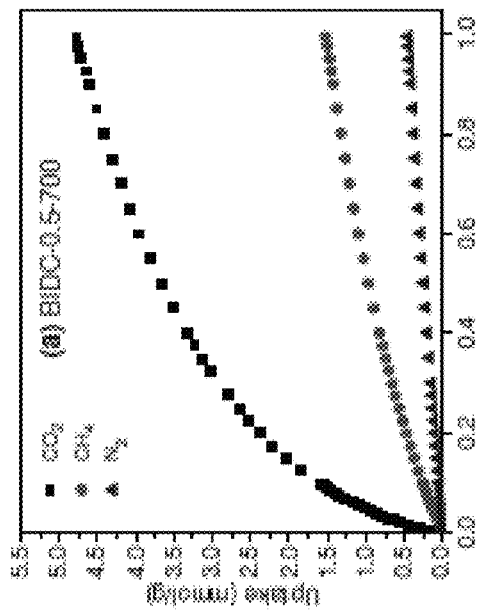
Figure 26D:
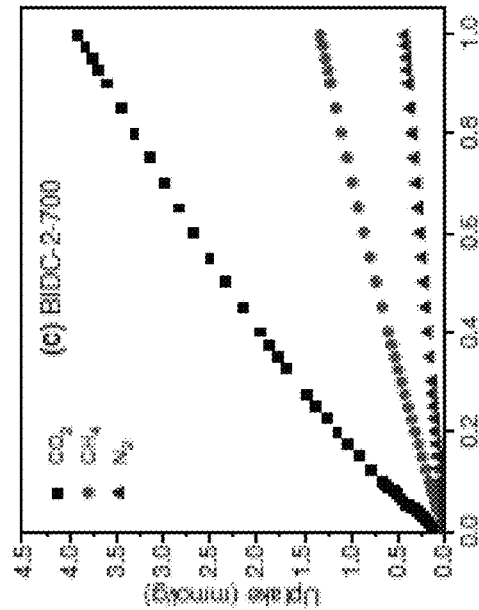

FIGS. 26A-D are graphs showing experimental pure component curves at 298 K for BIDC-0.5-700 (FIG. 26A), BIDC-1-700 (FIG. 26B), BIDC-2-700 (FIG. 26C) and BIDC-3-700 (FIG. 26D).

Figure 27A:
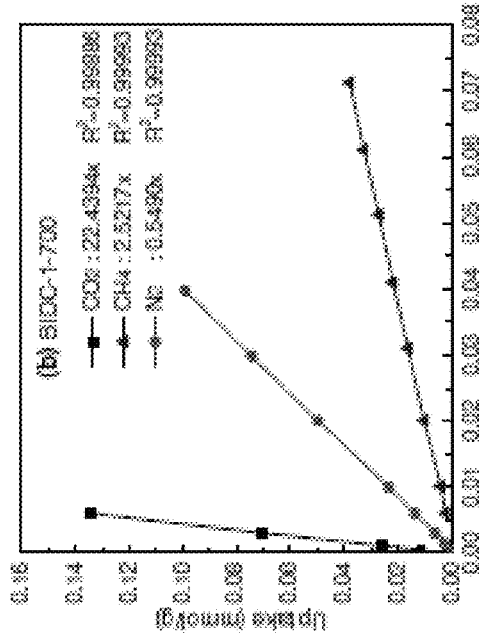
Figure 27B:
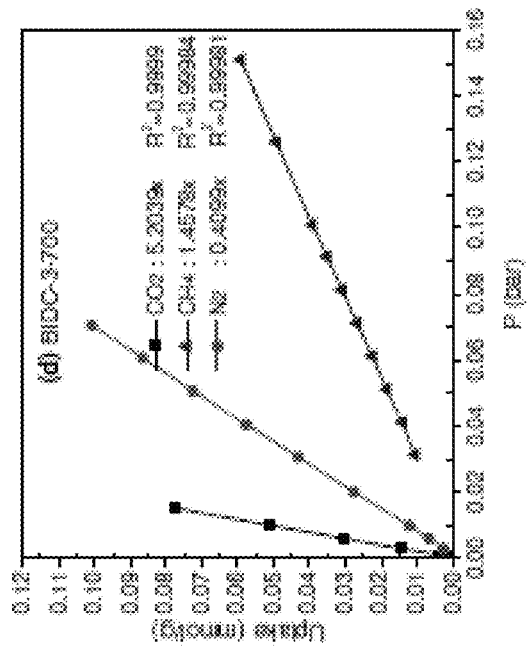
Figure 27C:
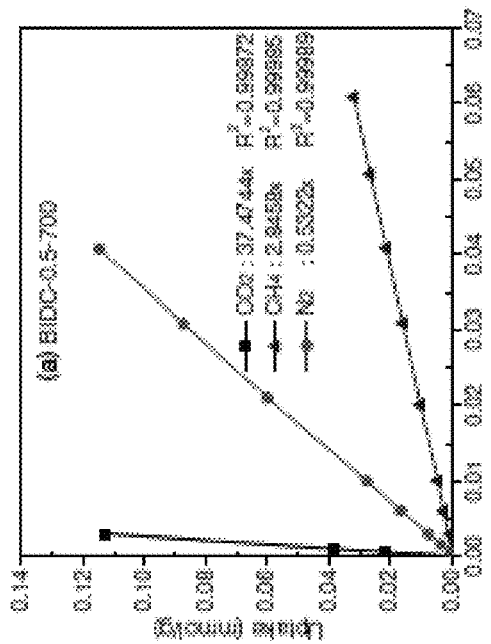
Figure 27D:
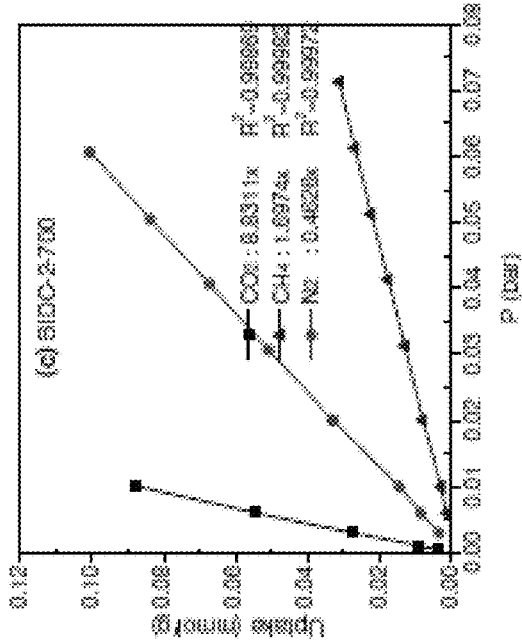

FIGS. 27A-D are graphs showing $CO_2/N_2$ and $CO_2/CH_4$ adsorption selectivity at 298 K for BIDC-0.5-700 (FIG. 27A), BIDC-1-700 (FIG. 27B), BIDC-2-700 (FIG. 27C) and BIDC-3-700 (FIG. 27D).

FIG. 28A is a table showing adsorbents for vacuum swing adsorption (VSA) in landfill gas.

FIG. 28B is a table showing adsorbents for vacuum swing adsorption (VSA) in flue gas.

FIGS. 29A and B are graphs showing $CO_2$ surface excess (FIG. 29A) and $CO_2$ absolute adsorption isotherms (FIG. 29B) at 298 K for BIDCs.

Figure 30A:
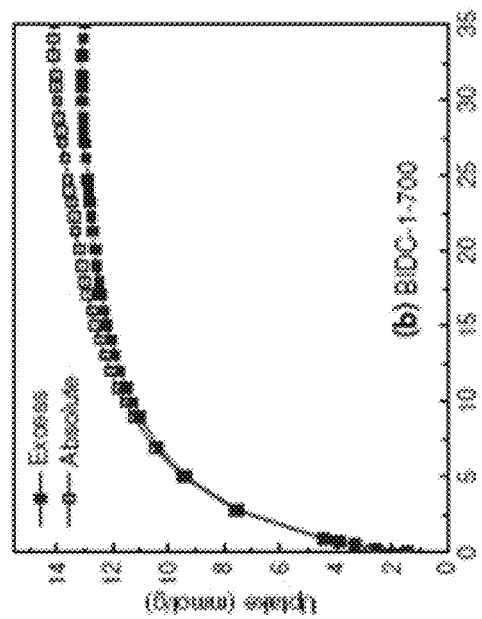
Figure 30B:
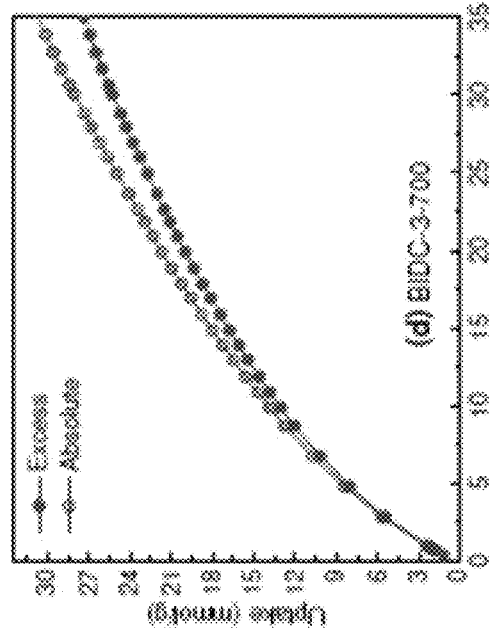
Figure 30C:
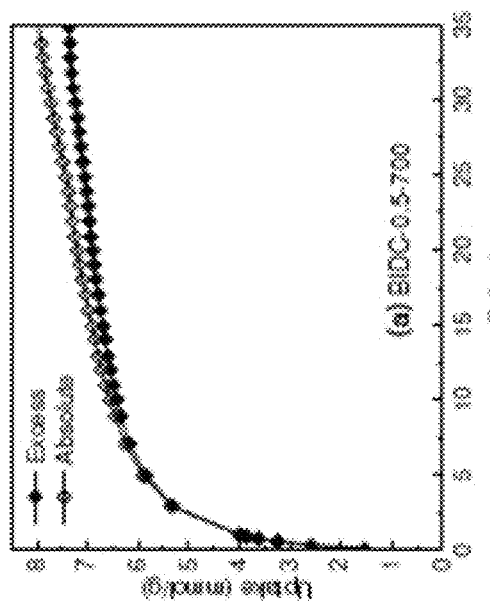
Figure 30D:
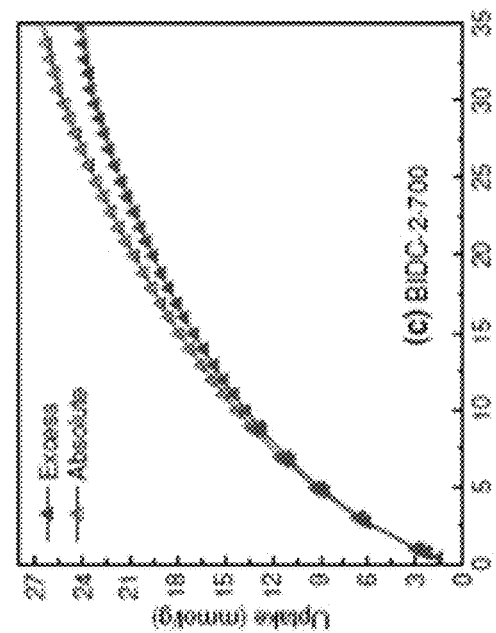

FIGS. 30A-D are graphs showing comparison of $CO_2$ surface excess and absolute uptakes for BIDC-0.5-700 (FIG. 30A), BIDC-1-700 (FIG. 30B), BIDC-2-700 (FIG. 30C) and BIDC-3-700 (FIG. 30D).

FIG. 31 is a table showing cumulative volumes for large micropores and narrow mesopores.

Figure 32:
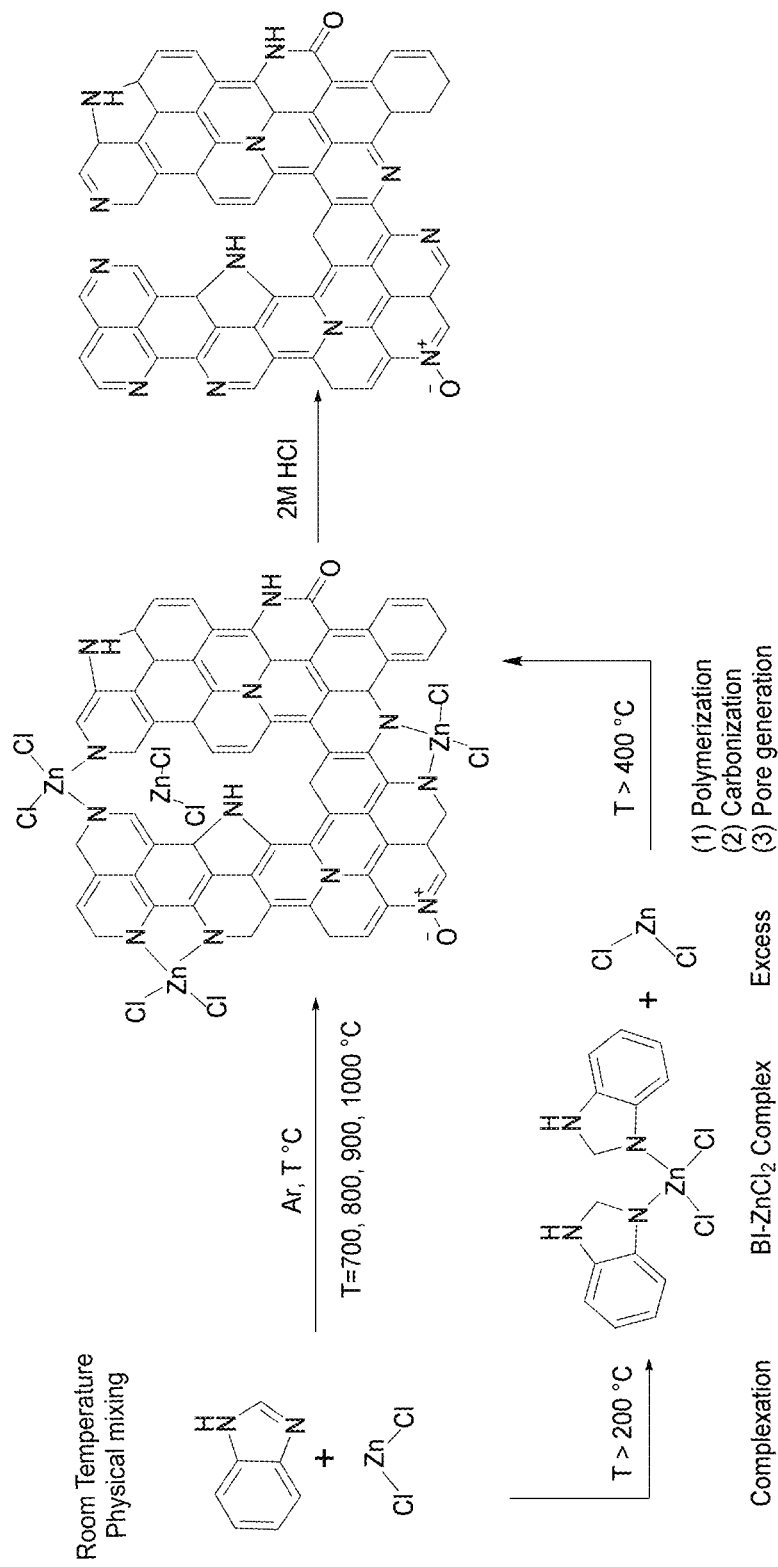

FIG. 32 is a schematic illustration of the synthetic procedures for $ZnCl_2$-activated benzimidazole derived carbons (ZBIDCs).

Figure 33C:
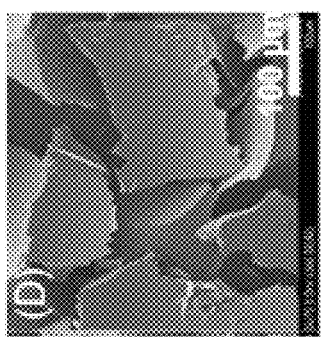
Figure 33D:
Figure 33E:
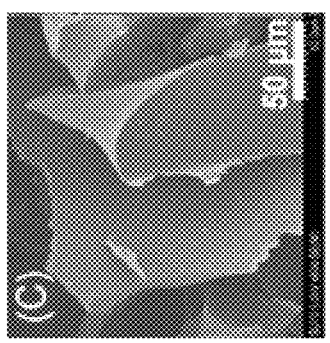
Figure 33F:
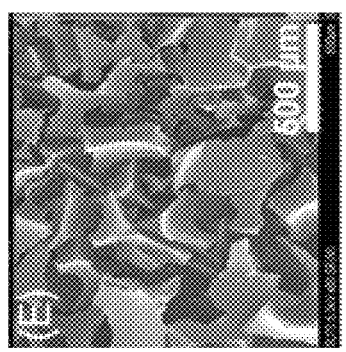
Figure 33B:
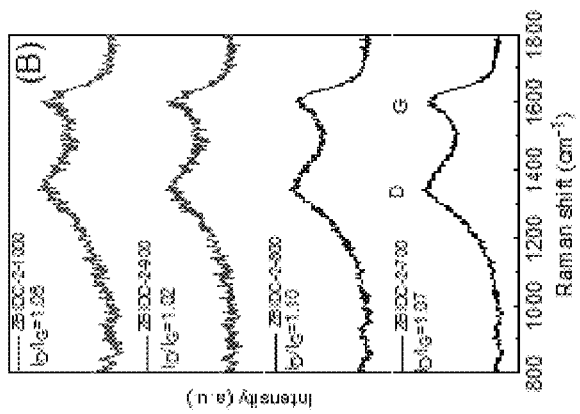
Figure 33A:
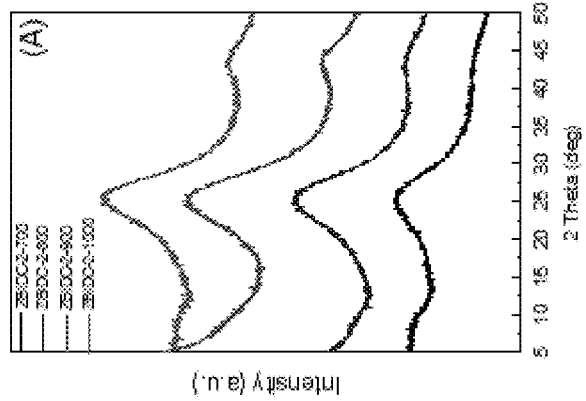

FIGS. 33A-B are graphs showing an XRD pattern (FIG. 33A) and Raman spectra (FIG. 33B) for ZBIDCs prepared at various temperatures.

FIGS. 33C-F are scanning electron microscopy (SEM) images of ZBIDC-2-900 at 50 μm (FIG. 33C), 100 μm (FIG. 33D), 500 μm (FIG. 33E) and benzimidazole precursor at 100 μm (FIG. 33F).

Figures 34A, 34B:
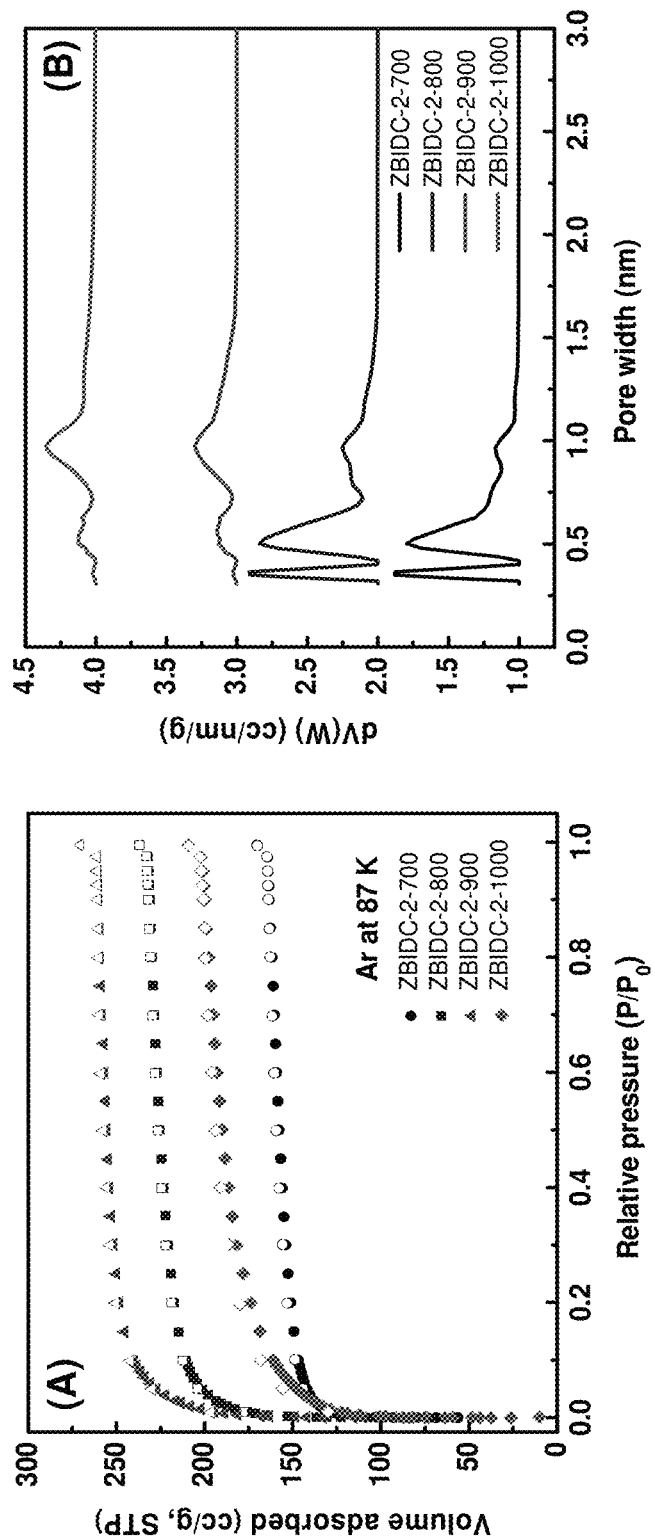

FIGS. 34A and B are graphs showing argon isotherms at 87 K (FIG. 34A) (solid symbols for adsorption and open symbols for desorption) and pore size distributions calculated by DFT method for ZBIDC-2-y samples (FIG. 34B) (All PSD curves are offset vertically in steps of 0.1 for clarity).

FIG. 35 is a table showing physiochemical properties of ZBIDCs.

Figure 36A:
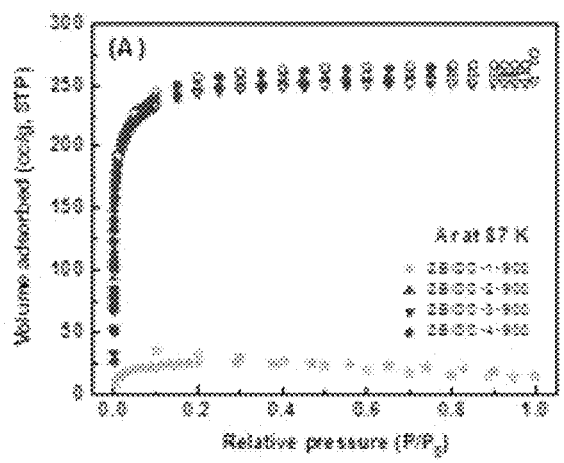
Figure 36B:
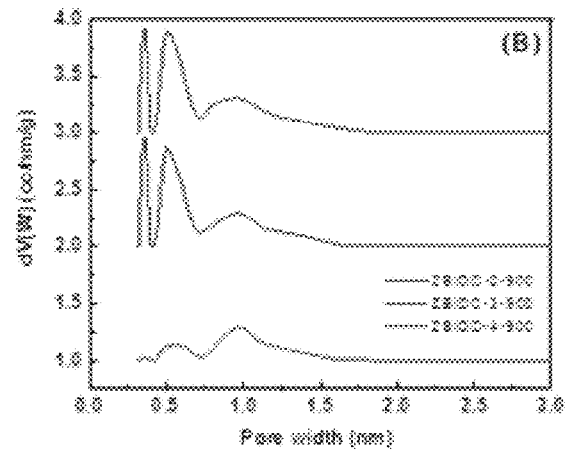
Figure 36C:
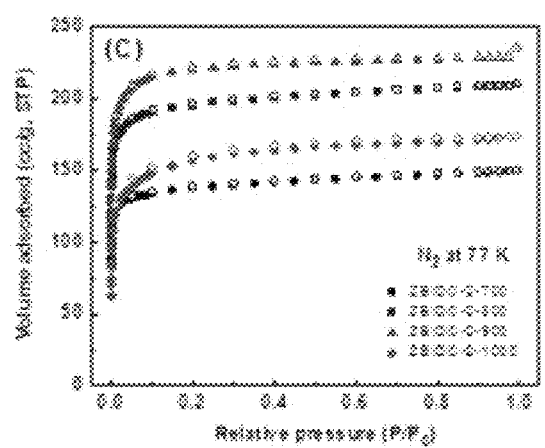
Figure 36D:
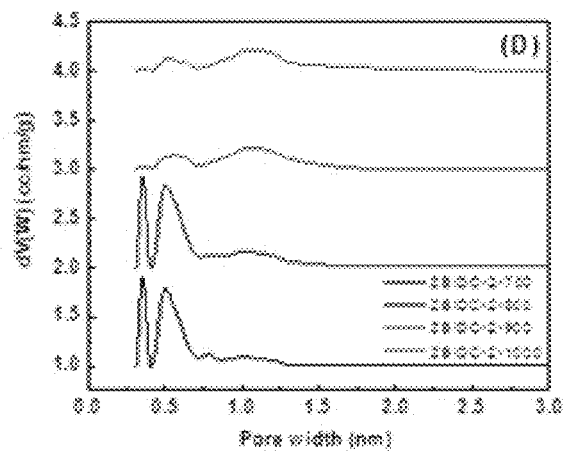
Figure 36E:
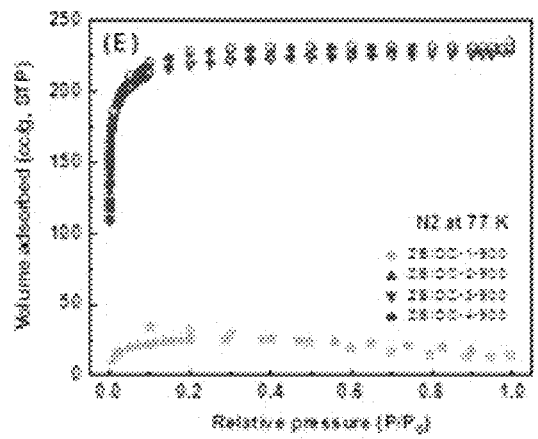
Figure 36F:
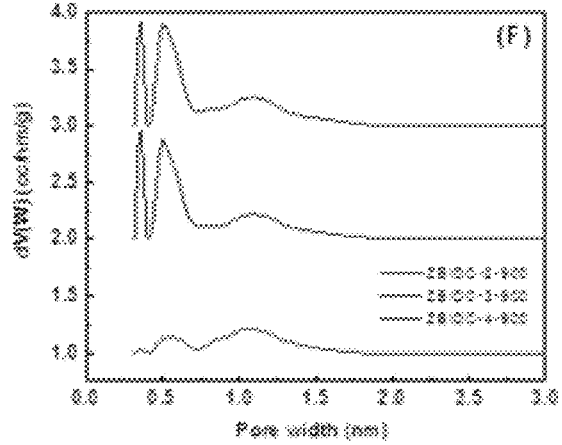

FIGS. 36A-F are graphs where FIGS. 36A and B show Ar-87 K isotherms and corresponding PSD curves for ZBIDC-x-900, FIGS. 36C and D show $N_2$-77 K isotherms and corresponding PSD curves for ZBIDC-2-y, and FIGS. 36E and F show $N_2$-77 K isotherms and corresponding PSD curves for ZBIDC-x-900 (solid symbols for adsorption and empty symbols for desorption. PSD curves are offset vertically in steps of 0.1 for clarity).

FIG. 37 is a table showing surface area (BET) and total pore volume (measured at $P/P_0$=0.95) values for ZBIDCs obtained from Ar (at 87 K) and $N_2$ (at 77 K) isotherms.

FIG. 38 is a table showing detailed composition of ZBIDCs by XPS and elemental analysis methods.

Figure 39:
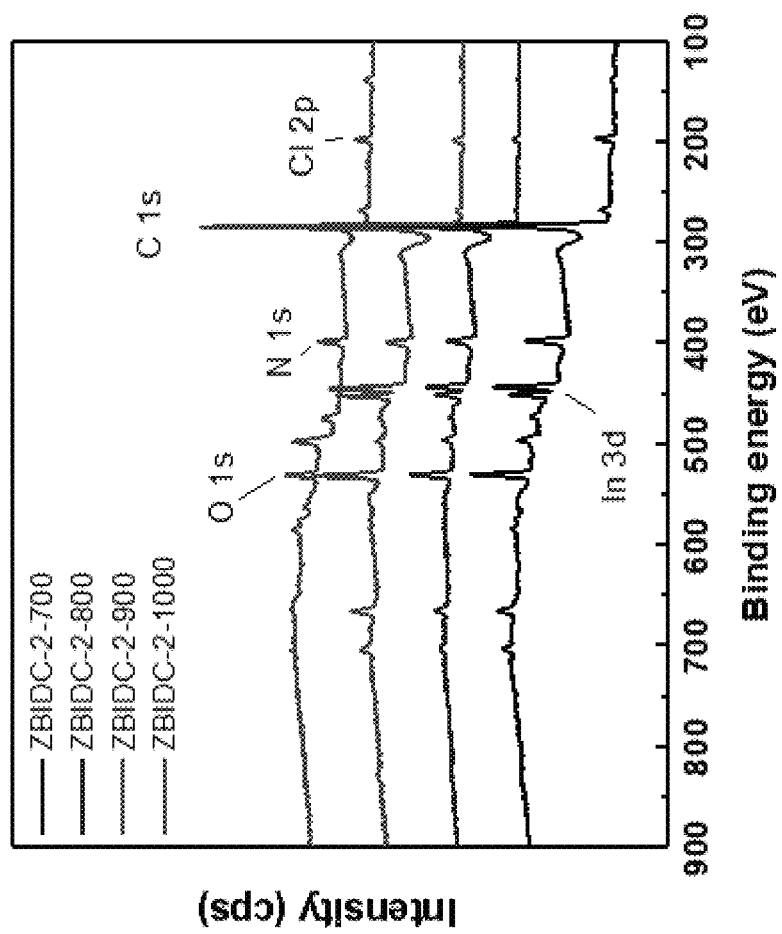

FIG. 39 is a graph showing X-ray photoelectron spectroscopy (XPS) survey spectra for ZBIDCs.

Figure 40:
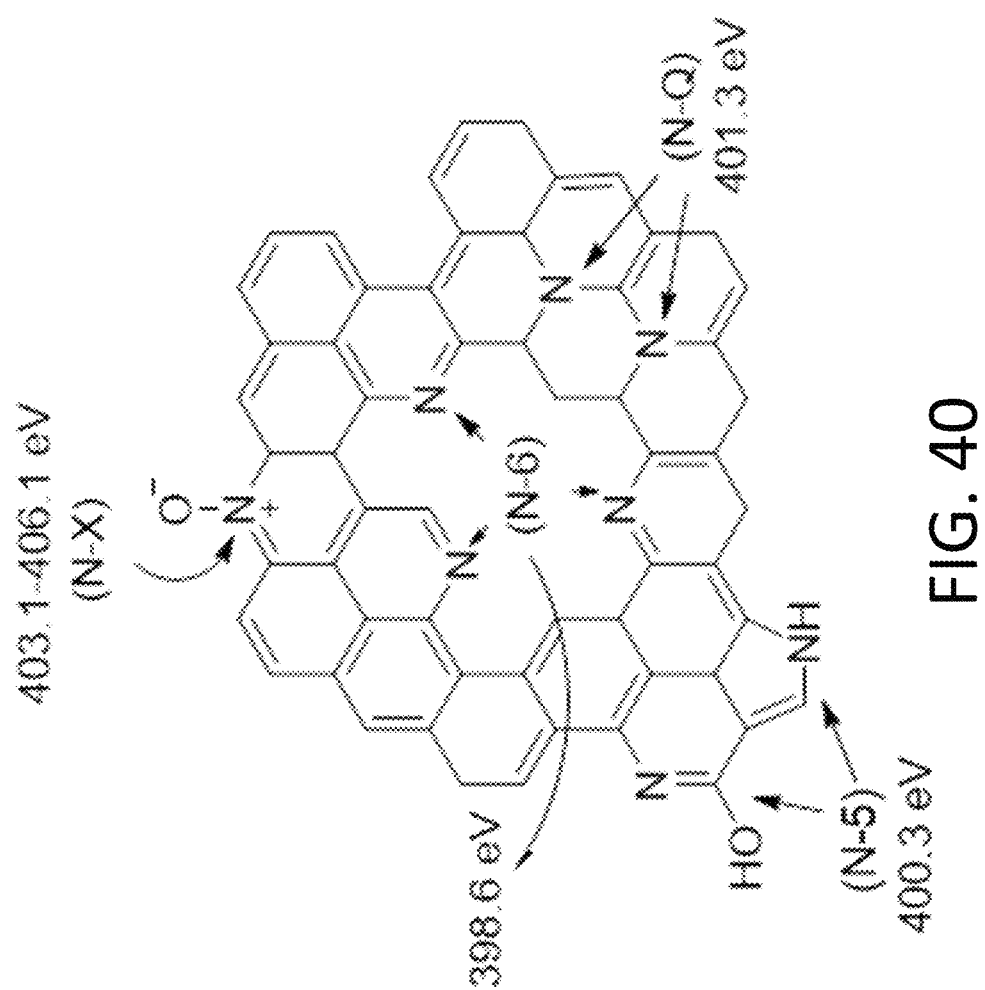

FIG. 40 is a schematic representation of various nitrogen species in a typical porous carbon.

Figure 41A:
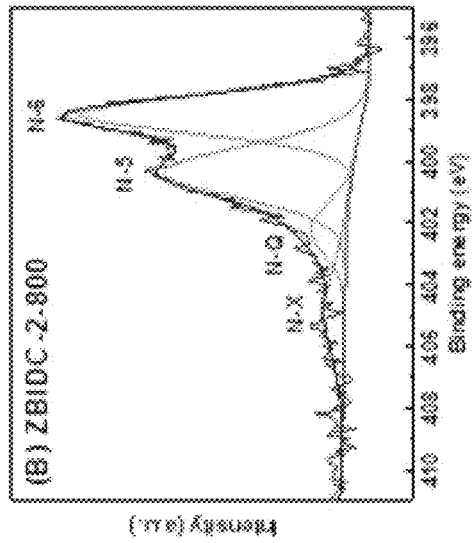
Figure 41B:
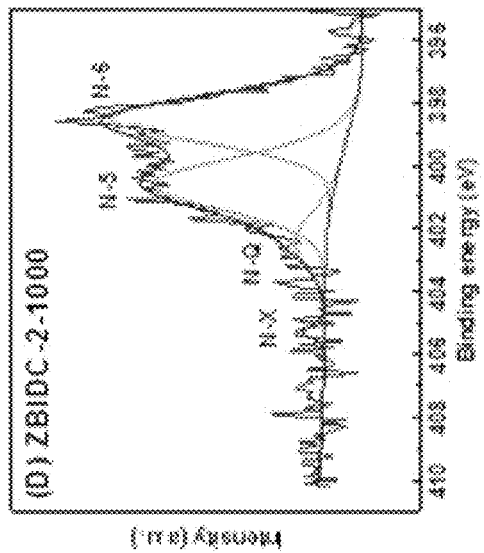
Figure 41C:
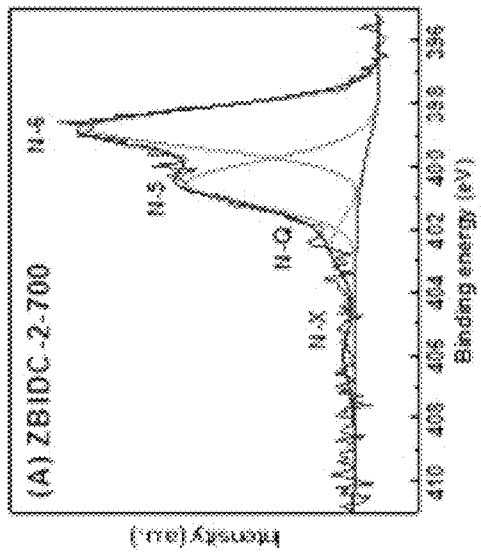
Figure 41D:
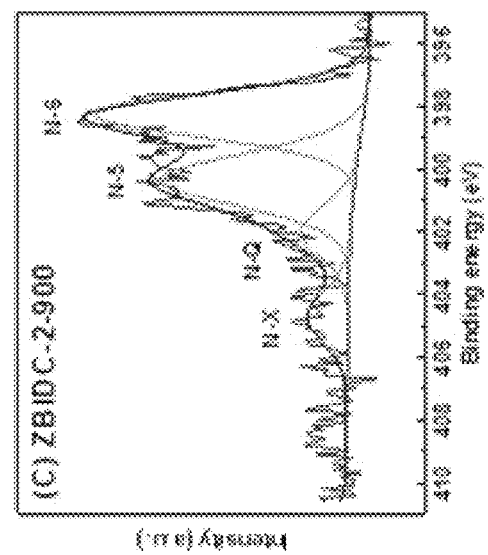

FIGS. 41A-D are graphs showing High-resolution deconvoluted N is spectra for ZBIDC-2-700 (FIG. 41A), ZBIDC-2-800 (FIG. 41B), ZBIDC-2-900 (FIG. 41C), and ZBIDC-2-1000 (FIG. 41D).

FIG. 42 is a table showing relative surface concentrations of nitrogen species obtained by fitting the N 1 s spectra FIGS. 43A-43F are graphs showing electrochemical performance of various ZBIDCs materials using a three-electrode cell in 1 M $H_2SO_4$ where FIG. 43A shows cyclic voltammograms at a scan rate of 5 mV s$^{-1}$ for all ZBIDCs, FIG. 43B shows cyclic voltammograms of ZBIDC-2-900 at different scan rates, FIG. 43C shows galvanostatic charge-discharge curves at a current density of 1 A g$^{-1}$ for all ZBIDCs, FIG. 43D shows galvanostatic charge-discharge curves of ZBIDC-2-900 at different current densities, FIG. 43E shows specific capacitance as a function of current density and FIG. 43F shows cyclic stability of ZBIDC-2-900 electrode at a current density of 10 A g$^{-1}$ over 4000 cycles (while the inset shows charge-discharge curves of the 1$^{st}$ and 4000$^{th}$ cycles at 10 A g$^{-1}$).

Figure 44:
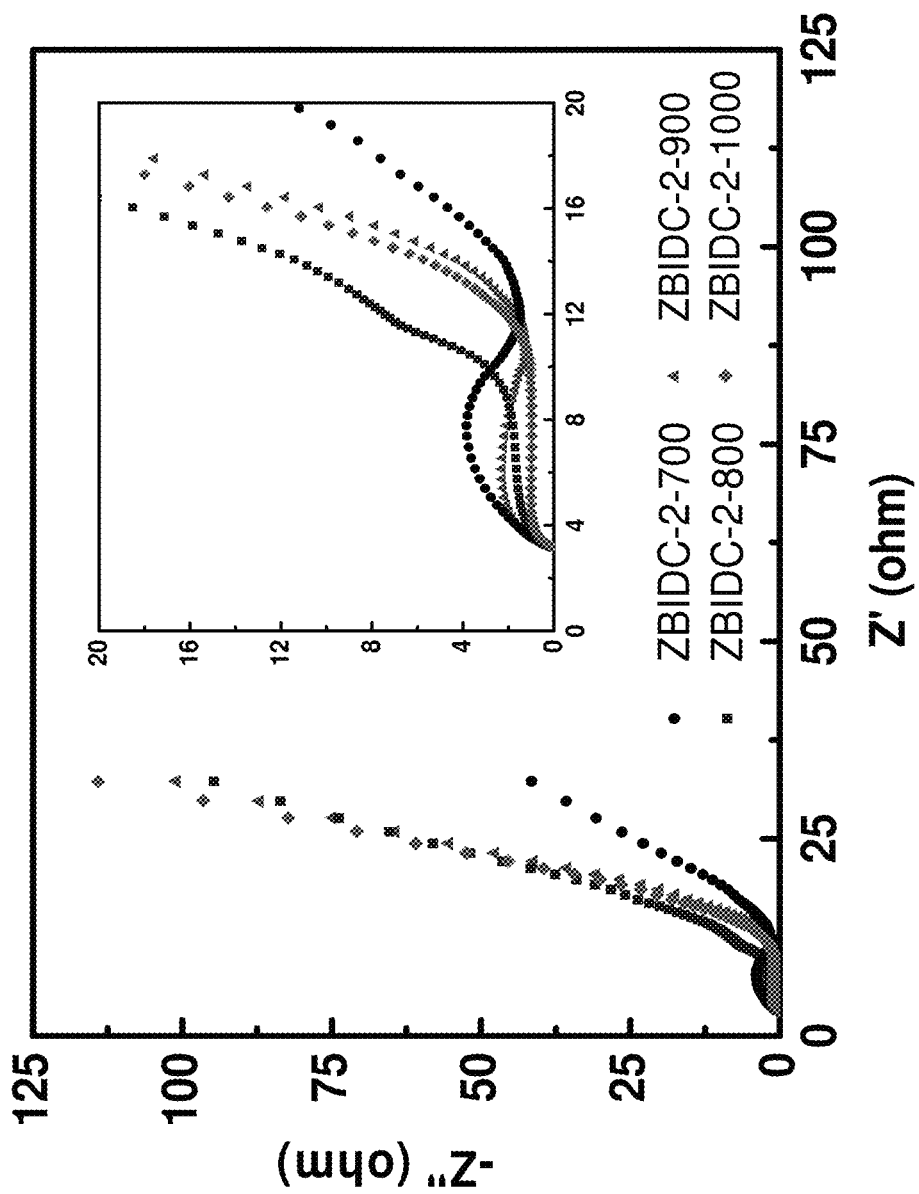

FIG. 44 is a graph showing Nyquist plots of the ZBIDCs based supercapacitors (the inset shows the expanded high-frequency region).

Figure 45:
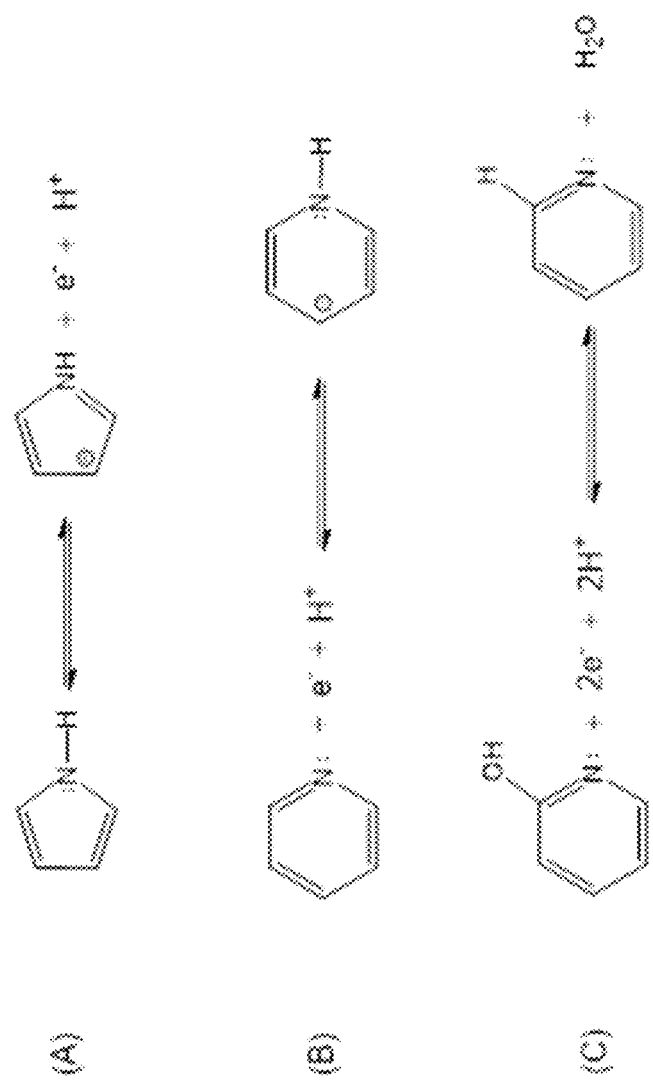

FIG. 45 is a schematic illustration of possible redox reactions related to (A) pyrrolic, (B) pyridinic, and (C) pyridonic nitrogen species in acidic media.

Figure 46A:
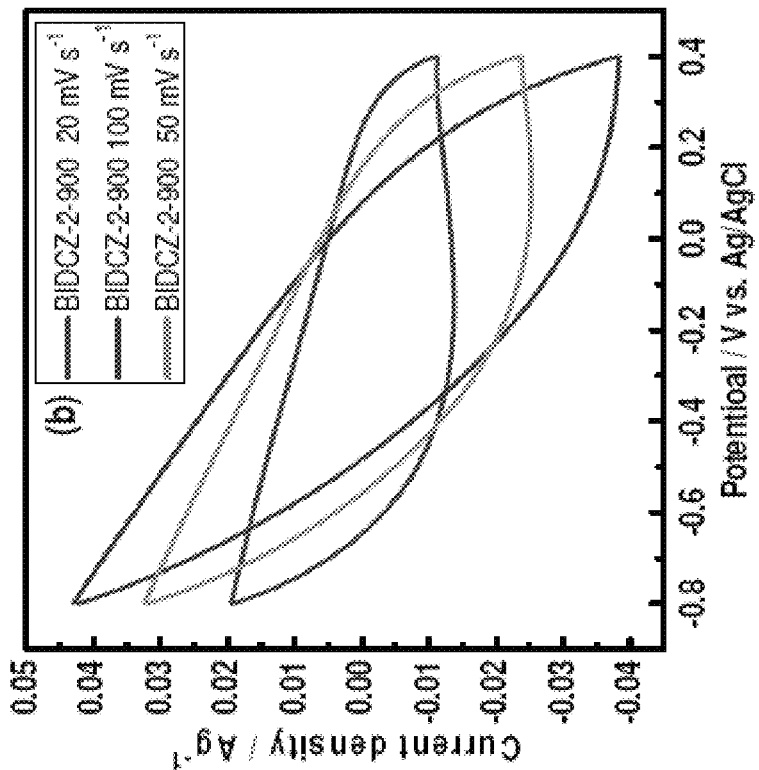
Figure 46B:
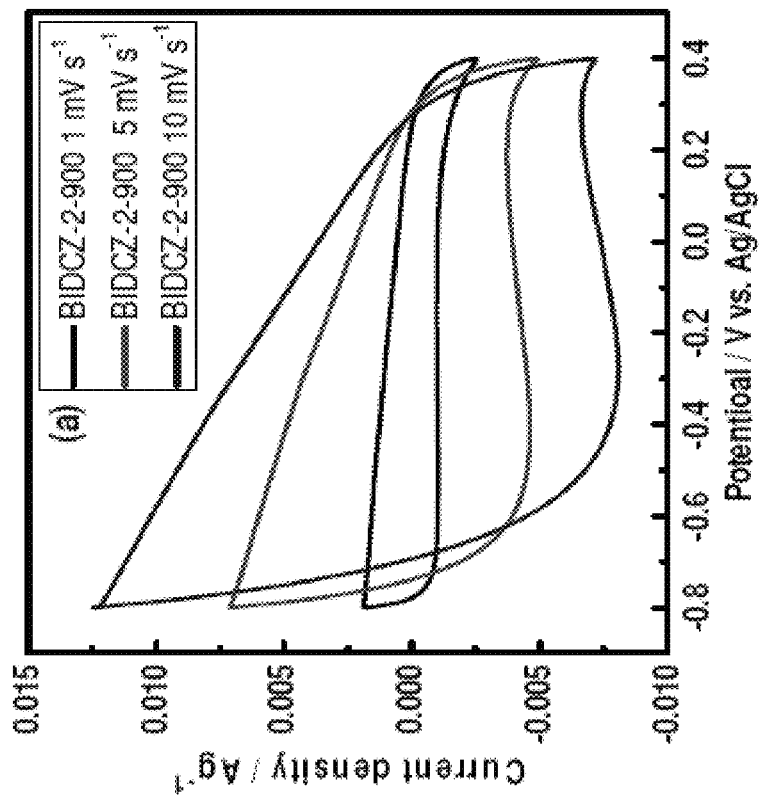

FIGS. 46A and B are graphs showing cyclic voltammograms for BIDCZ-2-900-based supercapacitor at scan rates of 1, 5, and 10 mV s$^{-1}$ (FIG. 46A) and scan rates of 20, 50, and 100 mV s$^{-1}$ (FIG. 46B).

Figure 47A:
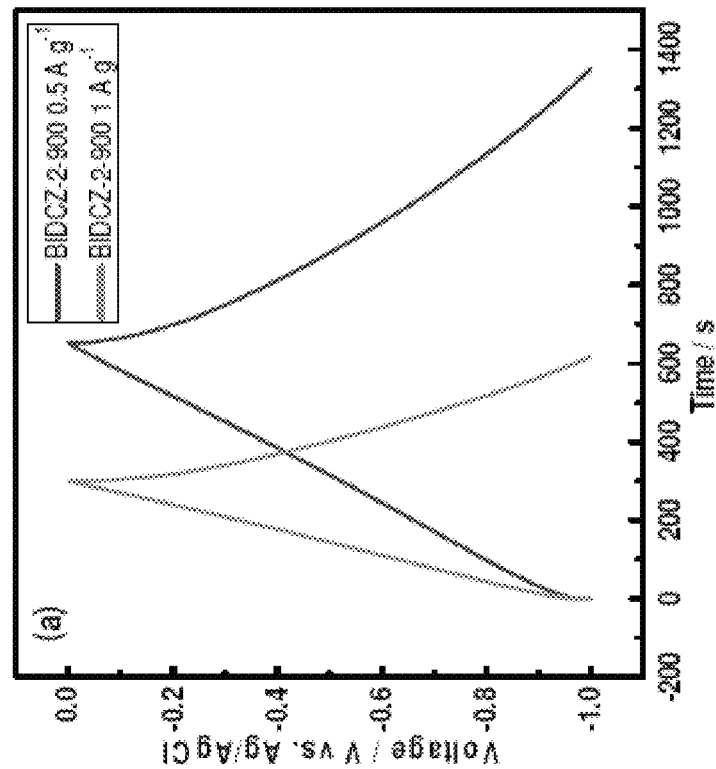
Figure 47B:
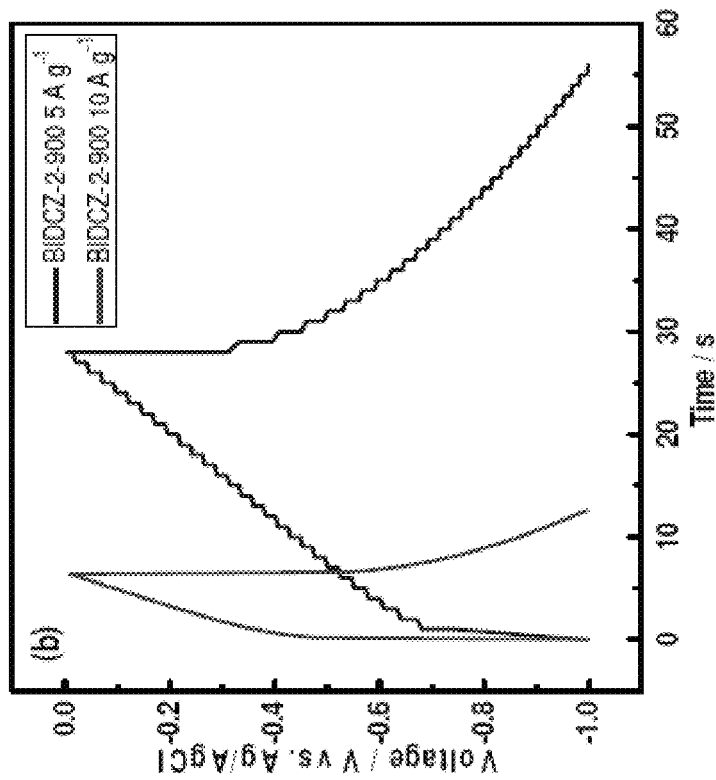
Figure 48A:
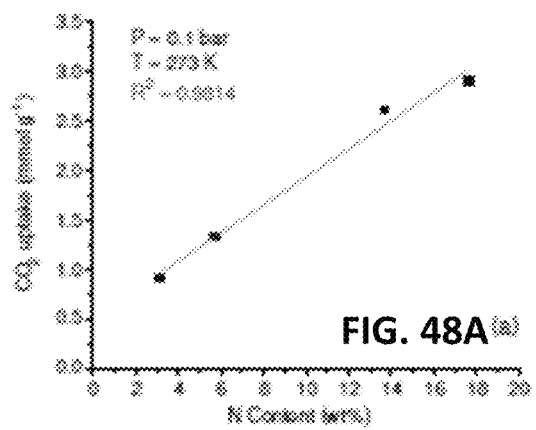
Figure 48B:
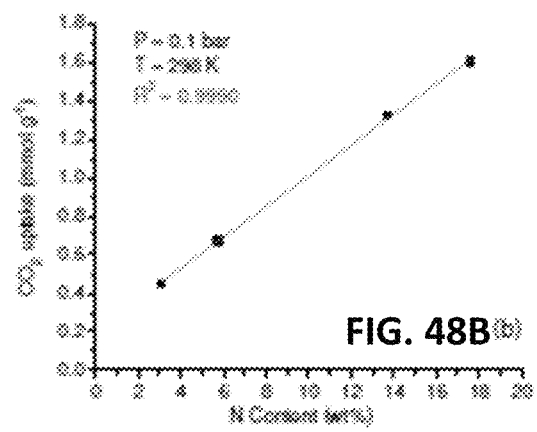
Figure 48C:
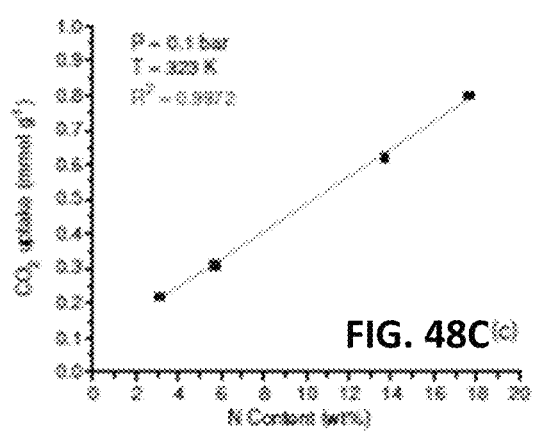
Figure 48D:
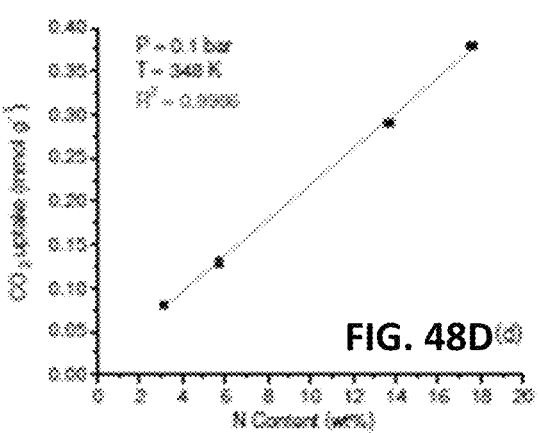
Figure 48E:
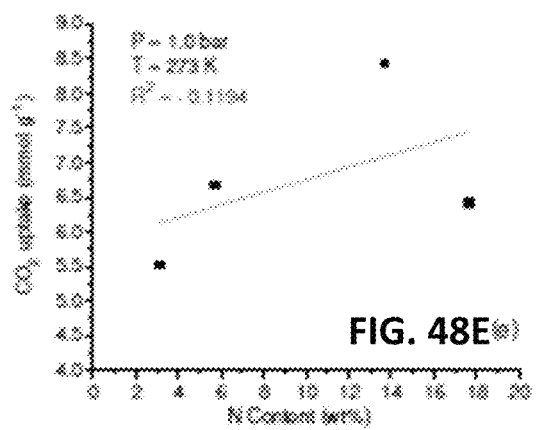
Figure 48F:
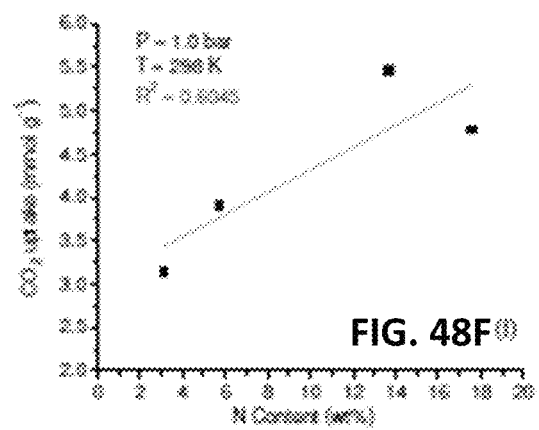
Figure 48G:
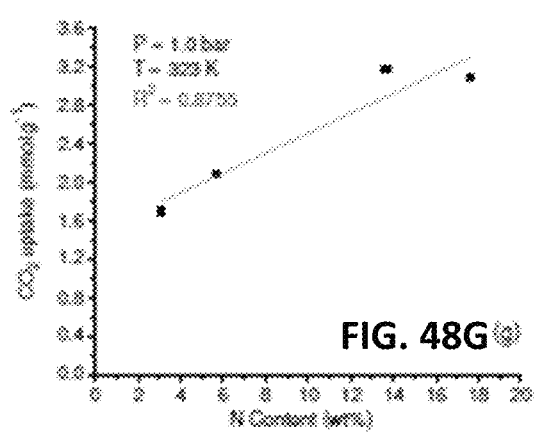
Figure 48H:
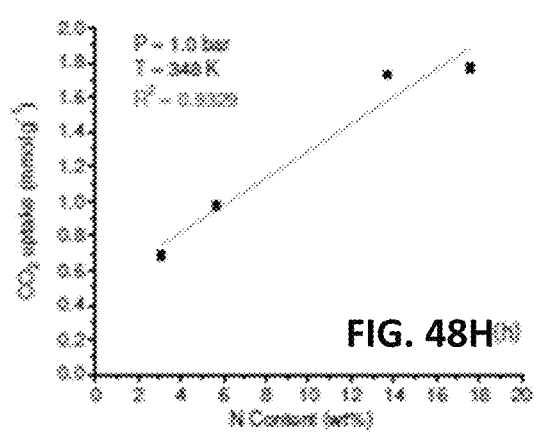
Figure 49A:
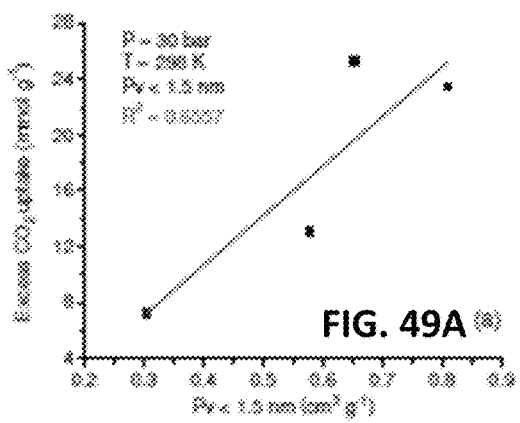
Figure 49B:
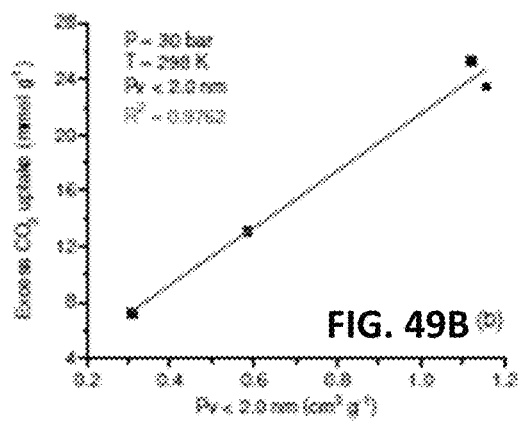
Figure 49C:
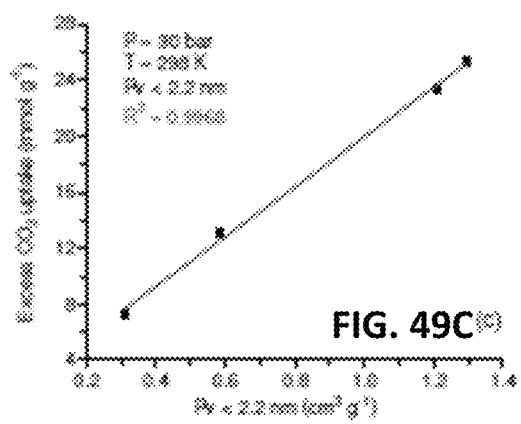
Figure 49D:
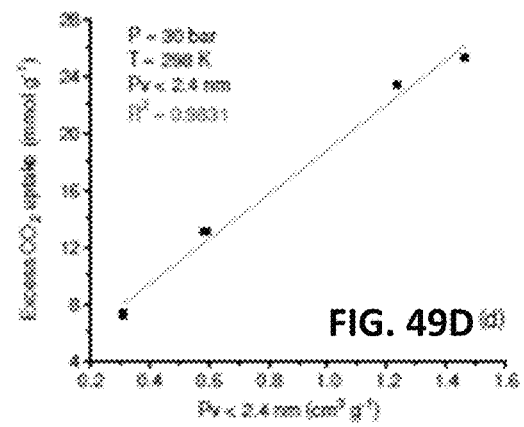
Figure 49E:
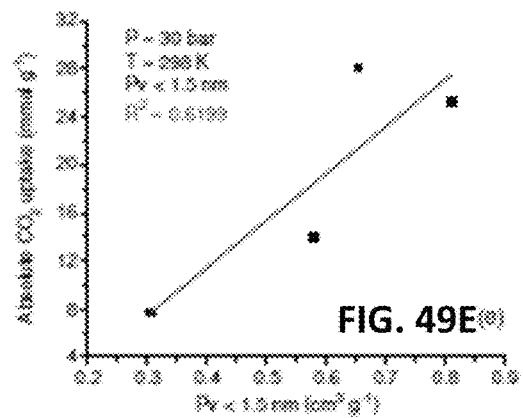
Figure 49F:
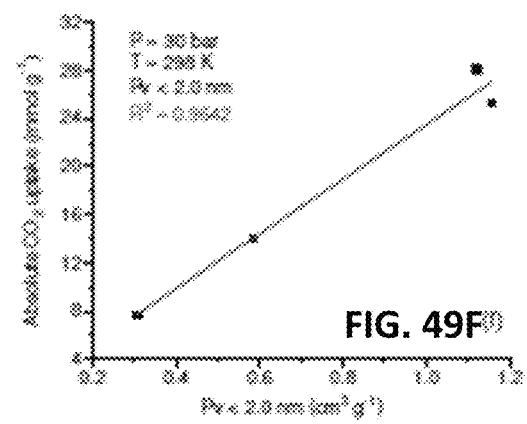
Figure 49G:
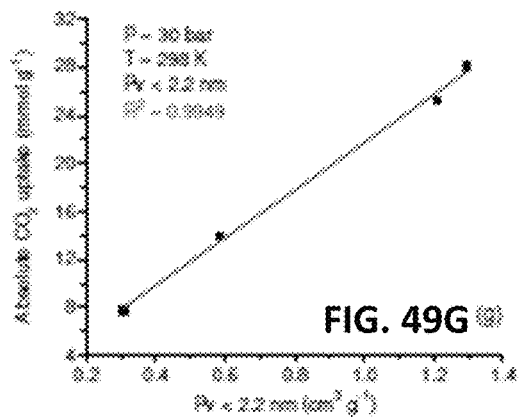
Figure 49H:
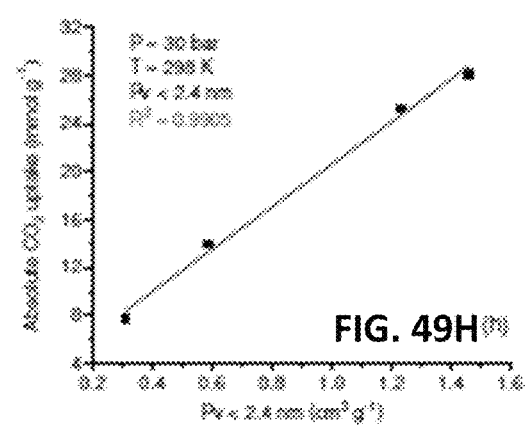

FIGS. 47A and B are graphs showing cyclic voltammograms for BIDCZ-2-900-based supercapacitor at scan rates of 1, 5, and 10 mV s$^{-1}$ (FIG. 47A) and scan rates of 20, 50, and 100 mV s$^{-1}$ (FIG. 47B).

FIGS. 48A-H are graphs showing CO2 uptake versus nitrogen content at different temperatures at 0.1 bar (FIGS. 48A-D) and at 1 bar (FIGS. 48E-H).

FIGS. 49A-H are graphs showing $CO_2$ uptake at 298 K versus volume of large micropores and narrow mesopores where FIGS. 49A-D show surface excess uptake and FIGS. 49E-H show absolute uptake.

Figure 50A:
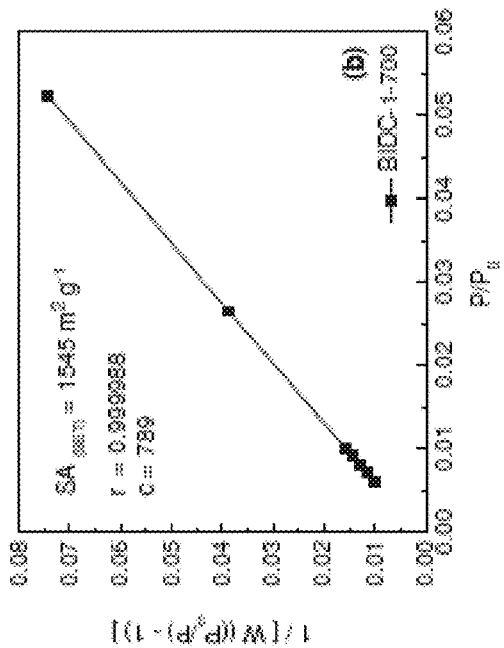
Figure 50B:
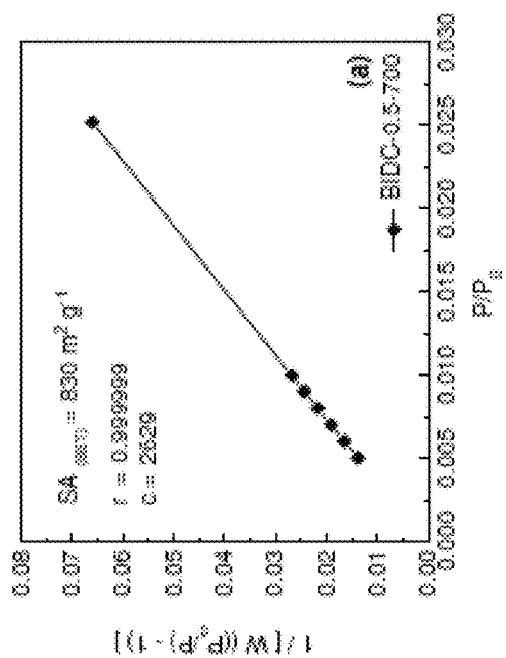
Figure 50C:
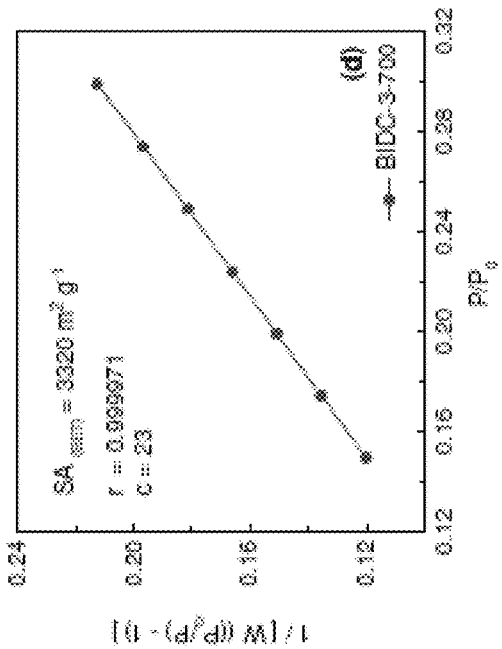
Figure 50D:
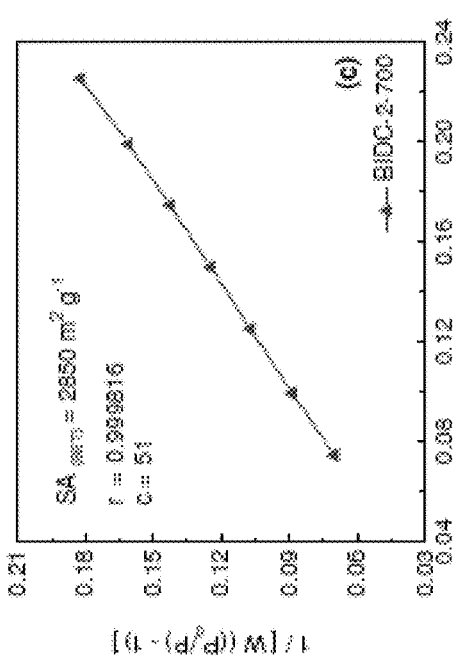
Figure 52A:
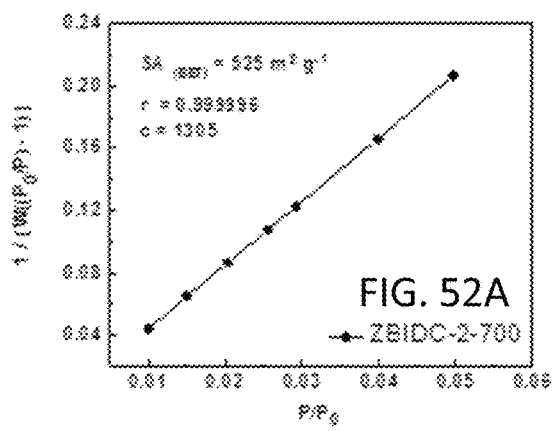
Figure 52B:
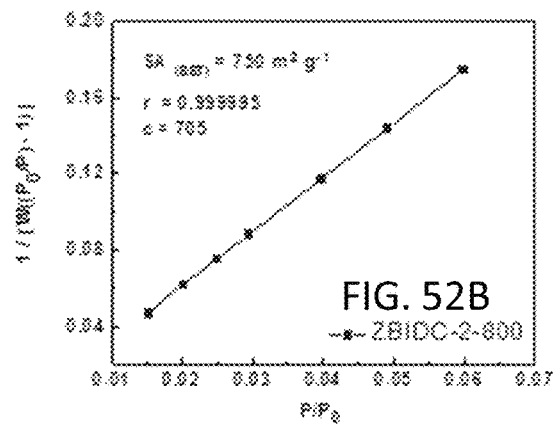
Figure 52C:
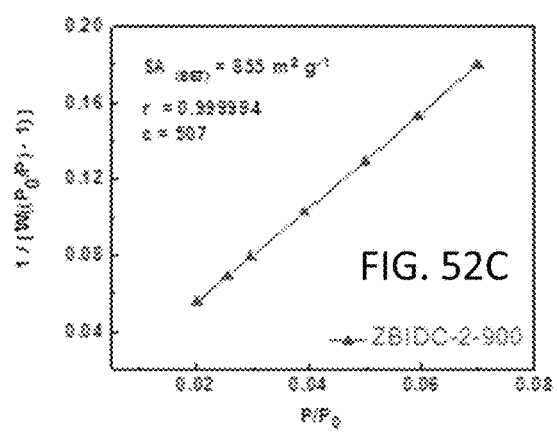
Figure 52D:
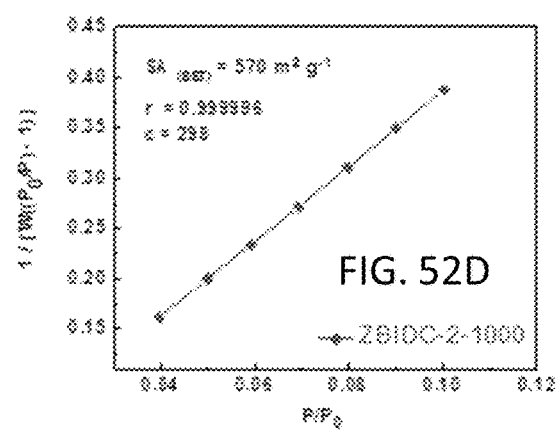
Figure 52E:
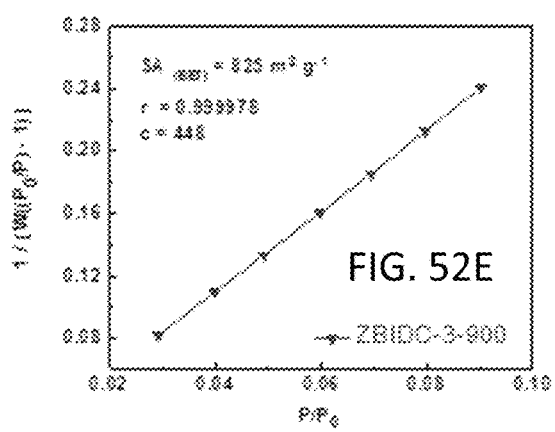
Figure 52F:
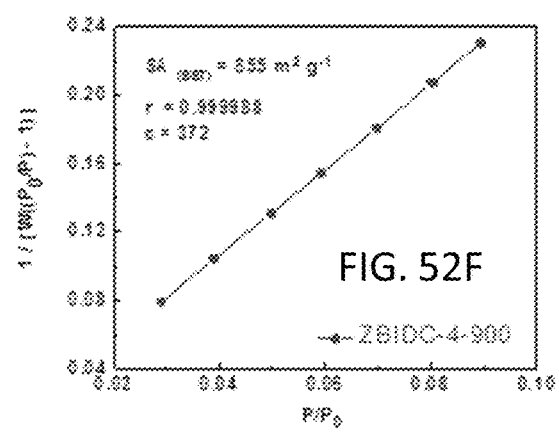
Figure 53A:
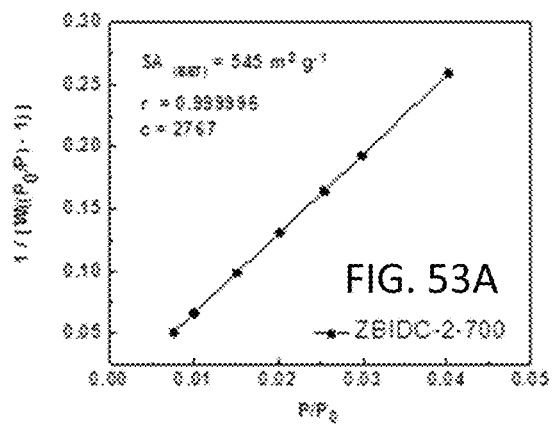
Figure 53B:
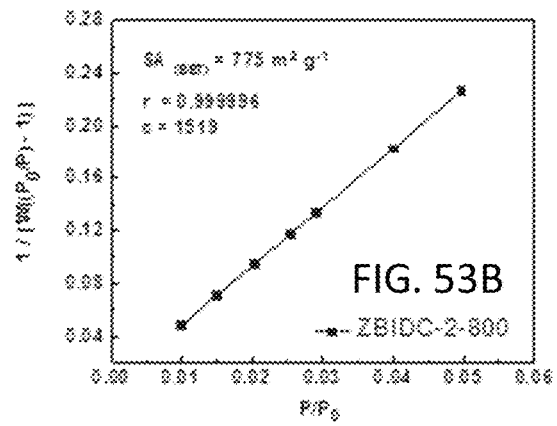
Figure 53C:
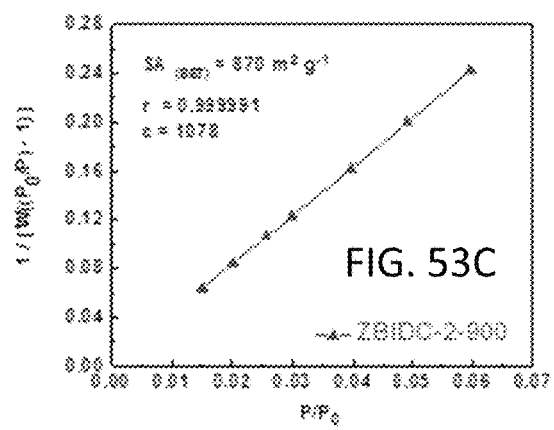
Figure 53D:
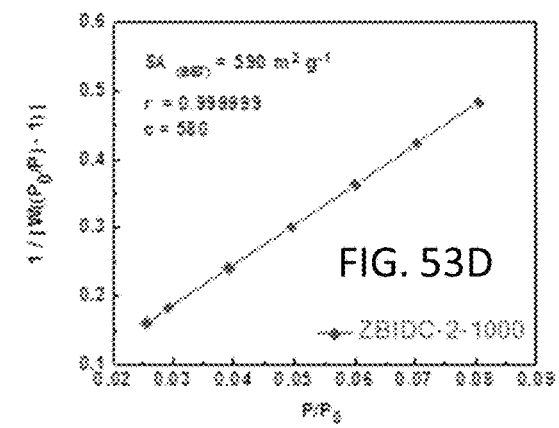
Figure 53E:
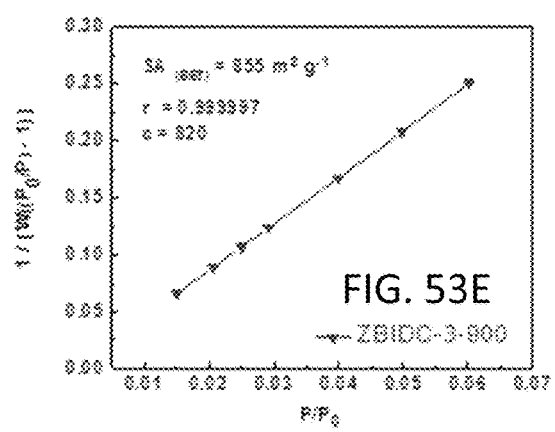
Figure 53F:
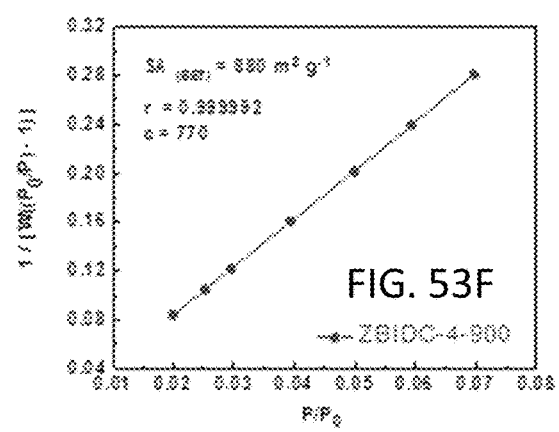

FIGS. 50A-D are graphs showing BET plots for BIDCs from the Ar adsorption isotherms at 87 K for BIDC-0.5-700 (FIG. 50A); BIDC-1-700 (FIG. 50B); BIDC-2-700 (FIG. 50C) and BIDC-3-700 (FIG. 50D) (W=Weight of gas adsorbed at $P/P_0$, r=Correlation coefficient, c=C constant).

FIG. 51 is a table of ultramicropore volumes for different pore diameters.

FIGS. 52A-F are graphs of BET plots for ZBIDCs from Ar adsorption isotherms at 87 K (W=Weight of gas adsorbed at $P/P_0$, r=Correlation coefficient, c=C constant).

FIGS. 53A-F are graphs of BET plots for ZBIDCs from $N_2$ adsorption isotherms at 77 K (W=Weight of gas adsorbed at $P/P_0$, r=Correlation coefficient, c=C constant).

FIG. 54 is a table showing the capacitive performance of recently reported N-doped carbons in literature (all data obtained at 1 A g$^{-1}$ and 1 M $H_2SO_4$).

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Unless otherwise specifically stated, as used herein, the term "about" is understood as within a range of normal tolerance in the art, for example within 2 standard deviations of the mean. The term "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments of the invention provide methods for the synthesis of highly porous heteroatom(s) doped-carbons through a single step, solvent-free, scalable and reproducible process. Further, embodiments provide heteroatom doped-carbons synthesized through methods of the invention. The porous heteroatom doped-carbons show exceptionally high $CO_2$ uptake at low pressures as well as high capacitance, which make them very promising for carbon dioxide capture and sequestration (CCS) and energy storage applications, respectively.

According to one embodiment, the present invention provides a method of synthesis of a nitrogen-doped porous carbon that includes a one-step activation of a solid-state mixture of a heterocyclic aromatic organic compound or compounds containing nitrogen (e.g. precursor) with an activating reagent such as zinc chloride and/or potassium hydroxide and/or sodium hydroxide. The reagents are activated under heat at a temperature sufficient to induce pyrolysis of the solid-state mixture to form a nitrogen-doped porous carbon.

The heterocyclic aromatic organic compound can be any such compounds with a sufficient nitrogen content. According to embodiments, the nitrogen content of the heterocyclic organic precursor compound can be at least about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40 or more weight percentage of the heterocyclic organic compound, and may be in any range encompassing these values. According to embodiments, the heterocyclic aromatic organic compound contains nitrogen in pyrrolic and/or pyridinic positions. In embodiments, the heterocyclic aromatic organic compound may be any compound listed in Formula I-VI below:

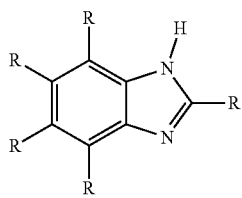

Formula I

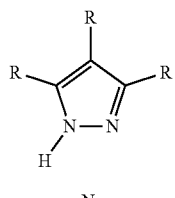

Formula II

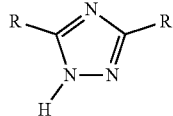

Formula III

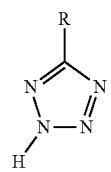

Formula IV

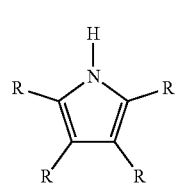

Formula V

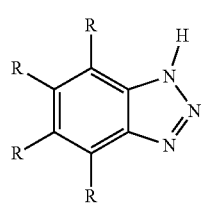

Formula VI

R = H, Alkyl, Aryl

In preferred embodiments, the heterocyclic aromatic organic compound may be any compound listed in Formula II, Formula III, and Formula V above.

In a specific embodiment, the heterocyclic aromatic organic compound is benzimidazole.

According to embodiments, the heterocyclic aromatic organic compound is first mixed with activating reagents such as zinc chloride or potassium hydroxide or sodium hydroxide in their solid states (i.e. as a solventless mixture). This is accomplished by mixing the chemicals in their solid forms with a mortar and pestle, blender, blade mixer, auger, rotor mixer, and the like. Further, in some embodiments, such as activating reagents that come in pelleted form, the reagents are first ground to a fine powder to facilitate mixing.

To minimize exposure to moisture, the reagents can be stored and mixed in a glovebox or in a room with reduced humidity, or purged with an inert gas such as argon to remove traces of air during mixing. Further, in embodiments, the solid state mixture does not include a metal organic framework compound.

In embodiments, the reagents are mixed at a weight ratio of activating reagent to precursor of about 0.5 to about 4.0, including about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3, about 3.1, about 3.2, about 3.3, about 3.4, about 3.5, about 3.6, about 3.7, about 3.8, and about 3.9, or any range encompassing these values. However, other embodiments may include weight ratios of activator to precursor that are lower than 0.5 or higher than 4.0.

In embodiments, after mixing the solid state mixtures are then transferred to a temperature-programmed tube furnace and purged at ambient temperature with an Ar flow to remove traces of air. The samples are then heated to a temperature sufficient to induce pyrolysis of the solid state mixture to form a nitrogen-doped porous carbon.

In embodiments, the solid state mixtures may be heated at a ramp rate of 1° C./min to 10° C./min, including 2° C./min, 3° C./min, 4° C./min, 5° C./min, 6° C./min, 7° C./min, 8° C./min, or 9° C./min. However, other embodiments may be heated at slower or faster ramp rates. The temperatures may be ramped up to a target temperature sufficient to induce pyrolysis is reached.

The target temperature to induce pyrolysis will depend on the specific reagents used, but, according to embodiments, can be in the range of about 700° C. to about 1000° C., including about 750° C., about 800° C., about 850° C., about 900° C., and about 950° C., or any range encompassing these values. In some embodiments, the target temperature to induce pyrolysis is at about the melting temperature of the activator reagent or higher. However, other embodiments may be heated at a target temperature less than or greater than this range. Not wishing to be bound by theory, the activator compound not only retains its important role as a reaction medium but also acts as a catalyst for the polymerization as the temperature increases above its melting point. In embodiments, the target temperature is maintained for at least about 0.5 hours, about 1.0 hours, about 1.5 hours, about 2.0 hours, or longer.

According to embodiments, the nitrogen-doped porous carbon resulting from heating are cooled to room temperature, and then washed with HCl to remove metallic potassium, zinc, and residual salts. Further purification can be performed by washing carbons with distilled water and ethanol. The resulting synthetic carbon is a highly fluffy powder.

According to additional embodiments, a low boiling point binder is used to convert the synthetic porous carbon powder resulting from the methods of the invention to a more dense configuration. In this embodiment, a hot press can be applied to shape the carbon powder to pellet or other dense configuration and also evaporate the binder. In this way, the nitrogen-doped porous carbon can be configured in any shape.

Additional embodiments include any nitrogen-doped porous carbon capable of being prepared by the methods of the invention. The nitrogen-doped porous carbons prepared by methods of the invention have superior properties with respect to $CO_2$ uptake and/or specific capacitance.

Exemplary embodiments of nitrogen-doped porous carbons of the invention include those with a surface area in the range of about 350-855 $m^2\ g^{-1}$ and a total pore volume in the range of about 0.21-0.33 $cm^3\ g^{-1}$.

Other exemplary embodiments of the nitrogen-doped porous carbons of the invention include those with a surface area in the range of about 300 to about 900 $m^2\ g^{-1}$, including about 325, about 350, about 375, about 400, about 425, about 450, about 475, about 500, about 525, about 550, about 575, about 600, about 625, about 650, about 675, about 700, about 725, about 750, about 775, about 800, about 825, about 850, and about 875 $m^2\ g^{-1}$ and/or a total pore volume in the range of about 0.15 to about 0.35 $cm^3\ g^{-1}$ including about 0.16, about 0.17, about 0.18, about 0.19, about 0.20, about 0.21, about 0.22, about 0.23, about 0.24, about 0.25, about 0.26, about 0.27, about 0.28, about 0.29, about 0.30, about 0.31, about 0.32, about 0.33, or about 0.34 $cm^3\ g^{-1}$, and ranges encompassing these values.

Other exemplary embodiments of the nitrogen-doped porous carbons of the invention include those with a surface area in the range of about 830-3320 $m^2\ g^{-1}$ and a total pore volume in the range of about 0.33-1.89 $cm^3\ g^{-1}$.

Other exemplary embodiments of the nitrogen-doped porous carbons of the invention include those with a surface area in the range of about 800 to about 3500 $m^2\ g^{-1}$, including about 900, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3100, about 3200, about 3300, and about 3400 $m^2\ g^{-1}$ and/or a total pore volume in the range of about 0.30 to 2.0 $cm^3\ g^{-1}$, including about 0.35, about 0.40, about 0.45, about 0.50, about 0.55, about 0.60, about 0.65, about 0.70, about 0.75, about 0.80, about 0.85, about 0.90, about 0.95, about 1.00, about 1.05, about 1.1, about 1.15, about 1.20, about 1.25, about 1.30, about 1.35, about 1.40, about 1.45, about 1.50, about 1.55, about 1.60, about 1.65, about 1.70, about 1.75, about 1.80, about 1.85, about 1.90, and about 1.95 $cm^3\ g^{-1}$, and ranges encompassing these values.

Other exemplary embodiments of nitrogen-doped porous carbons of the invention include those in which at least 90% of total pores have a pore size in the range of about 0.4-8 nm.

Other exemplary embodiments of nitrogen-doped porous carbons of the invention include those in which nitrogen is present in an amount ranging from about 3 to about 18 wt %, including about 4, about 5, about 6, about 7, about 8, about 9, about 10, about 11, about 12, about 13, about 14, about 15, about 16, about 17 wt %, and/or oxygen is present in an amount ranging from about 10 to about 15 wt %, including about 11, about 12, about 13, about 14 wt %, and/or carbon is present in an amount ranging from 69-84 wt %, including about 70, about 71, about 72, about 73, about 74, about 75, about 76, about 77, about 78, about 79, about 80, about 81, about 82, about 83 wt %, and ranges encompassing these values.

Other exemplary embodiments of nitrogen-doped porous carbons of the invention include those with a $CO_2$ surface excess uptake of up to about 25 mmol/g at 30 bar and 298 K.

Other exemplary embodiments of nitrogen-doped porous carbons of the invention include those with an excess $CO_2$ adsorption capacity at 30 bar ranging from about 7-25 mmol/g.

Other exemplary embodiments of nitrogen-doped porous carbons of the invention include those a $CO_2$ capture capacity ranging from: about 0.9-2.9 mmol/g at 273 K and a pressure of about 0.1 bar, or about 1.2-3.5 mmol/g at 273 K and a pressure of about 0.15 bar, or about 0.4-1.6 mmol/g at 298 K and a pressure of about 0.1 bar, or about 0.6-2.03 mmol/g at 298 K and a pressure of about 0.15 bar, or about 0.2-0.8 mmol/g at 323 K and a pressure of about 0.1 bar, or about 0.3-1.06 mmol/g at 323 K and a pressure of about 0.15 bar, or about 5.5-8.42 mmol/g at 273 K and a pressure of about 1 bar, or about 3.1-5.46 mmol/g at 298 K and a pressure of about 1 bar, or about 1.7-3.27 mmol/g at 323 K and a pressure of about 1 bar.

Other exemplary embodiments of nitrogen-doped porous carbons of the invention include those in which the nitrogen is present in an amount ranging from 5-13 wt %.

Other exemplary embodiments of nitrogen-doped porous carbons of the invention include those in which the nitrogen-doped porous carbon has a surface area of about 350 $m^2/g$ and a total pore volume of about 0.15 $cm^3/g$.

Other exemplary embodiments of nitrogen-doped porous carbons of the invention include those which have: about 5 wt % nitrogen; and/or a surface area of about 350 $m^2/g$; and/or a pore volume of about 0.15 $cm^3/g$; and/or a gravimetric specific capacitance in the range of about 141-351 F/g at a current density ranging from about 0.5-15 A/g in $H_2SO_4$.

Other exemplary embodiments of nitrogen-doped porous carbons of the invention include those which have: about 7-13 wt % nitrogen; and/or a surface area of about 525-855 $m^2\ g^{-1}$; and/or a total pore volume in the range of about 0.21-0.33 $cm^3\ g^{-1}\ m^2/g$; and/or a gravimetric specific capacitance in the range of about 101-332 $F\ g^{-1}$ at a current density of 1 $A\ g^{-1}$ in 1 M $H_2SO_4$.

Other exemplary embodiments of nitrogen-doped porous carbons of the invention include those described in the Examples.

Other embodiments include a supercapacitor comprising any benzimidazole-derived carbon described(s) in this disclosure, including the Examples.

Other embodiments include a supercapacitor comprising an electrode, wherein the electrode comprises a benzimidazole-derived carbon of the invention.

In embodiments, the electrode may be an anode or a cathode.

In embodiments, the supercapacitor can further comprise an electrolyte, a separator, and/or a current collector.

In embodiments, the supercapacitor is configured as an electric double layer capacitor with an anode, a cathode, a separator between the anode and cathode, a current collector in operable connection with the anode, a current collector in operable connection with the cathode, and an electrolyte having positive and negative ions between the anode and the cathode.

Further, embodiments of the invention include the supercapacitor in operable connection with an electrical circuit such as a printed circuit board.

Additional embodiments include a carbon dioxide capture device comprising any benzimidazole-derived carbon(s) described in this disclosure, including the Examples.

Additional embodiments include a method of capturing carbon dioxide, comprising adsorbing carbon dioxide with a benzimidazole-derived carbon of the invention.

Additional embodiments include a method of capturing carbon dioxide comprising exposing the benzimidazole-derived carbon of the invention to ambient air such that the carbon dioxide is adsorbed from the ambient air.

Additional embodiments include a method of capturing carbon dioxide comprising exposing the benzimidazole-derived carbon of the invention to flue gas such that the carbon dioxide is adsorbed from the flue gas.

Additional embodiments include a method of capturing carbon dioxide comprising exposing the benzimidazole-derived carbon of the invention to exhaust gas such that the carbon dioxide is adsorbed from the exhaust gas.

Additional embodiments include a method of capturing carbon dioxide comprising exposing the benzimidazole-derived carbon of the invention to landfill gas such that the carbon dioxide is adsorbed from the landfill gas.

EXAMPLES

The following examples serve to further illustrate the invention. However, they should not be construed to limit the invention in any way.

By way of background, in EXAMPLE 1 the inventors report a facile, template-free, one-step and scalable synthesis of nanoporous carbons (benzimidazole derived carbons, or BIDCs) by using an N-rich heterocyclic building block, benzimidazole, as a cheap and commercially available single source precursor of both carbon and nitrogen. Further, the inventors found that the use of KOH as an activator not only inhibits the sublimation of the benzimidazole precursor through salt formation but also generates fine porosity upon increasing the temperature. Furthermore, the inventors discovered that KOH introduces oxygen functionalities into the structure of the prepared porous carbons making the material very effective for selective $CO_2$ adsorption. The synergistic effects of heteroatoms and fine micropores on $CO_2$ separation at low pressure (0.1 bar) and the role of hierarchical pores on $CO_2$ storage at high-pressure (30 bar) are for beneficial to designing advanced sorbents.

In EXAMPLE 2, the inventors again employ benzimidazole, a heterocyclic building block with 25 wt. % nitrogen content, as a sole precursor of carbon and nitrogen in the synthesis of nanoporous carbons. The intrinsic aromatic structure and arrangement of nitrogen atoms in pyridinic and pyrrolic positions in benzimidazole advocate the formation of graphitic nitrogen-doped carbon with minimum driving force. The inventors report a straightforward, one-step and solvent-free synthetic reaction which involves physical mixing of benzimidazole with zinc chloride followed by pyrolysis at high temperatures. The multifaceted roles of zinc chloride concerning complex formation, facilitation of the polymerization-carbonization processes and pore generation are also reported. In EXAMPLE 2, the $ZnCl_2$-activated benzimidazole derived carbons (ZBIDCs) feature a modest surface area, high nitrogen-doping levels and a suitable degree of graphitization. It was found that variation of synthesis temperature can be used as a tool to precisely control the porous texture and surface chemistry of ZBIDCs while these properties remained unaffected by altering the amount of $ZnCl_2$. Further in EXAMPLE 2, the inventors further evaluated the electrochemical performance of ZBIDCs as electrode materials for supercapacitor applications. The resultant carbons offer superior capacitive behavior because of the cooperative effects of the electric double layer and Faradaic transitions. The solvent- and template-free nature of the inventors' synthetic procedure coupled with the extremely low price and commercial availability of benzimidazole and $ZnCl_2$ reagents promote an environmentally friendly and scalable production method. Furthermore, high yield, desirable electrochemical performance and robust cyclic stability of ZBIDCs suggest potential advantages for the industrialized application of supercapacitors.

EXAMPLE 3 is a proof of concept of the energy storage applications of $ZnCl_2$-activated benzimidazole derived carbons (ZBIDCs) in which the inventors prepared one sample and characterized its electrochemical performance.

Example 1

Results

Synthetic Strategy.

Figure 1B:
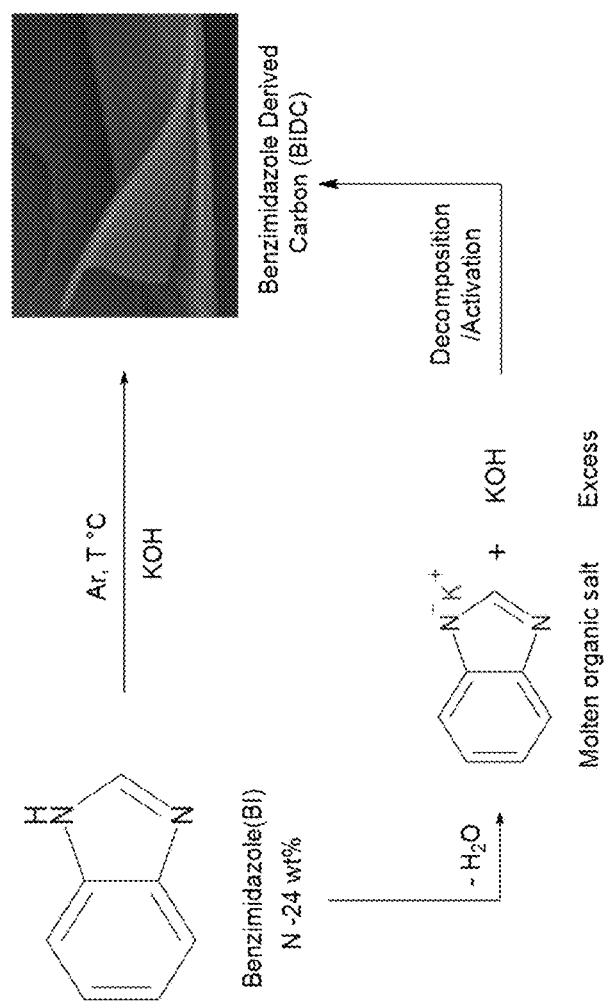
FIG. 1B is a schematic illustration of a reaction scheme of the synthesis of benzimidazole derived carbons (BIDCs)
Figure 1A:
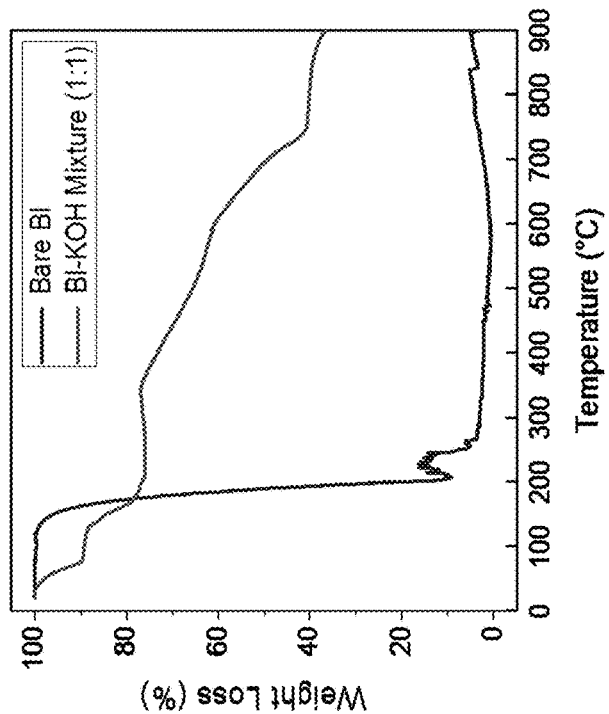
FIG. 1A is a graph showing thermogravimetric analysis of pure organic building block versus a mixture of benzimidazole (BI) with KOH.

The inventors have attempted the synthesis of N-doped porous carbons by direct carbonization of the benzimidazole (BI) building block because of its high nitrogen content; however, this attempt resulted in complete mass loss due to sublimation/decomposition of the benzimidazole which starts at ~190° C. under atmospheric pressure as evidenced by TGA (FIG. 1A). To address this issue, the inventors took advantage of the low melting point (170-174° C.) and reactive nature of benzimidazole toward strong bases like KOH which leads to potassium-N benzimidazole salt formation prior to carbonization steps under high temperatures (see Grevy J M, Tellez F, Bernés S, Noth H, Contreras R, Barba-Behrens N. Coordination compounds of thiabendazole with main group and transition metal ions. *Inorg Chim Acta* 339, 532-542 (2002)). This strategy not only suppresses premature sublimation/decomposition of BI but also ensures subsequent activation to introduce porosity. Upon heating the BI—KOH mixture to the melting point of BI, KOH reacts with molten BI to yield a nonvolatile potassium-N benzimidazole salt (FIG. 1B). Thermal activation of the resultant salt proceeds by means of excess KOH present in the system and further heating of the mixture according to well-known mechanisms such as etching (by redox reactions), gasification (by evolving gaseous species such as $H_2O$ and $CO_2$) and expansion (by metallic potassium) of carbon framework (see Wang J, Heerwig A, Lohe M R, Oschatz M, Borchardt L, Kaskel S. Fungi-based porous carbons for $CO_2$ adsorption and separation. *J Mater Chem* 22, 13911-13913 (2012)). The transformation of BI to benzimidazole-derived carbons (BIDCs) is depicted in FIG. 1B. To examine the textural and chemical characteristics of BIDCs as a function of KOH/BI ratio, four samples were made by tuning the KOH/BI weight ratio (0.5, 1, 2 and 3) at 700° C. It should be noted that any KOH to BI ratio less than 0.5 resulted in poor activation while ratios higher than 4 led to the formation of totally burnt and over activated products.

Structural Characterization.

The morphology of BIDCs was examined by scanning electron microscopy (SEM) imaging, which revealed sheet-like morphologies with diverse thickness and rough topography promoted by BI melting prior to activation/carbonization (FIGS. 2A and B and FIG. 3). The ratio of KOH does not seem to have any significant effect on the texture and morphology of BIDCs. The transmission electron microscopy (TEM) images of BIDCs (FIG. 2C and FIGS. 4A-D) show mainly disordered slit-shape micropores randomly distributed all over the microstructure. The so-called "worm-like" interlocked pore structure is formed by stacking of curved graphene layers. The homogenous distribution of N, O and C in BIDCs was confirmed by energy-dispersive X-ray spectroscopy (EDS) elemental mapping (FIGS. 2D-G). The structure of BIDCs was investigated by wide angle X-ray diffraction (XRD) and Raman spectroscopy. As depicted in FIG. 5, no sharp peaks are observed in the XRD patterns, which is indicative of the amorphous nature of BIDCs. The Raman spectra (FIG. 6) clearly indicate well-resolved D-band peak at 1350 $cm^{-1}$ and G-band at 1600 $cm^{-1}$. The low IG/ID ratios confirm that BIDCs have no pronounced degree of graphitization and contain a significant amount of disordered sections and defects, which is consistent with HRTEM data.

The X-ray photoelectron spectroscopy (XPS) survey of BIDCs reveals the presence of the C 1 s peak, N 1 s peak, and O 1 s peak at 284, 400 and 530 eV, respectively (FIG. 7). It is worth mentioning that porous carbons obtained by chemical activation with oxidants (e.g. NaOH, H3PO4 and KOH) usually contain a considerable amount of oxygen. The nature of oxygen and nitrogen moieties on the surface of prepared BIDCs was further investigated by deconvolution of their is core level spectra. For oxygen, three main contributions are visible in the high-resolution O 1 s: i) C=O quinone type oxygen at 531 eV (O4), ii) C—OH phenol and/or C—O—C ether groups at 533 eV (O-II) and iii) COOH carboxylic groups and/or water at 536 eV (O-III). See Hulicova-Jurcakova D, Seredych M, Lu G Q, Bandosz T J. Combined Effect of Nitrogen- and Oxygen-Containing Functional Groups of Microporous Activated Carbon on its Electrochemical Performance in Supercapacitors. *Adv Funct Mater* 19, 438-447 (2009). For nitrogen, four peaks around 398, 400, 401 and 405 eV represent pyridinc (N-6), pyrrolic and/or pyridonic (N-5), quaternary (N-Q) and pyridine-N-oxide (N—X), respectively. See Pels J R, Kapteijn F, Moulijn J A, Zhu Q, Thomas K M. Evolution of nitrogen functionalities in carbonaceous materials during pyrolysis. *Carbon* 33, 1641-1653 (1995). The pyridonic nitrogen most likely has the major contribution to the N-5 type due to the presence of appreciable amount of oxygen as previously discussed (FIG. 8, FIGS. 9A-D and FIGS. 10A-D).

Textural Properties.

The Ar adsorption isotherms (at 87 K) were collected to assess textural properties of BIDCs (FIG. 11A and FIG. 12). Notably, all carbon materials feature high Brunauer-Emmett-Teller (BET) surface area (830-3320 $m^2$ $g^{-1}$) and large total pore volume (0.33-1.89 $cm^3$ $g^{-1}$) with respect to their nonporous monomer precursor. The Ar isotherms of samples activated at KOH to BI ratios of 0.5 and 1 show microporous type-I behavior featured by a sharp rise at very low pressure ($P/P_0$<10-3 bar) and a plateau for most of the remaining $P/P_0$ pressure range. On the other hand, BIDC-2-700 and BIDC-3-700 exhibit a hybrid of type I and IV isotherms with gradual increase in uptake after rapid initial rise, which indicates the presence of narrow mesopores (2-5 nm). The pore size distribution (PSD) analysis from Ar isotherms (87 K) based on quenched solid density functional theory (QSDFT) model, which is widely employed for carbons with heterogeneous pore walls (see Zhu Y, et al. Carbon-Based Supercapacitors Produced by Activation of Graphene. *Science* 332, 1537-1541 (2011)), also supports the formation of micropores in all four samples. The results illustrated in FIG. 11B show pore width maxima centered at 4.3 A (BIDC-0.5-700), 4.5/7.4 A (BIDC-1-700), 5/9.3/14.8 A (BIDC-2-700), and 4.7/9.6/19.1/25 A (BIDC-3-700). A pore diameter of 5 A which is present in the pore size distribution of all BIDCs is slightly higher than the kinetic diameter of $CO_2$ (3.3 A) and expected to be beneficial to effective $CO_2$ capture. The ratio of the micropore volume to the total pore volume ($V_{mic}/V_{total}$) calculated from cumulative pore volume branch of PSD curves provides a reasonable measure for microporosity level. The obtained percentages of microporosity reveal that BIDC-0.5-700 and BIDC-1-700 consist of nearly pure micropores with respect to 89 and 60 percent achieved for BIDC-2-700 and BIDC-3-700, respectively (FIG. 12). It should be noted that the formation of narrow mesopores in BIDC-2-700 and BIDC-3-700 does not occur at the expense of widening of initially formed micropores since their micropore volume is higher than pure microporous carbons. It has been shown that after generation of initial porosity the porous structure will be shaped by two pathways: pore deepening and pore widening. The use of low amount of activator favors pore deepening and formation of pure micropores. However, pore widening takes place alongside pore deepening when a higher amount of porogen is used (see Kuhn P, Forget A, Su D, Thomas A, Antonietti M. From Microporous Regular Frameworks to Mesoporous Materials with Ultrahigh Surface Area: Dynamic Reorganization of Porous Polymer Networks. *J Am Chem Soc* 130, 13333-13337 (2008); and Hu X, Radosz M, Cychosz K A, Thommes M. $CO_2$—Filling Capacity and Selectivity of Carbon Nanopores: Synthesis, Texture, and Pore-Size Distribution from Quenched-Solid Density Functional Theory (QSDFT). *Environ Sci Technol* 45, 7068-7074 (2011)).

$CO_2$ Capture at Low Pressure.

Due to the high level of basic heteroatoms on the pore walls and large micropore volume of BIDCs, the inventors decided to evaluate their performance as $CO_2$ adsorbents at low pressure. Therefore, the $CO_2$ capture capacities were measured at 273, 298, 323, 348, and 373 K up to 1.0 bar (FIGS. 13A-C and FIGS. 14A-B). The uptake values at 0.1 and 1 bar are shown in FIGS. 15 and 16. It should be noted that the adsorption capacity at 0.1 bar is very important because it represents a realistic partial pressure of $CO_2$ in flue gas (see Granite E J, Pennline H W. Photochemical Removal of Mercury from Flue Gas. *Ind Eng Chem Res* 41, 5470-5476 (2002)). The results clearly demonstrate the outstanding $CO_2$ uptake capacity of BIDCs even at high temperatures. At 273 K and 1 bar BIDC-1-700 reaches a remarkable value of 8.42 mmol $g^{-1}$. BIDC-1-700 also shows the highest overall uptake of 5.46 and 3.27 mmol $g^{-1}$ at 298 and 323 K, respectively. Such high capture capacity outperforms most of reported carbons under similar condition (FIG. 17). At very low-pressure region, the CO2 uptake trends are slightly different. At 0.1 bar, BIDC-0.5-700 exhibits unprecedentedly high uptakes of 2.90, 1.60 and 0.80 mmol $g^{-1}$ at 273, 298, and 323 K, respectively. The uptake values at 0.15 bar are also provided in FIG. 15 for comparison with other literature works. The discrepancy between the low pressure and final $CO_2$ uptake of these two samples can also be observed in their $CO_2$ isotherms by an intersection point. This intersection point takes place at P=0.25 bar for 273 K isotherm and shifts to higher values of P=0.45 and 0.85 bar for 298 K and 323 K isotherms, respectively. A review of the literature reveals that narrow micropores can effectively strengthen the interaction between pore walls and $CO_2$ molecules. (see Sevilla M, Fuertes A B. $CO_2$ adsorption by activated templated carbons. *J Colloid Interface Sci* 366, 147-154 (2012); Wickramaratne N P, Jaroniec M. Activated Carbon Spheres for $CO_2$ Adsorption. *ACS Appl Mater Interfaces* 5, 1849-1855 (2013); and Fan X, Zhang L, Zhang G, Shu Z, Shi J. Chitosan derived nitrogen-doped microporous carbons for high performance $CO_2$ capture. *Carbon* 61, 423-430 (2013)). The strong interaction of narrow pores (0.4 to 0.8 nm) with $CO_2$ molecules originates from the overlap of the potential fields of opposite pore walls (see Nugent P, et al. Porous materials with optimal adsorption thermodynamics and kinetics for $CO_2$ separation. *Nature* 495, 80-84 (2013)). More specifically, Presser et al. (see Presser V, McDonough J, Yeon S-H, Gogotsi Y. Effect of pore size on carbon dioxide sorption by carbide derived carbon. *Energy Environ Sci* 4, 3059-3066 (2011)) showed that in order to achieve a high $CO_2$ uptake for carbide-derived carbons (CDCs) at 1 bar and 273 K, pores smaller than 0.8 nm are preferred while at lower pressure of 0.1, pores smaller than 0.5 nm have more pronounced effect. In a similar fashion to CDCs, the inventors investigated the effect of various pore size on the $CO_2$ uptake at 0.1 and 1 bar for BIDCs (FIGS. 18A-H, 19A-H, 20A-H, and 21A-H). The inventors observed that $CO_2$ uptakes at 1 bar (273 K) and 0.1 bar (273 K) yield the best correlation with the volume of pores smaller than 0.8 nm and 0.5 nm, respectively. At 298 K and 1 bar, pores smaller than 0.6 nm govern the uptake process while at 0.1 bar, the major contribution originates from pores below 0.5 nm. At higher temperatures of 323 and 348 K, the effective pore volume shifts to lower size of 0.4 nm and 0.5 for uptakes at 0.1 and 1 bar, respectively. Although the impact of narrow micropores agrees with the findings reported for CDCs, the ultrahigh uptake of BIDCs especially at low partial pressures (1.60 mmol g-1 at 0.1 bar and 298 K) cannot be solely rationalized by the pore size effect. The enhancement of $CO_2$ adsorption capacity especially at low pressure region might also be caused by basic functionalities on the pore walls via dipole-quadrupolar interaction and hydrogen bonding interactions. (see Xing W, et al. Superior $CO_2$ uptake of N-doped activated carbon through hydrogen-bonding interaction. *Energy Environ Sci* 5, 7323-7327 (2012)). The impact of nitrogen surface groups, as the most frequently studied heteroatom, on enhancing $CO_2$ uptake of numerous porous polymers and carbons is fully investigated (see Sevilla M, Fuertes A B. $CO_2$ adsorption by activated templated carbons. *J Colloid Interface Sci* 366, 147-154 (2012); Rabbani M G, El-Kaderi H M. Template-Free Synthesis of a Highly Porous Benzimidazole-Linked Polymer for $CO_2$ Capture and H2 Storage. *Chem Mater* 23, 1650-1653 (2011); and Arab P, Rabbani M G, Sekizkardes A K, İslamoğlu T, El-Kaderi H M. Copper(I)-Catalyzed Synthesis of Nanoporous Azo-Linked Polymers: Impact of Textural Properties on Gas Storage and Selective Carbon Dioxide Capture. *Chem Mater* 26, 1385-1392 (2014). However, the role of oxygen functionalities in $CO_2$ adsorption of activated carbons is widely underestimated thus far. It should be noted that formation of oxygen functionalities under oxidative condition is unavoidable as it was confirmed earlier by XPS and elemental analysis for BIDCs. In a similar manner to the nitrogen functionalities, the electron-rich oxygen sites induce further polarity into the carbon frameworks and contribute more positively to the initial $CO_2$ uptake at low pressure range (see Torrisi A, Mellot-Draznieks C, Bell R G. Impact of ligands on $CO_2$ adsorption in metal-organic frameworks: First principles study of the interaction of $CO_2$ with functionalized benzenes. I. Inductive effects on the aromatic ring. *J Chem Phys* 130, 194703 (2009); and Liu Y, Wilcox J. Effects of Surface Heterogeneity on the Adsorption of $CO_2$ in Microporous Carbons. *Environ Sci Technol* 46, 1940-1947 (2012)). In general, basic heterogeneity on the pore walls are able to anchor $CO_2$ molecule either thorough dipole-quadrupole interactions or hydrogen bonding. The inventors investigated the impact of nitrogen functionalities as the dominant heteroatom on $CO_2$ uptake at different temperatures (FIGS. 48A-H). The inventors' results reveal very high correlation coefficient between N doping levels and $CO_2$ uptake at 0.1 bar for all studied temperatures. Nonetheless, the correlation between total uptake at 1 bar and nitrogen content is highly contingent upon working temperature and is more pronounced at higher temperatures. While no correlation was observed between uptake at 273 K and nitrogen level (lead to negative R2), increasing the temperature to 348 K yields a significantly higher correlation ($R^2$=0.9329). The inventors further proved the key role of heteroatoms by collecting $CO_2$ isotherms at a much higher temperature (373 K). The results confirmed that BIDC-0.5-700 and BIDC-1-700, which have the highest nitrogen content levels, are still able to capture $CO_2$ but BIDC-2-700 and BIDC-3-700 with remarkably lower nitrogen contents show negligible uptake (FIGS. 14A and B and FIG. 16). Considering the increased kinetic energy of $CO_2$ molecules at higher temperatures, the uptake process is mostly governed by strong electrostatic interaction between adsorbate-surface heterogeneity rather than relatively weak interaction between $CO_2$ and pore walls.

To investigate the strength of the interaction between $CO_2$ molecules and BIDCs, isosteric heat of adsorption ($Q_{st}$) was calculated by fitting the $CO_2$ adsorption isotherms at 273 and 298 K for each sample to the virial equation (see Czepirski L, JagieŁŁo J. Virial-type thermal equation of gas-solid adsorption. *Chem Eng Sci* 44, 797-801 (1989)). At zero coverage, the Qst values decrease from 35.16 to 24.36 kJ $mol^{-1}$ as the KOH to BI ratio increases from 0.5 to 3 (FIG. 13D). Although the heat of adsorption is influenced by both pore wall heterogeneity and ultrafine porosity, the higher value of 35 kJ $mol^{-1}$ calculated for BIDC-0.5-700 is mainly due to the interaction of its basic functionalities (17.6 wt % nitrogen and 10.5 wt % oxygen) with $CO_2$ molecules. This becomes more realistic when the inventors compare the $Q_{st}$ for BIDC-0.5-700 with dopant free yet ultrafine porous carbons. For example, the $Q_{st}$ of 27.8 kJ $mol^{-1}$ was reported for PAF-1-45038 (97 wt % C and 3 wt % H) which synthesized by direct carbonization of PAF-1 with almost similar micropore volume and pore size to BIDC-0.5-700 (see FIG. 17 for more $Q_{st}$ values of recent reported carbons). It can be concluded that at low relative pressures, surface heterogeneity together with ultrafine micropores are more beneficial to $CO_2$ uptake whereas larger micropores play dominant role at higher pressures.

Selectivity and Working Capacity.

To assess the potential of BIDCs for on-site gas separation applications, both high $CO_2$ uptake and selectivity are desired. Ideal adsorbents should discriminate between $CO_2$ molecules and undesirable small gases in the mixture such as $N_2$ (flue gas) and gas $CH_4$ (landfill). Accordingly, the ideal adsorption solution theory (IAST) assuming 10/90 mixture of $CO_2/N_2$ and 50/50 mixture of $CO_2/CH_4$ was used for selectivity studies (FIGS. 13E and F and FIGS. 22A-C, 23A-C, 24A-C, and 25A-C). Additionally, the selectivity values were calculated by initial slope (IS) method for comparison (FIGS. 26A-D and 27A-D). The results obtained from both methods (FIG. 15) are consistent and show that BIDC-0.5-700, which contains the highest amount of heteroatoms and ultrafine pores, outperforms the other samples. The greater quadrupole moment and polarizability of $CO_2$ molecule with respect to $N_2$ and $CH_4$ molecules benefits its strong interaction with heterogonous pore walls and results in high selectivity values (see Bae Y S, Lee C H. Sorption kinetics of eight gases on a carbon molecular sieve at elevated pressure. *Carbon* 43, 95-107 (2005)). The $CO_2$/$CH_4$ selectivity for BIDC-0.5-700 at 298 K reaches a remarkable value of 12.4 (13.2 by IS), which makes it promising for $CO_2$ removal from landfill gas and natural gas mixtures. It should be emphasized that between two important $CO_2$-philic sites, heteroatoms on the pore walls and fine micropores, the former is considered as the key contributor to the selective $CO_2$ capture. In fact, ultrafine pores generated during activation and/or carbonization will also benefit adsorption of undesirable small gases such as $N_2$ and $CH_4$ in the mixture; a drawback that impairs separation processes (see Patel H A, et al. Unprecedented high-temperature $CO_2$ selectivity in $N_2$-phobic nanoporous covalent organic polymers. *Nat Commun* 4, 1357 (2013)).

The inventors further evaluated the performance of BIDCs in $CO_2$ separation using the sorbent evaluation criteria described by Bae and Snurr (see Bae Y-S, Snurr R Q. Development and Evaluation of Porous Materials for Carbon Dioxide Separation and Capture. *Angew Chem, Int Ed* 50, 11586-11596 (2011)). These criteria should be considered together for a comprehensive evaluation of sorbents as it gives insight into the trade-off between gas uptake and selectivity described above. Therefore, this analysis can help to identify promising sorbent candidates for gas separation under different industrial conditions by means of sorption data from pure gas isotherms. These criteria can be summarized as $CO_2$ uptake under adsorption conditions (N1 ads); working $CO_2$ capacity ($\Delta$N1), difference between $CO_2$ uptake capacity at the adsorption pressure (N1 ads) and the desorption pressure (N1 des); regenerability (R), ($\Delta$N1/N1 ads)×100%; selectivity under adsorption conditions ($\alpha$12ads); sorbent selection parameter (S) is defined as S=($\alpha$12ads)2/($\alpha$12des)×($\Delta$N1/$\Delta$N2) where superscripts ads and des represent the adsorption and desorption conditions, respectively. Since the S value combines the selectivity and the working capacity (uptake) of the gases, it provides an insight into trade-off between these two parameters.

Methane-fired power plants are feasible alternative to the coal-fired power plants because of their lower carbon footprint. However, methane rich gases like natural gas and landfill gas are contaminated with $CO_2$ which needs to be separated in order to increase the energy density of such fuels (see Farha O K, et al. Chemical reduction of a diimide based porous polymer for selective uptake of carbon dioxide versus methane. *Chem Commun* 46, 1056-1058 (2010)). Here, the inventors considered the landfill gas composition as equimolar mixture of $CO_2$ and $CH_4$, and vacuum swing adsorption (VSA) process that operates between 1 bar (adsorption pressure) and 0.1 bar (desorption pressure). As it is depicted in FIG. 28A, the synergistic effect of abundant heteroatoms and ultrafine pores in BIDC-0.5-700 resulted in remarkable $CO_2$ uptake (3.8 mol kg$^{-1}$) at 298 K and 0.5 bar for 50/50 ($CO_2/CH_4$) mixture, and therefore a noteworthy working capacity of $CO_2$ (2.77 mol kg$^{-1}$). Thanks to its simultaneous high working capacity and selectivity, BIDC-0.5-700 outperforms all of the materials listed in FIG. 28A in terms of S values. The Ni-MOF-74 exhibits similar $CO_2$ working capacity (3.16 mol kg$^{-1}$) to BIDC-1-700 (3.01 mol kg$^{-1}$) under similar condition despite benefiting from open metal sites (see Bae Y-S, Snurr R Q. Development and Evaluation of Porous Materials for Carbon Dioxide Separation and Capture. *Angew Chem, Int Ed* 50, 11586-11596 (2011)). In addition, BIDC-1-700 present 79.9% regenerability value, which is ~58% higher compared to Ni-MOF-74 caused by optimal $Q_{st}$ value of the former. It is important to note that porous organic frameworks like NPOF-1-NH2 and SNU-Cl-va exhibit higher S value than BIDC-1-700; however, the much lower working capacities of the formers' will limit their use for gas separation (see Arab P, Rabbani M G, Sekizkardes A K, İslamoğlu T, El-Kaderi H M. Copper(I)-Catalyzed Synthesis of Nanoporous Azo-Linked Polymers: Impact of Textural Properties on Gas Storage and Selective Carbon Dioxide Capture. *Chem Mater* 26, 1385-1392 (2014); and Xie L H, Suh M P. High $CO_2$-capture ability of a porous organic polymer bifunctionalized with carboxy and triazole groups. *Chemistry* 19, 11590-11597 (2013)). The high working capacity and moderate selectivity of BIDC-1-700 result in high S value which makes it a promising solid adsorbent for carbon dioxide separation from methane-rich gases.

Another industrially important gas mixture that needs to be separated from $CO_2$ is the flue gas. For flue gas separation $CO_2/N_2$ mixture is considered to be 10/90 and adsorption and desorption pressures are taken to be 1 bar and 0.1 bar, respectively, under VSA conditions. Since the partial pressure of $CO_2$ is lower in the flue gas compared to landfill gas, the initial $CO_2$ uptake (at 0.1 bar) is much more important. As previously discussed, high percentage of micropore volume and $CO_2$-philic sites are known to increase $CO_2$ uptake at low partial pressures. BIDC-0.5-700 contains 17.6 wt. % nitrogen and 97% of its pores are micropores which give rise to significant $CO_2$ uptake (1.82 mol kg$^{-1}$) at 0.1 bar and 298 K. Therefore, the working capacity of the BIDC-0.5-700 is ~29% higher than that of BIDC-1-700. The high binding affinity for $CO_2$ (35.2 kJ mol$^{-1}$) in BIDC-0.5-700 results in high $CO_2/N_2$ selectivity (58), and thus, a remarkable sorbent selection parameter value (S=355). The results of FIG. 28B indicate that both ZIF-78 and SNU-Cl-va present the high S values because of their very low N2 working capacities ($\Delta$N2). However, because of their low $CO_2$ working capacities, their practical use is limited.

$CO_2$ Storage Properties of BIDCs.

The separated carbon dioxide at room temperature needs to be stored at much high pressures before its long-term storage in geological sites. Owing to the well-developed porous structure (surface area, pore volume and pore size distribution) of BIDCs, their $CO_2$ storage capacity under elevated pressure was evaluated. According to pore size distribution studies (FIG. 11B), BIDC-2-700 and BIDC-3-700 consist of a hierarchy of larger micropores and narrow mesopores along with high surface area and pore volume. These features are known to favor $CO_2$ storage at elevated pressure. The surface excess $CO_2$ isotherms obtained at 298 K and up to 40 bar as well as the calculated absolute uptakes are plotted in FIGS. 29A and B and FIGS. 30A-D. The numerical values for uptake at 30 bar and the volume of larger micropores and narrow mesopores are listed in FIG. 31. At 298 K, the excess $CO_2$ adsorption capacity at 30 bar was found to be 7.3 mmol g$^{-1}$ (BIDC-0.5-700), 13.1 mmol g$^{-1}$ (BIDC-1-700), 23.4 mmol g$^{-1}$ (BIDC-2-700), and 25.3 mmol g$^{-1}$ (BIDC-3-700). A closer look at FIGS. 29A and B reveals that the $CO_2$ isotherms of BIDC-0.5-700 and BIDC-1-700 reach their plateau at ~10 bar, while the uptakes for BIDC-2-700 and BIDC-3-700 continue to increase due to the presence of larger pores in these samples. In a similar study to the low pressure uptake dependency and pore volume discussed above (FIGS. 49A-H), the inventors noticed that both surface excess and absolute uptakes at 30 bar demonstrate the best correlation with the volume of pores smaller than 2.2 nm. The inventors' results are in agreement with the literature findings that $CO_2$ uptake at relatively low pressure regions is mainly governed by the volume of ultramicropore while the total pore volume of micropores and narrow mesopores (2-4 nm) have a more pronounced effect at high pressures (see Casco M E, Martínez-Escandell M, Silvestre-Albero J, Rodríguez-Reinoso F. Effect of the porous structure in carbon materials for $CO_2$ capture at atmospheric and high-pressure. *Carbon* 67, 230-235 (2014)).

DISCUSSION

In summary, the synthesis of novel oxygen- and nitrogen-doped activated carbons has been demonstrated by a facile, solvent-free, cost-effective, and readily reproducible synthetic approach. The material was synthesized by one-step chemical activation of inexpensive benzimidazole building units, which serves as single source precursors of both carbon and nitrogen. The synthetic parameters can be adjusted to tailor the textural properties and heteroatom content in order to achieve the best gas sorption properties. The BIDC-0.5-700 with a high amount of dopants and ultrafine pore volume exhibited the outstanding $CO_2$ capture capacity of 1.60 mmol g$^{-1}$ at 0.1 bar as well as the highest $CO_2/CH_4$ selectivity of 12.4 (with LAST method) at 298 K. The BIDC-1-700 with a slightly lower amount of heteroatoms yet higher amount of larger micropores featured the highest $CO_2$ uptake of 5.46 mmol g$^{-1}$ at 1 bar and 298 K. The sample BIDC-3-700 with the lowest amount of basic functionalities but well developed hierarchy of larger micro and narrow mesopores exhibited the highest $CO_2$ surface excess uptake of 25.32 mmol g$^{-1}$ at 30 bar and 298 K. The inventors' synthetic protocol is reproducible and scalable and can easily be extended to other heterocyclic compounds, which meet the criteria.

Methods

Synthesis of BIDCs.

Potassium hydroxide (Alfa Aesar, ACS, 85% min, $K_2CO_3$ 2.0% max pellets) and benzimidazole (TCI America, >98%) were stored in a glovebox and used as received. To minimize the effect of ambient moisture, various ratios of as received BI and KOH mixed inside glovebox prior to carbonization. The mixtures then were transferred to a temperature-programmed tube furnace and purged at ambient temperature with an Ar flow to remove traces of air. The carbonization at elevated temperatures under Ar flow was performed at a ramp rate of 5° C./min and hold time of 1 h. After cooling to room temperature, the black carbon samples were soaked and washed three times with HCl (1.0 M) to remove metallic potassium and residual salts. Further purification was performed by washing carbons with distilled water and ethanol, respectively. The obtained benzimidazole derived carbons are designated as "BIDC-x-y," where the "x" indicates KOH to BI weight ratio and "y" represents targeted activation temperature. The resulting activated carbons were degassed under vacuum at 200° C. for 12 h prior to any gas sorption measurements.

Characterization methods. Low pressure Ar, $CO_2$, $CH_4$, and $N_2$ adsorption-desorption isotherms were measured on an Autosorb-iQ2 volumetric adsorption analyzer (Quantachrome Inc.) using ultrahigh purity grade adsorbates. The specific surface area of the samples was calculated using the Brunauer-Emmett-Teller (BET) method. Incremental pore size distributions (PSD) were obtained from equilibrium branch of Ar (at 87 K) isotherms by the QSDFT (quench solid density functional theory) method assuming slit-like geometry on the carbon material kernel. The volume of micropores ($V_{Mic}$) was estimated by cumulative pore size distribution curves and corresponding volume at pore size of 2 nm. The volume of ultramicropores ($V_0$<0.7 nm) was estimated from $CO_2$ (at 273 K) isotherms after adjustment of $CO_2$ partial pressure at 273 K. The scanning electron microscopy (SEM) images were obtained using a Hitachi SU-70 scanning electron microscope. The samples were prepared by dispersing each specimen onto the surface of a sticky carbon attached to a flat aluminum sample holder. Then the samples were coated with platinum at a pressure of 10$^{-5}$ mbar in a $N_2$ atmosphere for 60 s before SEM imaging. Elemental analyses of carbon, nitrogen, hydrogen, oxygen, and ash were performed at the Midwest Microlab, LLC. The X-ray photoelectron spectroscopy (XPS) analysis was performed on a Thermo Fisher Scientific ESCALAB 250 spectrometer employing Al Kα (1486.68 eV) X-ray source equipped with a hemispherical analyzer. To prepare the samples for XPS measurements, the carbon specimen was pressed into a piece of indium foil, which was mounted on the sample holder using double-sided sticky tape. During XPS analysis, a combination of a low-energy electron flood gun and an argon ion flood gun was utilized for charge compensation. The binding energy scale was calibrated by setting the C 1 s peak at 285.0 eV. The XPS data were analyzed with Thermo Avantage software (v4.84). The transmission electron microscopy (TEM) work was done at Center for Advanced Microscopy, Michigan State University using JEM-2200FS with an in-column energy filter operated at 200 kV. The microscope is fitted with an ultra-high-resolution (UHR) pole piece with the point resolution of 0.19 nm and high angle dark field scanning transmission electron microscopy resolution of 0.13 nm. The analytical work was done with the attached Oxford INCA system with energy resolution of 140 eV. The images were collected with Gatan Multiscan camera with 1024×1024 resolution.

Selectivity and Heat of Adsorption Calculation.

The pure component isotherms of $CO_2$ measured at 273, 298 and 323 K were fitted with the dual-site Langmuir (DSL) model by the following equation:

$$q = q_A + q_B = q_{sat,A}\frac{b_A p}{1+b_A p} + q_{sat,B}\frac{b_B p}{1+b_B p}$$

with T-dependent parameters $b_A$ and $b_B$ are defined as follows:

$$b_A = b_{AO}\exp\left(\frac{E_A}{RT}\right), b_B = b_{BO}\exp\left(\frac{E_B}{RT}\right)$$

where, q is molar loading of adsorbate (mol kg$^{-1}$), $q_{sat}$ is saturation loading (mol kg$^{-1}$), b is parameter in the pure component Langmuir isotherm (Pa$^{-1}$), p is bulk gas phase pressure (Pa), −E is heat of adsorption (J mol$^{-1}$), R is ideal gas constant (8.314 J mol$^{-1}$ K$^{-1}$), T is absolute temperature (K), subscripts A and B refers to site A and site B, respectively.

Since the pure component isotherms of $CH_4$ and $N_2$ do not show any inflection characteristic, they were fitted with the single-site Langmuir (SSL) model by the following equation:

$$q = q_{sat,A}\frac{b_A p}{1+b_A p}$$

with T-dependent parameter $b_A$ is defined as follows:

$$b_A = b_{AO}\exp\left(\frac{E_A}{RT}\right)$$

Pure-component isotherm fitting parameters were then used for calculating Ideal Adsorbed Solution Theory (IAST) (see Myers A L, Prausnitz J M. Thermodynamics of mixed-gas adsorption. *AIChE J* 11, 121-127 (1965)) binary-gas adsorption selectivities, $S_{ads}$, which is calculated as:

$$S_{ads} = \frac{q_1/q_2}{p_1/p_2}$$

$CO_2$ fitting parameters also were used to calculate the isosteric heats of adsorption using Clasius-Clapeyron equation.

With this invention, for the first time the inventors managed to convert an inexpensive, commercially available organic moiety to a valuable doped carbon. It should be emphasized that to fulfill this approach, no specific cutting edge instrument such as high pressure machine or PVD and CVD was utilized. In fact, the inventors took advantage of the chemical structure of specific organic building block (benzimidazole) and applied a simple and straightforward method to convert it to desired porous carbon. One of the aspects of this method, which distinguishes it from similar processes, is using a single source precursor which intrinsically has the inventors' main element (carbon) and desired heteroatom (nitrogen). Furthermore, by mixing it with KOH another heteroatom (oxygen) can also be doped into the carbon framework. Using organic building block as a precursor and converting it to doped carbon without any extra steps is a new process. This is definitely an improvement to existing process which demands multiple steps for making precursor, pre-carbonization of a precursor and dealing with hazardous chemicals (such as organic solvents, strong acid and based, etc.). On the contrary, the inventors' method is based on solid-state mixing of two commercially available substances and subsequent heat treatment.

The inventors primarily tested these carbons for $CO_2$ capture and separation and results were phenomenal. The inventors also expect these materials to be useful for storing natural gas at high pressures. Moreover, due to conductivity of carbon materials as well as their porous structure they can be employed as electrodes for supercapacitors, oxygen reduction reaction, Li-ion batteries and fuel cells. They also are useful as metal-free catalyst.

During the last decade numerous solid sorbents have been developed for carbon dioxide capture including metal organic frameworks (MOFs), porous organic polymers (POPs) and traditional zeolites/silica and activated carbons. However, MOFs and POPs usually demand complicated chemistry steps which involved using organic solvents. They also suffer from various drawbacks such as low yield, irreproducibility, sensitivity to moisture and very high cost of commercialization. Commercial zeolite, silica and activated carbons also show mediocre adsorption capacity. Their porous structure also cannot be manipulated other than post-synthetic functionalization which is time-consuming, chemically hazardous and cost-effective.

The appearance of the synthetic carbon produced by the methods of the invention is highly fluffy powder. Considering the huge volume they occupied regarding their small mass, they need to be compressed to be useful in real practical applications. This challenge can be addressed by using a low boiling point binder for sticking all particles together. Then a hot press can be applied to shape the carbon powder to pellet or other dense configuration and also evaporate the binder.

Example 2

Results and Discussion
Synthetic Approach and Structural Properties.
It has been well-documented that $ZnCl_2$ as a pore forming agent initiates the activation process by promoting structural dehydration if biomass is used as a carbon precursor (see F. Caturla, M. Molina-Sabio, F. Rodríguez-Reinoso, *Carbon* 1991, 29, 999). However, further pore development is usually inhibited due to $ZnCl_2$ reaction with the precursor after initial dehydration. Accordingly, $ZnCl_2$ activation of hydrothermally pretreated biomass precursors leads to the highest surface area and pore volume at 500° C. (see M. Molina-Sabio, F. Rodríguez-Reinoso, *Colloids Surf., A* 2004, 241, 15; and M. Olivares-Marín, C. Fernández-González, A. Macías-García, V. Gómez-Serrano, *Appl. Surf. Sci.* 2006, 252, 5967). It should be mentioned that benzimidazole sublimes if heated by itself while its complexation with $ZnCl_2$ inhibits the premature sublimation. In contrast to the activation process of biomass precursors by $ZnCl_2$, the BI—$ZnCl_2$ mixture at 500° C. yields a uniform molten phase without notable carbonization. To explain how $ZnCl_2$ activates BI, a plausible mechanism focusing on the multiple roles of $ZnCl_2$ in the reaction mixture must be provided. The primary function of $ZnCl_2$ at low temperatures is to bridge the benzimidazole building blocks and form a complex (see E. Sahin, S. Ide, M. Kurt, S. Yurdakul, *J. Mol. Struct.* 2002, 616, 259) as shown in FIG. 32. Contrary to the volatile BI, the in-situ formed BI—$ZnCl_2$ complex has the capacity to endure further high temperature calcination and suppress sublimation. As shown in FIG. 32, a minimum stoichiometric BI to $ZnCl_2$ ratio of 2/1 is needed to achieve the maximal transformation of precursor to carbon. At temperatures above 300° C. ($ZnCl_2$ melts at 290° C.), the condensed BI—$ZnCl_2$ complex forms a homogeneous mixture with the excess $ZnCl_2$ which initially designed to be present in the system. As the temperature increases, the excess $ZnCl_2$ not only retains its important role as a reaction medium but also acts as a catalyst for the polymerization (see P. Kuhn, M. Antonietti, A. Thomas, *Angew. Chem., Int. Ed.* 2008, 47, 3450; and P. Kuhn, A. Forget, D. Su, A. Thomas, M. Antonietti, *J. Am. Chem. Soc.* 2008, 130, 13333). Antonietti et al. suggested that the binary salt systems ($ZnCl_2$ and other chlorides) act as localized templates and leaving groups for the pore formation during carbonization of ionic liquids (see N. Fechler, T.-P. Fellinger, M. Antonietti, *Adv. Mater.* 2013, 25, 75). If the same statement holds true for the single salt system as in this work, then it can be concluded that initial pores evolve from small $ZnCl_2$ clusters. Furthermore, the remaining $ZnCl_2$ in the system decomposes at temperatures above 700° C. (the boiling point of $ZnCl_2$ is 730° C.) and leaves behind a large fraction of fine pores. Finally, removal of the chemicals trapped inside the pores of the newly formed carbon via acid washing results in the ultimate porous structure.

The structures of ZBIDCs prepared at various temperatures were analyzed by XRD, Raman spectroscopy, and SEM (FIGS. 33A-F). As shown in FIG. 33A. the XRD pattern of ZBIDCs displayed distinct peaks centered at 25 and 43 which are indexed to the (002) and (100) planes of the graphitic layers, respectively (see Y. Zhu, S. Murali, M. D. Stoller, K. J. Ganesh, W. Cai, P. J. Ferreira, A. Pirkle, R. M. Wallace, K. A. Cychosz, M. Thommes, D. Su, E. A. Stach, R. S. Ruoff, *Science* 2011, 332, 1537). The absence of any additional peaks indicates the effective removal of any metals and/or salt crystalline phases during the previously described washing process. The broad and low-intensity diffraction peaks observed in this study suggest a less-ordered stacking of graphite layers due to the smaller graphitic regions and the local distortion of carbon lattice by nitrogen incorporation. In general, high activation temperatures provide the necessary driving force for the formation of more crystalline domains and promote a higher degree of graphitization. As shown in FIG. 33B, the Raman spectrum features two characteristic D-band and G-band peaks at 1340 and 1600 cm$^{-1}$, respectively. The D-band results from structural defects and partially disordered structures whereas the G-band originates from sp$^2$-hybridized graphitic carbon atoms (see A. Sadezky, H. Muckenhuber, H. Grothe, R. Niessner, U. Pöschl, *Carbon* 2005, 43, 1731). The ratio of the D-band to the G-band intensities ($I_D/I_G$) is commonly interpreted as a disorder degree of the carbon matrix. All samples displayed similar $I_D/I_G$ values near to unity, which suggests the existence of both ordered and disordered carbon domains. Nevertheless, the lowest $I_D/I_G$ observed for carbon synthesized at 900° C. indicates a higher degree of graphitization with respect to other carbons. The results from the Raman spectrum and XRD pattern of ZBIDCs indicate a partial graphitic order with crystalline domains, which promises a good conductivity. The SEM images of ZBIDC-2-900 as the representative carbon at different magnifications together with BI precursor are presented in FIGS. 33C-D. The carbon microstructure consisted of large plates featuring high degrees of irregularity, rough surface, diverse thickness and entirely different shapes from the large blocks of parent BI. The formation of this morphology probably initiated by formation of uniform BI—$ZnCl_2$ melt at early stages of heat treatment and then followed by nucleation of new phase from molten media at higher temperatures.

Textural Properties and Compositional Studies.

Ar (at 87 K) and $N_2$ (at 77 K) adsorption-desorption isotherms were collected to assess the porous parameters of ZBIDCs. It is noteworthy that Ar was chosen over $N_2$ as the IUPAC recommended adsorbate for assessing microporous systems. This is because the quadrupole moment of the $N_2$ molecules can interact with a variety of surface heterogeneities and lead to a possible change in micropore filling pressure and inaccurate micropore size distribution (see M. Thommes, K. Kaneko, A. V. Neimark, J. P. Olivier, F. Rodriguez-Reinoso, J. Rouquerol, K. S. W. Sing, Pure Appl. Chem. 2015, 87, 1051). The Ar (87 K) adsorption isotherms and the corresponding pore size distribution (PSD) curves of ZBIDCs are depicted in FIGS. 34A and B. According to the very recent IUPAC classification (see M. Thommes, K. Kaneko, A. V. Neimark, J. P. Olivier, F. Rodriguez-Reinoso, J. Rouquerol, K. S. W. Sing, Pure Appl. Chem. 2015, 87, 1051) all studied ZBIDCs displayed type I(b) isotherms which are featured by a steep uptake at very low partial pressure region and a plateau for the rest of the pressure range. The summarized results in FIG. 35 show that all carbon materials present a moderate Brunauer-Emmett-Teller (BET) surface area and total pore volume in a range of 525-855 $m^2 g^{-1}$ and 0.21-0.33 $cm^3 g^{-1}$, respectively. The surface area and pore volume of obtained carbons increased with an increase in activation temperature up to 900° C. suggesting the effectiveness of the activation process. At a higher temperature of 1000° C., the collapse of porous architecture resulted in a lower surface area and pore volume. The pore size distribution curves of ZBIDCs were realized to be entirely confined to the diameters below 2 nm with three prominent peaks centered around 0.3, 0.5 and 1 nm. It was also observed that the intensity of peaks representing the ultrafine pores (0.3 and 0.5 nm) diminished as the temperature of activation increased while the 1 nm peak became broader and more intense. The wider distribution of pores with 1 nm size in ZBIDC-2-900 compared to ZBIDC-2-1000 can be correlated to the pore shrinkage of the latter. It should be noted that a wide distribution of micropores larger than 0.5 nm could be electrochemically accessible to the aqueous electrolyte ions (see X. Wei, X. Jiang, J. Wei, S. Gao, Chem. Mater. 2016, 28, 445; and A. G. Pandolfo, A. F. Hollenkamp, J. Power Sources 2006, 157, 11). To investigate the effect of $ZnCl_2$ amount on porosity parameters, three samples were synthesized by varying $ZnCl_2$/BI to 1, 3 and 4 at a fixed temperature of 900° C. which previously found to yield the optimum surface area and pore size distribution. To compare the porosity levels, the Ar isotherms of these carbons are collected and the results along with ZBIDC-2-900 are presented in FIGS. 36A-B and FIG. 37. ZBIDC-3-900 and ZBIDC-4-900 featured almost similar BET surface area and pore volume to ZBIDC-2-900. The very low surface area and pore volume realized for ZBIDC-1-900 indicate that the amount of used $ZnCl_2$ was large enough to merely generate carbon material, but not sufficient to develop porosity. Microporous nature of ZBIDC-3-900 and ZBIDC-4-900 contradicts the results of other literature studies implying that higher ratios of $ZnCl_2$ to precursor may promote the formation of mesopores (N. Fechler, T.-P. Fellinger, M. Antonietti, Adv. Mater. 2013, 25, 75; X. Deng, B. Zhao, L. Zhu, Z. Shao, Carbon 2015, 93, 48). It is understood that for ZBIDCs the temperature of activation is a key factor to control the porous parameters while the $ZnCl_2$ to precursor ratio plays marginal role on the pore development. To ensure a fair comparison, the $N_2$ (77 K) isotherms along with their derived pore size distribution curves and porosity parameters of carbons are also collected and shown in FIGS. 36C-E and FIG. 37.

The porous carbon obtained by the inventors' synthetic route featured notably higher yields (FIG. 35) in comparison with other activation methods. The inventors previously showed that the carbon obtained by KOH activation of benzimidazole linked-polymer at temperature of 800° C. and activator to precursor weight ratio of 2 gave only 13% yield (see B. Ashourirad, A. K. Sekizkardes, S. Altarawneh, H. M. El-Kaderi, Chem. Mater. 2015, 27, 1349). This is because KOH activation etches away the majority of carbon framework to generate small pores. On the contrary, the carbon sample prepared by $ZnCl_2$ activation and under similar conditions in this study (ZBIDC-2-800) offered 62% yield. The notably higher yield of carbons achieved by the inventors' present synthetic approach would be beneficial for large-scale production.

The CHNO elemental analysis (EA) and X-ray photoelectron spectroscopy (XPS) techniques were performed to evaluate the detailed elemental composition and the nature of nitrogen species of ZBIDCs. The results are summarized in FIG. 35 and FIG. 38. The survey spectra of ZBIDCs (FIG. 39) displayed three pronounced signals at around 285, 399, and 532 eV, which are attributed to the C 1 s, N 1 s, and O 1 s, respectively. Due to the oxygen- and water-free nature of the chemicals and controlled synthetic atmosphere used in this research work, the formation of oxygenated functionalities as dopants similar to what was observed in KOH-activated carbons (see S.-J. Park, W.-Y. Jung, J. Colloid Interface Sci. 2002, 250, 93) highly unlikely. Consequently, the presence of oxygen peaks in the full survey spectra can be attributed to the oxidation of indium foil used as substrate and the absorption of water from ambient during sample preparation and handling. This claim is evidenced by the lower percentage of oxygen compared to KOH-activated carbons (up to 25 wt. %) along with small amount of indium recorded for the composition of ZBIDCs (FIG. 38). The comparable amount of nitrogen obtained by two methods is indicative of successful and uniform incorporation of nitrogen into the carbon matrix. Residual mass in EA method can be justified by incomplete combustion which is a common phenomenon for carbon materials (see N. Fechler, T.-P. Fellinger, M. Antonietti, Adv. Mater. 2013, 25, 75). Furthermore, minor amounts of Zn and Cl detected by XPS are probably related to the $ZnCl_2$ trapped inside closed pores (see J. Pampel, T.-P. Fellinger, Adv. Energy Mater. 2016, 6, n/a). It is noteworthy that the nitrogen content obtained by EA results was slightly higher than XPS data because the latter is a surface sensitive technique while the former is a bulk analysis method. Therefore, the percentage of nitrogen obtained by EA will be used as the more reliable data for future discussion. The initial observation revealed a very high level of nitrogen doping varying in the 7.7-12.7 wt. % range. The nitrogen content decreased upon increasing the activation temperature and remained unaffected when higher amounts of $ZnCl_2$ used. The $ZnCl_2$-activated benzimidazole displayed noticeably higher nitrogen content when compared to their KOH-activated counterparts (see B. Ashourirad, P. Arab, T. Islamoglu, K. A. Cychosz, M. Thommes, H. M. El-Kaderi, *J. Mater. Chem. A* 2016, 4, 14693). For instance, under similar synthetic conditions (T=700° C. and activator/precursor weight ratio=2) $ZnCl_2$-activation afforded 12.7 wt. % with respect to 5.7 wt. % nitrogen doping level obtained by KOH-activation. This can be explained with the etching mechanism of KOH activation for pore formation resulting in more carbon and heteroatom elimination during the thermal treatment. To further gain insight into the evolution of nitrogen moieties during chemical activation and carbonization, the N 1 s spectra of ZBIDCs was peak fitted and deconvoluted. In general, four main contributors (FIG. 40) can be identified in the high-resolution N 1 s of a nitrogen-doped carbon: (i) pyridinic (N-6, 398 eV), (ii) pyrrolic and/or pyridonic (N-5, 400 eV), (iii) quaternary (N-Q, 401 eV), and (iv) pyridine-N-oxide (N—X, 403-406 eV) (see J. R. Pels, F. Kapteijn, J. A. Moulijn, Q. Zhu, K. M. Thomas, *Carbon* 1995, 33, 1641). The simple structure of the benzimidazole precursor consists of solely pyrrolic and pyridinic entities which are located inside the pentagonal ring (see B. Ashourirad, A. K. Sekizkardes, S. Altarawneh, H. M. El-Kaderi, *Chem. Mater.* 2015, 27, 1349). As shown in FIGS. 41A-D, the nitrogen environments in the resulting ZBIDCs also divide into two major components, which are found to be pyridinic-N(398.4 eV), and pyrrolic-N(400.4 eV). The slight impurity at higher energy (404.1 eV) is probably oxidized-N species. Interestingly, the intensity of quaternary nitrogen type which can be originated from other forms of nitrogen at elevated temperatures was low in the inventors' study, implying the higher stability of pyrrolic and pyridinic configurations (see Z. Tian, S. Dai, D.-e. Jiang, *Chem. Mater.* 2015, 27, 5775). Relative surface concentrations of nitrogen species obtained by fitting the N 1 s core level spectra are provided in FIG. 42. Accordingly, the pyridinic type was found to constitute the largest portion and the pyrrolic species the second highest percentage of the total nitrogen functionalities. The abundant accessible pyrrolic and pyridinic entities would provide chemically active sites to improve the capacitive performance (see H. M. Jeong, J. W. Lee, W. H. Shin, Y. J. Choi, H. J. Shin, J. K. Kang, J. W. Choi, *Nano Letters* 2011, 11, 2472; and D. Hulicova-Jurcakova, M. Seredych, G. Q. Lu, T. J. Bandosz, *Adv. Funct. Mater.* 2009, 19, 438).

Electrochemical Performance.

The supercapacitive performance of ZBIDCs samples were evaluated with a three-electrode cell configuration in 1 M $H_2SO_4$ electrolyte (FIGS. 43A-F). Due to the nearly identical porous parameters and nitrogen doping levels of ZBIDCs, only capacitance behavior of carbons synthesized at different temperatures was investigated. The comparative cyclic voltammogram (CV) plots of ZBIDCs at a scan rate of 5 mV s$^{-1}$ are shown in FIG. 43A. The carbons prepared at temperatures of 800, 900 and 1000° C. featured nearly rectangular shape indicating ideal electrical double-layer capacitance (EDLC) behavior. However, a deviation from the ideal rectangular CV plot was observed for ZBIDC-2-700, which can be correlated to its ultrafine pores. More specifically, the narrowly distributed pores (mostly below 0.5 nm) and bottleneck morphologies obtained by activation at 700° C. are usually inaccessible to the electrolyte ions (see C. O. Ania, V. Khomenko, E. Raymundo-Piñero, J. B. Parra, F. Béguin, *Adv. Funct. Mater.* 2007, 17, 1828 and D. Hulicova, M. Kodama, H. Hatori, *Chem. Mater.* 2006, 18, 2318). In addition to the EDLC, the pseudocapacitive contribution can be recognized by CV plots. The presence of distinct humps between −0.2 and 0.1 V is recognized as a typical signature of pseudocapacitance contribution which is originated from redox reactions of the heteroatom functionalities on the surface of carbon electrodes (see D. Hulicova-Jurcakova, M. Seredych, G. Q. Lu, T. J. Bandosz, *Adv. Funct. Mater.* 2009, 19, 438). Therefore, the total capacitive responses of ZBIDCs can be linked to the combination of EDLC and pseudocapacitance. The CV profiles at different scan rates (FIG. 43B) retained nearly perfect symmetrical shape, which highlights their high electrochemical stability and capacitance. Increasing the scan rate to 100 mV s$^{-1}$ led to the disappearance of the pseudocapacitance peaks and deviation from the perfect rectangular shape in CV plots because of the limited ion transport kinetic inside the small confined pores (see L. Wei, M. Sevilla, A. B. Fuertes, R. Mokaya, G. Yushin, *Adv. Funct. Mater.* 2012, 22, 827; and L. Wei, M. Sevilla, A. B. Fuertes, R. Mokaya, G. Yushin, *Adv. Energy Mater.* 2011, 1, 356).

The galvanostatic charge-discharge (GCD) curves of ZBIDCs are depicted in FIG. 43C. The GCD curves exhibited a typical isosceles triangular shape without an obvious voltage drop (IR) due to the low internal resistance, which is an indication of electric double layer capacitive behavior. The slight deviation from linearity observed for all samples is indicative of pseudocapacitive contribution, which can be considered analogous to the humps in CV plots. The discharge portions of the GCD curves were used to accurately evaluate the gravimetric specific capacitance of carbon electrodes (Equation 1). The gravimetric specific capacitance ($C_s$) for ZBIDC-2-700, ZBIDC-2-800, ZBIDC-900 and ZBIDC-2-1000, were calculated as 101, 235, 332 and 115 F g$^{-1}$, respectively at a current density of 1 A g$^{-1}$ in 1 M $H_2SO_4$. The superior electrochemical performance of the optimum sample, ZBIDC-2-900, arises from the synergistic effects of its high surface area, proper pore size distribution, sufficient degree of graphitization and high nitrogen doping level. The wider micropore size distribution of ZBIDC-2-900 compared to the other three samples is advantageous for fast ion transport through the porous network of carbon. In fact, the porous carbons composed of entirely ultrafine pores (<0.5 nm) feature higher internal resistance and poor ion diffusion whereas wide micropores facilitate the ion transfer and lead to a lower internal resistance value. (see J. Chmiola, G. Yushin, Y. Gogotsi, C. Portet, P. Simon, P. L. Taberna, *Science* 2006, 313, 1760; and C. Largeot, C. Portet, J. Chmiola, P.-L. Taberna, Y. Gogotsi, P. Simon, *J. Am. Chem. Soc.* 2008, 130, 2730). Accordingly, Yushin et al. showed that the optimal design of pores in a fully microporous carbon electrode benefits the rapid ion diffusion and the presence of mesopores are not required (A. Kajdos, A. Kvit, F. Jones, J. Jagiello, G. Yushin, *J. Am. Chem. Soc.* 2010, 132, 3252). Meanwhile, the nitrogen functional groups present on the surface of the electrode are able to modify the electron donor/acceptor nature of the carbon structure and promote an electrochemically active surface through inducing Faradaic redox reactions (T. Lin, I.-W. Chen, F. Liu, C. Yang, H. Bi, F. Xu, F. Huang, *Science* 2015, 350, 1508). In particular, the basic nitrogen functionalities increase the electronic charge density of carbon surfaces by facilitating the proton adsorption when acidic solutions are used as electrolytes.

Possible Faradaic charge transfer reactions for pyridinic, pyridonic and pyrrolic nitrogen configurations in acidic media are depicted in FIG. 45 (N. P. Wickramaratne, J. Xu, M. Wang, L. Zhu, L. Dai, M. Jaroniec, *Chem. Mater.* 2014, 26, 2820). Additionally, nitrogen sites improve the wettability of electrodes toward aqueous electrolyte by introducing polar C—N bonds and hydrophilicity to the surface of ZBIDCs (see J. Zhao, H. Lai, Z. Lyu, Y. Jiang, K. Xie, X. Wang, Q. Wu, L. Yang, Z. Jin, Y. Ma, J. Liu, Z. Hu, *Adv. Mater.* 2015, 27, 3541). It has been shown that the pyrrolic and pyridinic nitrogen species located at the periphery of carbon lattice have the most pronounced contribution to the pseudocapacitive effect (see D. Hulicova-Jurcakova, M. Seredych, G. Q. Lu, T. J. Bandosz, *Adv. Funct. Mater.* 2009, 19, 438), while the quaternary nitrogen entities promote the hydrophilicity and wettability of carbon (see W. Kim, M. Y. Kang, J. B. Joo, N. D. Kim, I. K. Song, P. Kim, J. R. Yoon, J. Yi, *J. Power Sources* 2010, 195, 2125). The correlation between capacitance value and various current densities are demonstrated in FIG. 43E. Upon increasing the current density, a noticeable decrease in the capacitance of ZBIDC-2-700 and ZBIDC-2-800 was observed while ZBIDC-2-900 and ZBIDC-2-1000 featured a gradual slope change. Notably, at a high current density of 15 A $g^{-1}$, the capacitance of ZBIDC-2-900 remained as high as 150 F $g^{-1}$, offering an acceptable rate capability. The observed drop of capacitance upon increasing current density is associated with the Ohmic resistance caused by ions accumulation inside the narrow micropores and/or interaction between electrolyte and surface heterogeneity or dangling bonds (see L. Wei, M. Sevilla, A. B. Fuertes, R. Mokaya, G. Yushin, *Adv. Energy Mater.* 2011, 1, 356). Cyclic stability is regarded as a crucial aspect for evaluating the practical application of electrode materials. Accordingly, the cycling stability for the optimum carbon, ZBIDC-2-900, was evaluated by continuous GCD experiment at a relatively high current density of 10 A $g^{-1}$ in 1 M $H_2SO_4$. As shown in FIG. 43F, ZBIDC-2-900 exhibits excellent stability with only 12.2% capacitance loss after 4000 consecutive cycles. Therefore, the electrode materials made based on the inventors' proposed carbons feature great potential in practical energy storage application.

The electrochemical impedance spectroscopy (ESI) as a complementary method was conducted to assess the facilitated ion/electron transport way within the ZBIDCs electrodes. As shown in FIG. 44, each Nyquist impedance spectrum consists of a semicircle at the high-frequency region and a straight line at the low-frequency segment. A nearly vertical slope at the low-frequency region indicates a lower diffusive resistivity for the electrolyte ions within the pores of electrode materials. The more vertical the line, the more the supercapacitor performs as an ideal capacitor (see G. Wang, L. Zhang, J. Zhang, *Chem. Soc. Rev.* 2012, 41, 797). The Z' axis intercept at high-frequency represents the equivalent series resistance (ESR) which includes electrolyte resistance, intrinsic resistance of the active material, and electrical contact resistance (see M. D. Stoller, R. S. Ruoff, *Energy Environ. Sci.* 2010, 3, 1294). The ESR values are in a range of 4.6, 4.20, 3.4 and 2.9Ω for ZBIDC-2-700, ZBIDC-2-800, ZBIDC-2-900 and ZBIDC-2-1000, respectively. ZBIDC-2-900 and ZBIDC-2-1000 samples exhibit relatively lower resistance owing to their higher degree of graphitization and wider pore size distribution obtained by higher synthetic temperature. The semicircles observed at the high-frequency region of the plot (inset) represent the charge-transfer resistance ($R_{ct}$) in the electrode material. A relatively small semicircle can be interpreted as more efficient redox reactions and enhanced contact between electrode and electrolyte (see J. Zhao, H. Lai, Z. Lyu, Y. Jiang, K. Xie, X. Wang, Q. Wu, L. Yang, Z. Jin, Y. Ma, J. Liu, Z. Hu, *Adv. Mater.* 2015, 27, 3541). It can be understood that short Z'-intercept, small radius of the semicircle and sharp slope of line featured by Nyquist plot are characteristics of a great pore accessibility for the electrolyte.

CONCLUSION

Zinc chloride activated benzimidazole derived carbons (ZBIDCs) with a moderate specific surface areas, optimal pore size distributions, suitable graphitization degree and high nitrogen content were prepared by a facile, one-step, inexpensive and solvent-free synthetic procedure. A mixture prepared by physically mixing of benzimidazole monomers as single-source precursors (C and N) and zinc chloride as medium-porogen were heated to high temperatures. The effective roles of $ZnCl_2$ in complex formation, polymerization-carbonization and pore generation were all integrated into a single-step reaction. Adjusting the activation temperature afforded carbons with diverse textural properties and nitrogen content while varying the amount of $ZnCl_2$ did not affect the physiochemical properties of ZBIDCs. Among all ZBIDCs, ZBIDC-2-900 possessed the highest capacitance of 332 F $g^{-1}$ at 1 A $g^{-1}$ in 1 M $H_2SO_4$. This superior performance were modulated by the collaborative effects of Faradaic redox reactions resulted from nitrogen functional groups and the electric double-layer capacitance (EDLC) originated from the optimal microporous structure. The excellent electrochemical results, inexpensive and commercially available precursors as well as high yield, solvent-free and convenient synthetic strategy highlight the bright prospect of ZBIDCs for future electrode materials in the energy storage field.

Experimental Section

Materials and Synthesis.

All chemicals in this work were commercial analytical reagents and used without any further purification procedure. $ZnCl_2$ (Alfa Aesar, anhydrous, >98%) and benzimidazole (TCI America, >98%) were stored in a glovebox and used as received. To minimize the effect of ambient moisture, rationally designed ratios of as received benzimidazole (BI) and $ZnCl_2$ were mixed inside a glovebox by grinding using a mortar and pestle prior to carbonization. In the first control, 300 mg of BI precursor was thoroughly mixed with 600 mg of $ZnCl_2$ (2:1 weight ratio of activator to precursor) and then transferred to a temperature programmed tube furnace. The freshly prepared white powdery mixture was kept for 1 hr under Ar flow at room temperature to remove traces of air and then was heated to the target temperatures of 700, 800, 900 and 1000° C. at a ramp rate of 5° C. $min^{-1}$ and held for 1 hr. In another control, 300 mg of BI precursor was mixed with 300, 900 and 1200 mg of $ZnCl_2$ (1:1, 3:1 and 4:1 weight ratio of activator to precursor) and carbonized in the same fashion at a fixed temperature of 900° C. A calcination temperature of 700° C. (the boiling point of $ZnCl_2$ is 732° C.) as well as a minimum molar BI to $ZnCl_2$ ratio of 2 to 1 (excess amount of $ZnCl_2$ is also needed for effective activation) was selected to ensure the simultaneous conversion of precursor to carbon and pore formation. After cooling to the room temperature, the black carbon products were soaked and washed three times with 2.0 M HCl to remove metals and residual salts. Further purification was performed by washing as-synthesized carbons with distilled water followed by ethanol. The obtained zinc chloride activated benzimidazole derived carbons were denoted as "ZBIDC-x-y," where the "x" indicates the $ZnCl_2$ to BI weight ratio and "y" represents the activation temperature. The resulting activated carbons were outgassed under vacuum at 200° C. for 12 h prior to any gas sorption measurements.

Characterization Techniques.

Scanning electron microscopy (SEM) images were obtained using a Hitachi SU-70 scanning electron microscope. Samples were prepared by dispersing each specimen onto the surface of a sticky carbon attached to a flat aluminum sample holder. Then the samples were coated with platinum at a pressure of $10^{-5}$ mbar in an $N_2$ atmosphere for 60 s prior to SEM imaging. Powder X-ray diffraction patterns of dried samples were collected at room temperature on a Panalytical X'Pert Pro Multipurpose Diffractometer (MPD). Samples were mounted on a zero background sample holder measured in transmission mode using Cu Kα radiation with a 2θ range of 5-55°. Elemental analyses of carbon, nitrogen, hydrogen, oxygen, and ash were performed at Midwest Microlab, LLC using Exeter CE440 analyzer. CHN and O level were analyzed by combined static/dynamic combustion and Unterzaucher methods, respectively. Raman spectra were obtained using a Thermo Scientific DXR SmartRaman spectrometer operating at an excitation wavelength of 532 nm. X-ray photoelectron spectroscopy (XPS) analysis was performed on a Thermo Fisher Scientific ESCALAB 250 spectrometer employing an Al Kα (1486.68 eV) X-ray source equipped with a hemispherical analyzer. Samples were prepared for XPS measurements by pressing the carbon specimen into a piece of indium foil, which was then mounted onto the sample holder using double-sided sticky tape. During XPS analysis, a combination of a low-energy electron flood gun and an argon ion flood gun was utilized for charge compensation. The binding energy scale was calibrated by setting the C 1s peak at 285.0 eV. The XPS results were analyzed with the Thermo Avantage software (v4.84). Gas adsorption-desorption measurements for Ar (87 K), $N_2$ (77 K), and $CO_2$ (273 K) were carried out on an Autosorb-iQ2 volumetric adsorption analyzer (Quantachrome Instruments) using ultrahigh purity grade adsorbates. The specific surface area of the samples was calculated using the Brunauer-Emmett-Teller (BET) method from Ar and $N_2$ isotherms. Incremental pore size distributions (PSD) were obtained from the equilibrium branch of Ar (87 K) and/or $N_2$ (77 K) isotherms by applying the quench solid density functional theory (QSDFT) model and assuming slit-pore geometry on the carbon material. Ultrafine (<0.7 nm) porosities were investigated by using $CO_2$ (273 K) isotherms and applying the nonlocal density functional theory (NLDFT) model under similar assumptions. Prior to any adsorption analyses, the samples were degassed at 200° C. for 12 h.

Electrochemical Measurements.

The electrochemical performances of the ZBIDCs as active supercapacitor electrode materials were investigated by means of cyclic voltammetry (CV), galvanostatic charge-discharge measurements (GCD) and electrochemical impedance spectroscopy (EIS) on a CHI 660E electrochemical workstation (CH Instruments, Inc.) at room temperature. The working electrodes were fabricated by mixing 80 wt. % active electrode material, 10 wt. % carbon black (Alfa Aesar), and 10 wt. % binder (polytetrafluoroethylene: PTFE, 60 wt. % dispersion in $H_2O$, Aldrich) until a slurry with proper viscosity obtained. The viscous slurry was cast onto a current collector (nickel foam, 1.5 cm×3 cm) and dried at 80° C. for 12 h in vacuum. The dried electrodes were then uniaxially pressed under a weight of 5 ton in order to achieve a good electronic contact. The geometric surface area of the prepared electrode was 0.32 $cm^2$. All of the electrochemical measurements were conducted in 1 M $H_2SO_4$ aqueous solution using a three-electrode configuration equipped with the as-prepared ZBIDCs (working electrodes), Pt wires (auxiliary electrodes) and Ag/AgCl (1 M KCl solution as reference electrodes). The voltage range for CV measurements was −0.8 to 0.4 V (vs. Ag/AgCl) at different scan rates of 1, 5, 10, 20, 50 and 100 mV $s^{-1}$. Galvanostatic charge-discharge tests were performed at various current densities of 0.5, 1, 2, 3, 4, 5, 10, 15, and 20 A $g^{-1}$ within the potential range of −0.5 to 0.5 V (vs. Ag/AgCl). The EIS data was collected in a frequency range of 0.01 Hz to 500 kHz with a 5 mV AC amplitude. The following equation was used to calculate the gravimetric specific capacitance ($C_s$, F $g^{-1}$) from the GCD curves:

$$Cs = \frac{I * \Delta t}{m * \Delta V} \quad \text{(Equation 1)}$$

where, I (A), Δt (s), ΔV(V) and m (g) represent discharge current, discharge time, discharging voltage and the mass of active material, respectively.

Example 3

Energy Storage Application.

Besides gas storage application, a great deal of research has been focused on fabrication of activated carbons and their application in energy conversion and storage recently. Graphene was one of the earliest materials, which was transformed to the activated carbon due to its unique electrical properties as well as mechanical and chemical stabilities. In addition to graphene, a vast range of carbonaceous materials can be employed as a precursor to produce activated carbons. Similar to CO2 capture performance, the electronic properties of plain carbons can be further enhanced by doping heteroatoms. The enhanced specific capacitance of heteroatom-doped carbon is originated by faradaic redox reactions and improved wettability because of charge delocalization. Nitrogen is the most frequently studied dopant due to its variety, availability and ease of incorporation methods into carbon framework. Incorporation of other dopants such as S, P, B and/or combination of them with N also has been reported recently. All of the heteroatom doped porous carbons can be synthesized by appropriate selection of precursors of carbon and desired heteroatom(s) followed by carbonization and/or activation process at elevated temperatures. Porous carbons as electrodes for supercapacitor (SC) are regarded as promising energy storage application materials, owing to their high conductivity, large surface area and controllable pores texture. Heteroatoms, especially nitrogen functionalities on the surface of porous carbon enhance the capacitance properties by inducing reversible faradaic redox reactions in which charge is stored through surface reactions.

Unlike $CO_2$ adsorbent materials, the supercapacitor materials require high conductivity and high degree of graphitization. Although KOH activation yields very high surface area, the high amount of oxygen doped into the framework of carbon increases the resistivity. To address this problem the inventors slightly modified their strategy by employing $ZnCl_2$ as activating agent and setting the higher temperatures for activation/carbonization. In a similar manner to mechanism explained for KOH activation, the formation of a complex between benzimidazole and zinc chloride takes place after mixing and in early stages of heat treatment. This step is crucial since it prevents the sublimation/evaporation of organic precursor by forming molten complex. The excess ZnCl2 present in the mixture then will decompose and generate gas to blow the melt. One sample was prepared as "proof of concept" with this strategy at temperature of 900° C. and ZnCl2/BI=2 which is denoted as BIDCZ-2-900. The surface area, pore volume and nitrogen content of BIDCZ-2-900 were found to be 350 m2 g-1, 0.14 cm3 g-1 and 5 wt %, respectively.

Electrochemical Characterization.

The electrochemical performance of the nitrogen enriched porous carbons as an active supercapacitor electrode material was investigated by means of cyclic voltammetry (CV) and galvanostatic charge-discharge (CD) measurements on a CHI 660E electrochemical workstation (CH Instruments Inc.) at room temperature. The supercapacitor working electrode (based on BIDCZ-2-900) was fabricated as follows: around a 80 wt % active electrode material, 10 wt % carbon black (Alfa Aesar) and 10 wt % binder (polytetrafluoroethylene: PTFE, 60 wt % dispersion in H2O, Aldrich) were mixed together until a slurry with proper viscosity obtained. The viscous slurry was casted onto a current collector (nickel foam, 1.5 cm×3 cm) and dried at 80° C. for 12 h in vacuum. In order to achieve a good electronic contact the dried electrode was uniaxially pressed under a weight of 5 ton. The geometric surface area of the prepared electrode was 0.32 cm2. All measurements were conducted in 1 M KOH aqueous solution with a three-electrode configuration equipped with the as-prepared working electrode, Pt wire auxiliary electrode and Ag/AgCl (1 M KCl solution as reference electrodes). The voltage range for CV measurements was −0.8 to 0.4 V (vs. Ag/AgCl) at different scan rates of 1, 5, 10, 20, 50 and 100 mV s-1. Galvanostatic charge-discharge tests were performed at various current densities of 0.5, 1, 5, and 10 A g-1 within the potential range of −1.0 to 0.0 V (vs. Ag/AgCl). The following equation was used to calculate the specific capacitance (Cs, F g-1) from the galvanostatic discharge curves:

$$Cs = \frac{I * \Delta t}{m * \Delta V}$$

where, I is the discharge current (A), $\Delta V$ is discharging voltage and $\Delta t$ is the discharge time.

The Electrochemical Performance.

The electrochemical characteristics of BIDCZ-2-900 have been evaluated for the energy storage applications via cyclic voltammetry (CV) and galvanostatic charge-discharge (CD) measurements. The CV and the CD data are presented in FIGS. 46A and B and FIGS. 47A and B, respectively. At slow scan rates (1 to 10 mV s$^{-1}$), the BIDCZ-2-900 displayed rectangular-like cyclic voltammograms and triangular symmetric charge-discharge curves, indicating a nearly perfect capacitive performance. The CV profiles in general demonstrated a pseudocapacitive behavior at slow sweep rates within −0.2 to −0.0 V regime, which indicates the as-prepared doped porous carbons capacitive response is a combination of an electric double-layer capacitance (EDLC) and pseudocapacitance. The appearance of a pseudocapacitance peak in the CV profiles can be attributed to the presence of nitrogen functionalities and the enhanced surface wettability. The high gravimetric specific capacitance achieved for BIDCZ-2-900 (319 F g$^{-1}$ at 1 A g$^{-1}$) sample could be ascribed to the induced pseudocapacitance, enhanced surface wettability and improved electronic conductivity, which resulted in better charge distribution and storage within the exposed electrode surface. The BIDCZ-2-900 maintain its rectangular shape of CV curves even at high scan rates (<20 mV s$^{-1}$) which is vital for the practical supercapacitor applications.

The galvanostatic charge-discharge measurements supported the CV findings. The charge-discharge behavior of BIDCZ-2-900 at different current densities and the potential window of −1 to 0.0 V are exhibited in FIGS. 47A and B. As seen the anodic charging and cathodic discharging segments formed symmetric triangles even at the high current densities suggesting a fast dynamics charge-discharge process and good capacitive characteristics. The long discharging time recorded for BIDCZ-2-900 (319 s) is an indicative of a superior capacitive performance. The collaborative effect of high surface area, appropriate nitrogen content and graphitic carbon contents could account for the observed enhancement in the discharging time. Specific capacitance values for the BIDCZ-2-900 sample at different current densities of 0.5, 5, and 10 A g$^{-1}$ were calculated to be 351, 207, and 141 F g$^{-1}$, respectively. These results are in accordance with the CV data.

REFERENCES

The following references correspond to those listed in the table in FIG. 17:

1. Zhou J, Li Z, Xing W, Zhu T, Shen H, Zhuo S. N-doped microporous carbons derived from direct carbonization of K+ exchanged meta-aminophenol-formaldehyde resin for superior CO2 sorption. *Chem Commun* 51, 4591-4594 (2015).
2. To J W F, et al. Hierarchical N-Doped Carbon as CO2 Adsorbent with High CO2 Selectivity from Rationally Designed Polypyrrole Precursor. *J Am Chem Soc* 138, 1001-1009 (2016).
3. Chandra V, et al. Highly selective CO2 capture on N-doped carbon produced by chemical activation of polypyrrole functionalized graphene sheets. *Chem Commun* 48, 735-737 (2012).
4. Zhao Y, Zhao L, Yao K X, Yang Y, Zhang Q, Han Y. Novel porous carbon materials with ultrahigh nitrogen contents for selective CO2 capture. *J Mater Chem* 22, 19726-19731 (2012).
5. Lee J H, Lee H J, Lim S Y, Kim B G, Choi J W. Combined CO2-philicity and Ordered Mesoporosity for Highly Selective CO2 Capture at High Temperatures. *J Am Chem Soc* 137, 7210-7216 (2015).
6. Aijaz A, Fujiwara N, Xu Q. From Metal-Organic Framework to Nitrogen-Decorated Nanoporous Carbons: High CO2 Uptake and Efficient Catalytic Oxygen Reduction. *J Am Chem Soc* 136, 6790-6793 (2014).
7. Adeniran B, Masika E, Mokaya R. A family of microporous carbons prepared via a simple metal salt carbonization route with high selectivity for exceptional gravimetric and volumetric post-combustion CO2 capture. *J Mater Chem A* 2, 14696-14710 (2014).
8. Cong H, et al. Highly selective CO2 capture by nitrogen enriched porous carbons. *Carbon* 92, 297-304 (2015).
9. Lee D, Zhang C, Wei C, Ashfeld B L, Gao H. Hierarchically porous materials via assembly of nitrogen-rich polymer nanoparticles for efficient and selective CO2 capture. *J Mater Chem A* 1, 14862-14867 (2013).

10. Zhang X, Lin D, Chen W. Nitrogen-doped porous carbon prepared from a liquid carbon precursor for CO2 adsorption. *RSC Adv* 5, 45136-45143 (2015).

11. Ashourirad B, Arab P, Verlander A, El-Kaderi H M. From Azo-Linked Polymers to Microporous Heteroatom-Doped Carbons: Tailored Chemical and Textural Properties for Gas Separation. *ACS Appl Mater Interfaces* 8, 8491-8501 (2016).

12. Ashourirad B, Sekizkardes A K, Altarawneh S, El-Kaderi H M. Exceptional Gas Adsorption Properties by Nitrogen-Doped Porous Carbons Derived from Benzimidazole-Linked Polymers. *Chem Mater* 27, 1349-1358 (2015).

13. Li D, Chen Y, Zheng M, Zhao H, Zhao Y, Sun Z. Hierarchically Structured Porous Nitrogen-Doped Carbon for Highly Selective CO2 Capture. *ACS Sustainable Chemistry & Engineering* 4, 298-304 (2016).

The following references correspond to the references listed in FIG. 54:

[1] N. P. Wickramaratne, J. Xu, M. Wang, L. Zhu, L. Dai, M. Jaroniec, *Chem. Mater.* 2014, 26, 2820.

[2] Y.-H. Lee, K.-H. Chang, C.-C. Hu, *J. Power Sources* 2013, 227, 300.

[3] J.-W. Jeon, R. Sharma, P. Meduri, B. W. Arey, H. T. Schaef, J. L. Lutkenhaus, J. P. Lemmon, P. K. Thallapally, M. I. Nandasiri, B. P. McGrail, S. K. Nune, *ACS Appl. Mater. Interfaces* 2014, 6, 7214.

[4] H. Zhu, J. Yin, X. Wang, H. Wang, X. Yang, *Adv. Funct. Mater.* 2013, 23, 1305.

[5] L. Wang, Z. Gao, J. Chang, X. Liu, D. Wu, F. Xu, Y. Guo, K. Jiang, *ACS Appl. Mater. Interfaces* 2015, 7, 20234.

[6] L. Li, Q. Zhong, N. D. Kim, G. Ruan, Y. Yang, C. Gao, H. Fei, Y. Li, Y. Ji, J. M. Tour, *Carbon* 2016, 105, 260.

[7] M. Seredych, D. Hulicova-Jurcakova, G. Q. Lu, T. J. Bandosz, *Carbon* 2008, 46, 1475.

[8] C. O. Ania, V. Khomenko, E. Raymundo-Piñero, J. B. Parra, F. Béguin, *Adv. Funct. Mater.* 2007, 17, 1828.

[9] L. Zhao, L.-Z. Fan, M.-Q. Zhou, H. Guan, S. Qiao, M. Antonietti, M.-M. Titirici, *Adv. Mater.* 2010, 22, 5202.

[10] J.-S. Wei, H. Ding, Y.-G. Wang, H.-M. Xiong, *ACS Appl. Mater. Interfaces* 2015, 7, 5811.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method of synthesis of a nitrogen-doped porous carbon, comprising:
    preparing a solventless or solid-state mixture of (i) benzimidazole and (ii) zinc chloride ($ZnCl_2$), sodium hydroxide (NaOH) and/or potassium hydroxide (KOH);
    subjecting the solventless or solid-state mixture to heat at a temperature sufficient to induce pyrolysis of the solventless or solid-state mixture to form a nitrogen-doped porous carbon.

2. The method of claim 1, wherein the solventless or solid-state mixture does not comprise a metal organic framework compound.

3. The method of claim 1, wherein the solventless or solid-state mixture comprises a weight ratio of $ZnCl_2$ to benzimidazole or KOH to benzimidazole or NaOH to benzimidazole in the range of about 0.5-4.

4. The method of claim 1, wherein the solventless or solid-state mixture comprises a weight ratio of $ZnCl_2$ to benzimidazole or KOH to benzimidazole or NaOH to benzimidazole in the range of about 2:1.

5. The method of claim 1, wherein the temperature ranges from 700° C. to 1000° C.

6. The method of claim 1, wherein the nitrogen-doped porous carbon has a surface area in the range of about 525-855 $m^2\ g^{-1}$ and a total pore volume in the range of about 0.21-0.33 $cm^3\ g^{-1}$.

7. The method of claim 1, wherein the nitrogen-doped porous carbon has a surface area in the range of about 830-3320 $m^2\ g^{-1}$ and a total pore volume in the range of about 0.33-1.89 $cm^3\ g^{-1}$.

8. The method of claim 1, wherein the nitrogen-doped porous carbon has a surface area of about 350 $m^2/g$ and a total pore volume of about 0.15 $cm^3/g$.

* * * * *